US012192820B2

(12) United States Patent
Yeh et al.

(10) Patent No.: US 12,192,820 B2
(45) Date of Patent: Jan. 7, 2025

(54) REINFORCEMENT LEARNING FOR MULTI-ACCESS TRAFFIC MANAGEMENT

(71) Applicant: Intel Corporation, Santa Clara, CA (US)

(72) Inventors: Shu-ping Yeh, Campbell, CA (US); Jingwen Bai, San Jose, CA (US); Shilpa Talwar, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 17/484,743

(22) Filed: Sep. 24, 2021

(65) Prior Publication Data

US 2022/0014963 A1   Jan. 13, 2022

Related U.S. Application Data

(60) Provisional application No. 63/165,011, filed on Mar. 23, 2021, provisional application No. 63/165,015, filed on Mar. 23, 2021, provisional application No. 63/164,440, filed on Mar. 22, 2021.

(51) Int. Cl.
*H04W 28/02* (2009.01)
*G06N 3/08* (2023.01)

(52) U.S. Cl.
CPC .......... *H04W 28/0268* (2013.01); *G06N 3/08* (2013.01); *H04W 28/0231* (2013.01)

(58) Field of Classification Search
CPC ......... H04W 28/0268; H04W 28/0231; H04W 74/08; H04W 24/06; H04W 28/0247; H04W 28/06; H04W 28/24; G06N 3/08; G06N 3/044; G06N 3/045; G06N 3/084; G06N 7/01; G06N 3/006
See application file for complete search history.

(56) References Cited

U.S. PATENT DOCUMENTS

| 2019/0371299 | A1* | 12/2019 | Jiang | ...................... G10L 15/22 |
| 2020/0359256 | A1* | 11/2020 | Liu | ....................... H04W 28/10 |
| 2021/0012227 | A1* | 1/2021 | Fang | .................... H04L 41/5067 |
| 2021/0119881 | A1* | 4/2021 | Shirazipour | ........ H04L 41/0823 |

(Continued)

OTHER PUBLICATIONS

3GPP, "3rd Generation Partnership Project; Technical Specification Group Radio Access Network; NG-RAN; Architecture description (Release 16)", Jul. 2021, 79 pages, 3GPP TS 38.401 V16.6.0, Valbonne, France.

(Continued)

*Primary Examiner* — Steven Hieu D Nguyen
(74) *Attorney, Agent, or Firm* — Hanley, Flight & Zimmerman, LLC

(57) ABSTRACT

The present disclosure is related to multi-access traffic management in edge computing environments, and in particular, artificial intelligence (AI) and/or machine learning (ML) techniques for multi-access traffic management. A scalable AI/ML architecture for multi-access traffic management is provided. Reinforcement learning (RL) and/or Deep RL (DRL) approaches that learn policies and/or parameters for traffic management and/or for distributing multi-access traffic through interacting with the environment are also provided. Deep contextual bandit RL techniques for intelligent traffic management for edge networks are also provided. Other embodiments may be described and/or claimed.

28 Claims, 29 Drawing Sheets

(56) References Cited

U.S. PATENT DOCUMENTS

2021/0383212 A1* 12/2021 Ramachandran ...... G06N 3/084
2022/0121941 A1* 4/2022 Goldberg ................ G06N 3/08

OTHER PUBLICATIONS

O-Ran Alliance, "O-RAN Operations and Maintenance Interface Specification", Nov. 2020, 66 pages, O-RAN. WG1.O1-Interface. 0-v04.00, Alfter, Germany.
O-Ran Alliance, "O-Ran Operations and Maintenance Architecture", Nov. 2020, 54 pages, O-RAN.WG1.OAM-Architecture-v04.00 2020, Alfter, Germany.
O-Ran Alliance, "O-Ran Architecture Description", Mar. 2021, 33 pages, O-RAN.WG1.O-RAN-Architecture-Description-v04.00, Alfter, Germany.
O-Ran Alliance, "O-Ran Working Group 3, Near-Real-time RAN Intelligent Controller, E2 Application Protocol (E2AP)", Jul. 2020, 84 pages, O-RAN.WG3.E2AP-v01.01, Alfter, Germany.
O-Ran Alliance, "O-Ran Working Group 3 Near-Real-time RAN Intelligent Controller Architecture & E2 General Aspects and Principles", Jul. 2020, 36 pages, O-RAN.WG3.E2GAP-v01.01, Alfter, Germany.
O-Ran Alliance, "O-Ran Fronthaul Working Group Control, User and Synchronization Plane Specification", Mar. 2021, 298 pages, O-RAN.WG4.CUS.0-v06.00, Alfter, Germany.
O-Ran Alliance, "Cloud Architecture and Deployment Scenarios for O-RAN Virtualized RAN", Jul. 2020, 52 pages, O-RAN.WG6.CAD-v02.01, Alfter, Germany.
O-Ran Alliance, "O-Ran Working Group 3 Near-Real-time RAN Intelligent Controller E2 Service Model (E2SM) KPM", Feb. 2020, 44 pages, ORAN-WG3.E2SM-KPM-v01.00.00, Alfter, Germany.
O-Ran Alliance, "O-Ran Working Group 3 Near-Real-time RAN Intelligent Controller E2 Service Model (E2SM), RAN Function Network Interface (NI)", Feb. 2020, 44 pages, ORAN-WG3.E2SM-NI-v01.00.00, Alfter, Germany.
O-Ran Alliance, "O-Ran Working Group 3 Near-Real-time RAN Intelligent Controller", Feb. 2020, 27 pages, ORAN-WG3.E2SM-v01.00.00, Alfter, Germany.
Chia-Yu Chang, "Cloudification and Slicing in 5G Radio Access Network", Networking and Internet Architecture [cs.NI], Sorbonne Université, 2018, NNT: 2018SORUS293, HAL id: tel-02501244, version 1, 227 pages (Mar. 6, 2020).
Coronado et al., "Zero Touch Management: A Survey of Network Automation Solutions for 5G and 6G Networks", IEEE Communications Survey s & Tutorials, vol. 24, No. 4, Fourth Quarter, pp. 2535-2578, 44 pages, (2022).
"3rd Generation Partnership Project; Technical Specification Group Services and System Aspects; System architecture for the 5G System (5GS); Stage 2 (Release 17)", 3GPP TS 23.501 v17.3.0, 559 pages (Dec. 23, 2021).
"3rd Generation Partnership Project; Technical Specification Group Services and System Aspects;Management and orchestration; Concepts, use cases and requirements (Release 17)" 3GPP TS 28.530 v17.2.0, 37 pages (Dec. 23, 2021).
"3rd Generation Partnership Project; Technical Specification Group Services and System Aspects; Management and orchestration; Performance assurance (Release 16)", 3GPP TS 28.550 v16.8.0, 85 pages (Sep. 23, 2021).
"3rd Generation Partnership Project; Technical Specification Group Services and System Aspects; Telecommunication management; Performance Management (PM); Concept and requirements (Release 16)", 3GPP TS 32.401 v16.0.0, 29 pages (Jul. 10, 2020).
"3rd Generation Partnership Project; Technical Specification Group Services and System Aspects; Telecommunication management; Subscriber and equipment trace; Trace concepts and requirements (Release 17)", 3GPP TS 32.421 v17.3.0, 49 pages (Dec. 23, 2021).
"Zero-touch network and Service Management (ZSM); Reference Architecture", ETSI GS ZSM 002 V1.1.1, 80 pages (Aug. 2019).
X. Geng et al., "5G End-to-end Network Slice Mapping from the view of Transport Network", IETF, draft-geng-teas-network-slice-mapping-04, 19 pages (Oct. 25, 2021), https://www.ietf.org/archive/id/draft-geng-teas-network-slice-mapping-04.html.
A. Farrel et al., "Framework for IETF Network Slices", IETF, draft-ietf-teas-ietf-network-slices-05, 40 pages (Oct. 25, 2021), https://www.ietf.org/archive/id/draft-ietf-teas-ietf-network-slices-05.txt.
Navarro, "Architecture", ONAP Developer Wiki, 4 pages (Jul. 26, 2019; retrieved on Dec. 23, 2021), https://wiki.onap.org/display/DW/Architecture.
Zhao et al., "Improving Worst-Case Delay Analysis for Traffic of Additional Stream Reservation Class in Ethernet-AVB Network", Sensors 18, No. 11: 3849, 18 pages (Nov. 9, 2018), https://www.mdpi.com/1424-8220/18/11/3849/htm.
Hunt et al., "Enhanced Utilization Telemetry for Polling Workloads with collectd and the Data Plane Development Kit (DPDK) User Guide", Intel Corp., 14 pages (last updated: Aug. 19, 2020) https://networkbuilders.intel.com/solutionslibrary/enhanced-utilization-telemetry-for-polling-workloads-with-collectd-and-the-data-plane-development-kit-dpdk-user-guide.
"In-band Network Telemetry (INT) Dataplane Specification Version 2.1", The P4.org Applications Working Group, 56 pages (Nov. 22, 2020), https://p4.org/p4-spec/docs/INT_v2_1.pdf.
Johnson et al., "NexRAN: Closed-loop RAN slicing in Powder—A top-to-bottom open-source open-RAN use case", The 15th ACM Workshop on Wireless Network Testbeds, Experimental evaluation & CHaracterization (WiNTECH), pp. 17-23 (Jan. 31, 2022), https://www.flux.utah.edu/paper/oran-slicing.
Milić et al., "New Concepts of Asynchronous Circuits Worst-Case Delay and Yield Estimation", Micro Electronic and Mechanical Systems, Ch. 25, Kenichi Takahata (ed.), IntechOpen, 24 pages (Dec. 1, 2009), https://www.intechopen.com/chapters/6644.
Yaguang Yang, "A Flow Network Model for Software Reliability Assessment", Sixth American Nuclear Society International Topical Meeting on Nuclear Plant Instrumentation, Control, and Human-Machine Interface Technologies NPIC&HMIT 2009, Knoxville, Tennessee, Apr. 5-9, 2009, on CD-ROM, American Nuclear Society, LaGrange Park, IL, 14 pages (Apr. 5, 2009).
Michael J. Neely, "Opportunistic Scheduling with Worst Case Delay Guarantees in Single and Multi-Hop Networks", Proceedings IEEE INFOCOM, 2011, pp. 1728-1736 (Apr. 10, 2011), https://ee.usc.edu/stochastic-nets/docs/wc-delay-infocom2011.pdf.
Henry D. Pfister, "A Short Introduction to Channel Coding", Supplemental Material for Graphical Models and Inference, 21 pages (Sep. 15, 2015), http://pfister.ee.duke.edu/courses/ece590_gmi/coding_intro.pdf.
Prof. John A. Stankovic et al., "Admission Control, Reservation, and Reflection in Operating Sytsems", Appeared in IEEE Bulletin of the Technical Committee on Operating Systems and Application Environments (TCOS), vol. 10, No. 2, Summer 1998, 6 pages (1998), https://citeseerx.ist.psu.edu/viewdoc/download?doi=10.1.1.57.2026&rep=rep1&type=pdf.
Kim et al., "Barefoot Networks Advanced Data-Plane Telemetry", One Connect, 23 pages (Dec. 2018).
Chromy et al., "Admission Control Methods in IP Networks", Advances in Multimedia, vol. 2013, Article ID 918930, 7 pages (2013), https://doi.org/10.1155/2013/918930.
Shu Fan et al., "Cross-Layer Control with Worst Case Delay Guarantees in Multihop Wireless Networks", Journal of Electrical and Computer Engineering, vol. 2016, Article ID 5762851, 11 pages (Oct. 10, 2016), https://www.hindawi.com/journals/jece/2016/5762851/.
"3rd Generation Partnership Project; Technical Specification Group Services and System Aspects; System architecture for the 5G System (5GS); Stage 2 (Release 17)", 3GPP TS 23.501 v17.2.0, 542 pages (Sep. 24, 2021).
"3rd Generation Partnership Project; Technical Specification Group Services and System Aspects; Architecture for enabling Edge Applications; (Release 17)", 3GPP TS 23.558 v17.1.0, 162 pages (Sep. 24, 2021).
"3rd Generation Partnership Project; Technical Specification Group Radio Access Network; Evolved Universal Terrestrial Radio Access (E-UTRA); LTE/WLAN Radio Level Integration Using IPsec Tun-

(56) References Cited

OTHER PUBLICATIONS nel (LWIP) encapsulation; Protocol specification (Release 16)", 3GPP TS 36.361 V16.0.0, 10 pages (Jul. 24, 2020).
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 v16.7.0, 89 pages (Sep. 27, 2021).
"3rd Generation Partnership Project; Technical Specification Group Radio Access Network; NG-RAN; Architecture description (Release 16)", 3GPP TS 38.401 v16.7.0, 79 pages (Oct. 1, 2021).
Kok-Lim Alvin Yau et al., "Application of Reinforcement Learning in Cognitive Radio Networks: Models and Algorithms", 2014, 24 pages, The Scientific World Journal, vol. 2014, Article ID 209810.
Volodymyr Mnih et al, "Human-level control through deep reinforcement learning", Feb. 26, 2015, 13 pages, vol. 518.
Julien Perez et al, "Utility-based Reinforcement Learning for Reactive Grids", May 2008, 10 pages, The 5th IEEE International Conference on Autonomic Computing, Chicago, USA.
Miguel Perez-Enciso et al, "A Guide for Using Deep Learning for Complex Trait Genomic Prediction", Jul. 20, 2019, 19 pages.
Max Pumperla et a., "Deep Learning and the Game of Go", 2019, 22 pages.
David Silver et al., "Deterministic Policy Gradient Algorithms", 2014, 9 pages, Proceedings of the 31st International Conference on Machine Learning, Beijing, China, 2014. JMLR: W&CP vol. 32.
Richard S. Sutton et al., "Reinforcement Learning: An Introduction", Nov. 5, 2017, 445 pages, London, England.
Csaba Szepesvari, "Algorithms for Reinforcement Learning", Jun. 9, 2009, 98 pages.
Yunhao Tang, "Introduction to Deep Learning with Tensorflow", Feb. 25, 2019, 153 pages, Department of IEOR, Columbia University.
Huasen Wu et al., "Adaptive Exploration-Exploitation Tradeoff for Opportunistic Bandits", Nov. 30, 2018, 18 pages, arXiv:1709.04004v2 [cs.LG].
Timothy P. Lillicrap et al., "Continuous Control With Deep Reinforcement Learning", Jul. 5, 2019, 14 pages, arXiv:1509.02971v6 [cs.LG], London, U.K.
John Langford et al., "The Epoch-Greedy Algorithm for Multi-armed Bandits with Side Information", 2007, 8 pages, Advances in Neural Information Processing Systems (NIPS), vol. 20.
Vijay R. Konda et al., "Actor-Critic Algorithms", 2000, pp. 1008-1014, Advances in Neural Information Processing Systems.
Vijaymohan Konda, "Actor-Critic Algorithms", Jun. 2002, 147 pages.
Rodrigo Toro Icarte et al., "Reward Machines: Exploiting Reward Function Structure in Reinforcement Learning", Oct. 6, 2020, 31 pages, arXiv:2010.03950v1 [cs.LG].
Gal Dalal et al., "Safe Exploration in Continuous Action Spaces", Jan. 26, 2018, 9 pages, arXiv:1801.08757v1.
Christian Wirth et al., "Model-Free Preference-Based Reinforcement Learning", 2016, 7 pages, Association for the Advancement of Artificial Intelligence, Germany.
Shpra Agrawal, "Reinforcement Learning: Lecture Notes, Spring 2019", 2019, 104 pages, Columbia University, IEOR.
Yoshua Bengio et al., "Learning Long-Term Dependencies with Gradient Descent is Difficult", Mar. 1994, pp. 157-166, IEEE Transactions on Neural Networks, vol. 5, No. 2.
Yoshua Bengio et al., "Representation Learning: A Review and New Perspectives", Apr. 23, 2014, 30 pages, arXiv:1206.5538v3 [cs.LG].

* cited by examiner

REINFORCEMENT LEARNING FOR MULTI-ACCESS TRAFFIC MANAGEMENT

RELATED APPLICATIONS

The present application claims priority to U.S. Provisional App. No. 63/164,440 filed Mar. 22, 2021, U.S. Provisional App. No. 63/165,011 filed Mar. 23, 2021, and U.S. Provisional App. No. 63/165,015 filed Mar. 23, 2021, the contents of each of which are hereby incorporated by reference in their entireties.

TECHNICAL FIELD

Embodiments described herein generally relate to edge computing, network communication, communication system implementations, and artificial intelligence (AI) and machine learning (ML), and in particular, to AI/ML techniques for managing traffic in multi-access communications networks.

BACKGROUND

Multi-access technology involves, for example, user equipment (UE) that have more than one radio interface that can access multiple radio access networks (RANs) that implement different radio access technologies (RATs). However, what is currently missing are strategies for efficiently managing the multi-access traffic to meet diverse quality-of-service (QoS) requirements of various applications.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1A:
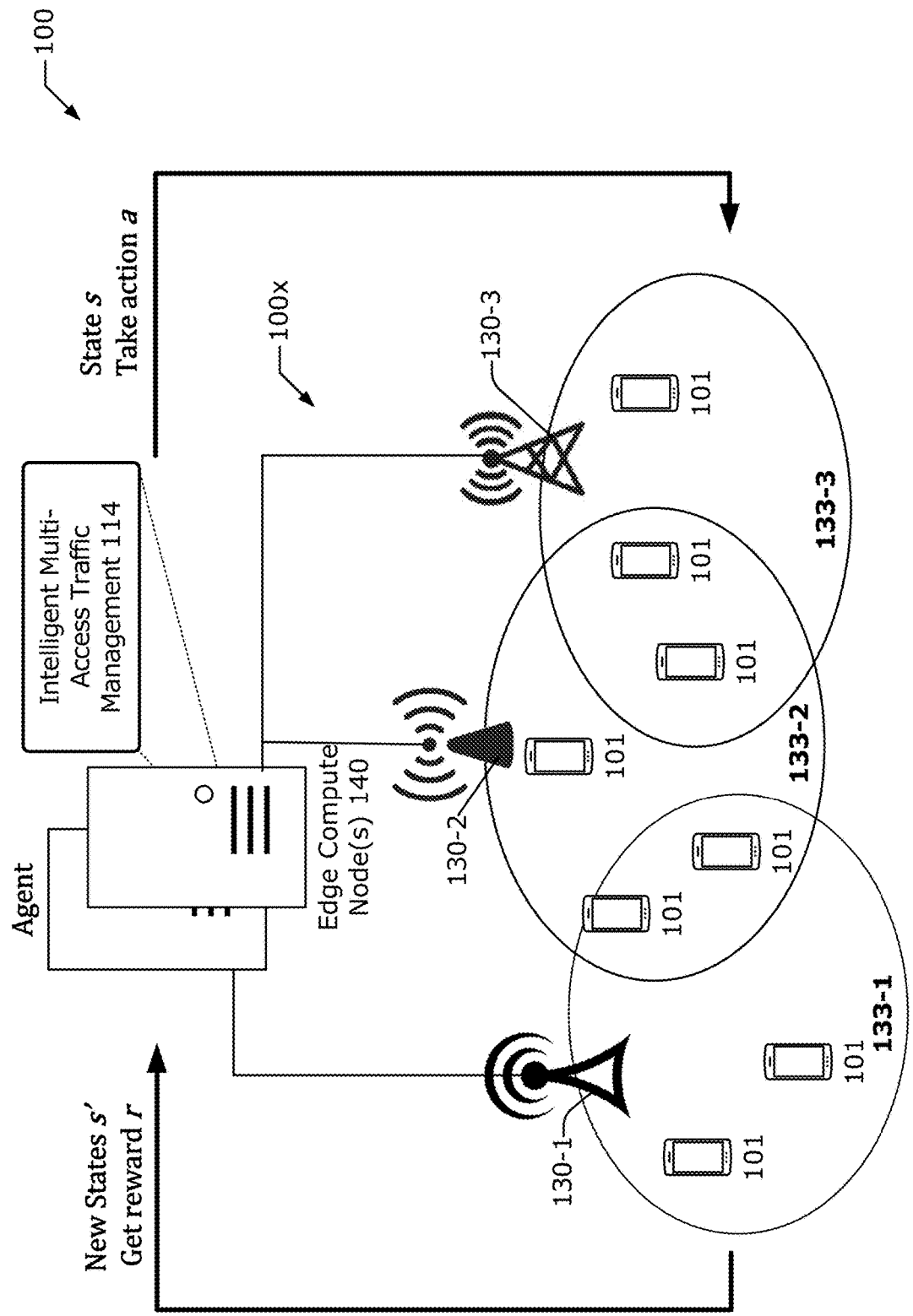
FIGS. 1a, 1b, and 1c show example model-free deep reinforcement learning framework for multi-access traffic management (DRL-MTM) architecture.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

1. Architecture for Multi-Access Traffic Management

Multi-access technology is seen as a key to Fifth Generation (5G) and emerging edge computing technologies. The edge network (see e.g., edge network 1135 of FIG. 11 and/or edge cloud 1210 of FIG. 12) will move closer to radio access networks (RAN) (see e.g., RANs including one or more NANs 1131-1133 of FIG. 11) as the delay requirements for new applications become more stringent. Many user equipment (UE) (e.g., UEs 1121, 1111 of FIG. 11) can have more than one radio interfaces, and can access multiple RANs using multiple types of RATs (e.g., 5G/NR, LTE, WiFi, etc.). Hence it is of critical importance to develop intelligent multi-access traffic management strategy at edge compute nodes (e.g., edge compute nodes 1136 of FIG. 11) to meet the diverse UE quality-of-service (QoS) requirements (see e.g., FIG. 11).

The present disclosure provides scalable artificial intelligence (AI)/machine learning (ML) architecture embodiments and implementations for multi-access traffic management by leveraging recent developments in AI/ML technologies. Previous/existing solutions on multi-access traffic management have focused on either model-based solutions or pre-defined policy. For example, a TCP layer or application layer approach specifies a policy beforehand, such as multi-path TCP (MP-TCP) and Quick UDP (QUIC). Other solutions, such as Int'l App. No. PCT/US2020/066969 filed on Dec. 23, 2020 ("[AC6833PCT]"), which hereby is incorporated by reference in its entirety, are based on network utility maximization, which requires RAN knowledge, traffic information, and the like. However, the previous/existing solutions rely on accurate mathematical models or pre-defined control policy. By contrast, the implementations discussed herein leverage recent development in AI/ML to develop a model-free approach to learn the best strategy simply by interacting with the environment and collecting the runtime statistics without relying on any optimization model or pre-defined policy. Furthermore, some existing technologies involve predetermined traffic routing rules that do not depend on RAN observations (e.g., priority-based and active-standby Access Traffic Steering, Switching and Splitting (ATSSS) rules defined by 3GPP). In the present disclosure, RAN observations (as well as UE 101 and NF observations) are incorporated into the traffic management decision making process.

In the present disclosure, a deep reinforcement learning (DRL) architecture is provided for multi-access traffic management at one or more edge compute nodes. In particular, two different architectures are discussed herein to address the scalability issues in DRL to handle arbitrary number of active multi-access UEs or flows in the network. The two architectures include a single-agent DRL with long-short term memory (LSTM) and a multi-agent DRL. A detection mechanism is also discussed infra, which is used to trigger a particular edge node (e.g., UEs 1111, 1121 of FIG. 11 and/or the like) to perform traffic steering/splitting update using DRL framework.

The AI/ML traffic management techniques discussed herein can be used to realize edge/cloud RAN intelligence that can potentially offer unprecedented QoS improvements and enhancements. Specific implementations of the embodiments herein can be provided by various standards and/or specification such as 3GPP, ETSI MEC, Open RAN (O-RAN) Alliance, OpenNESS, and/or the like. For example, message format and message exchange signaling between edge/cloud server and RAN nodes can be specified in such standards/specifications.

Figure 1B:
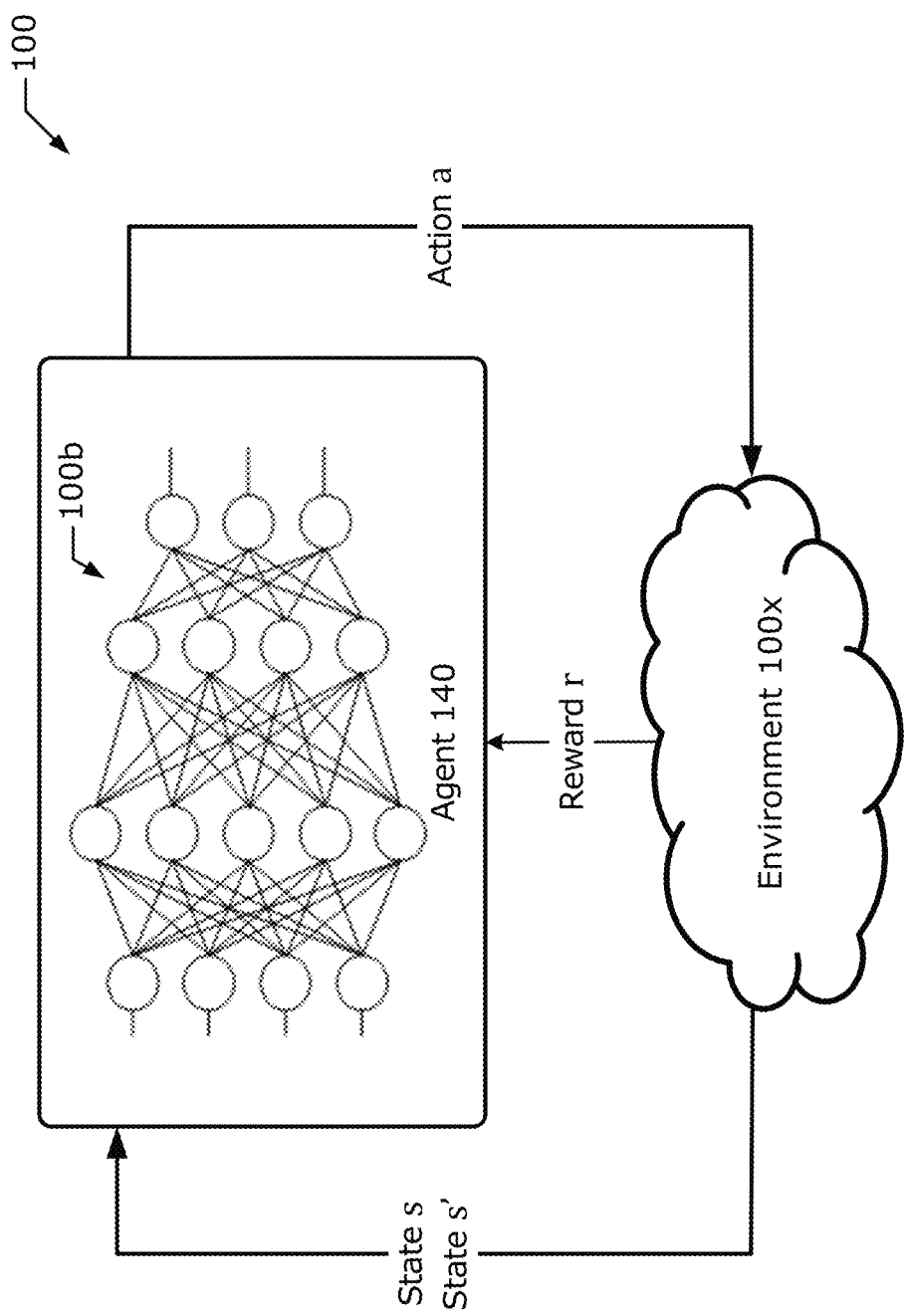
Figure 1C:
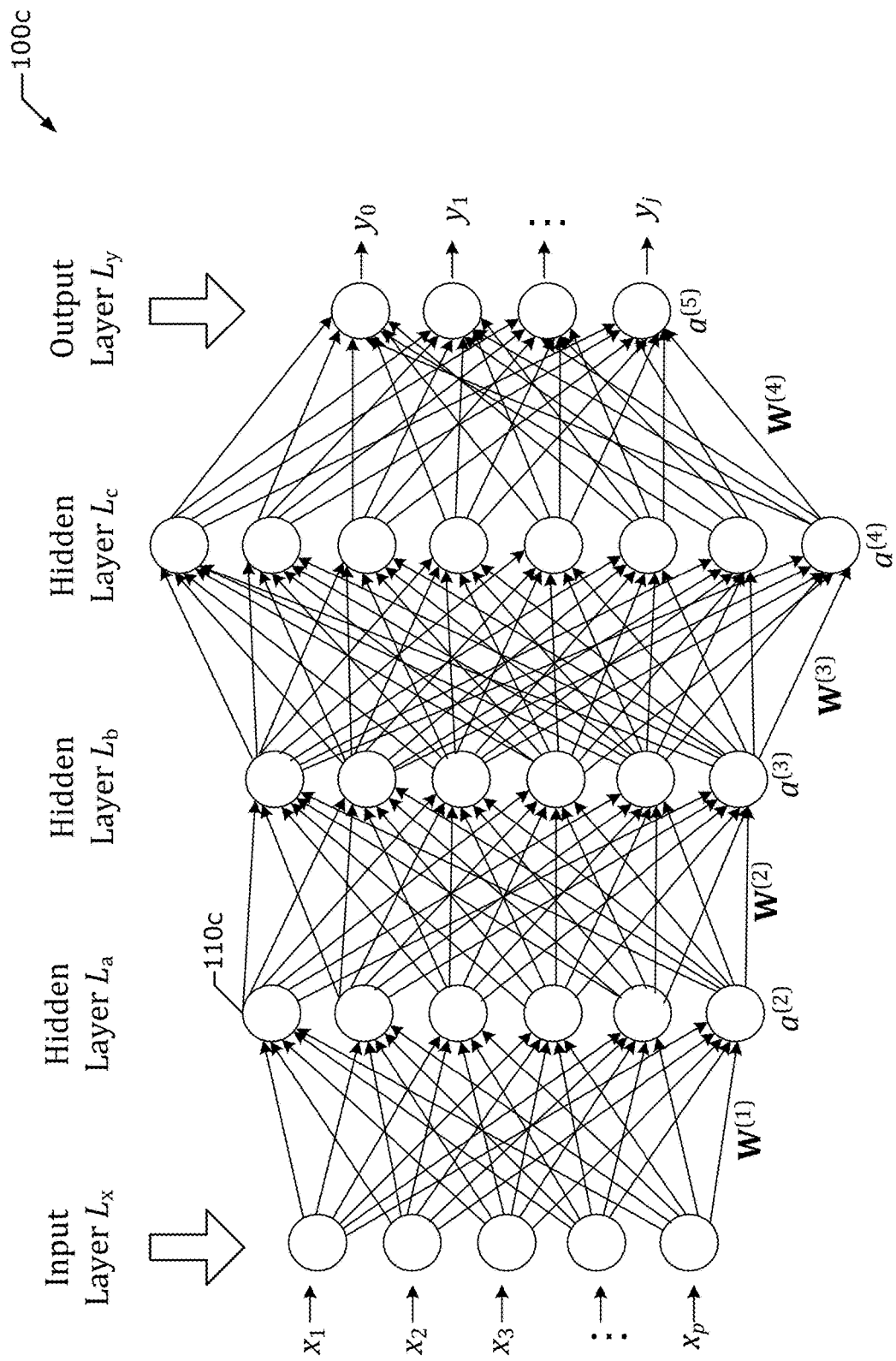

FIGS. 1a, 1b, and 1c depict a model-free deep reinforcement learning framework for multi-access traffic management (DRL-MTM) 100. In FIG. 1a, an edge compute node 140 acts, or operates, a DRL-MTM agent, which may be referred herein to as "Agent 140". The edge compute node 140 operates an intelligent multi-access traffic management entity/element (iMTM) 114 for performing various multi-access management tasks/operations as discussed herein. The edge compute node 140 may correspond to the edge compute node 1136 of FIG. 11. As examples, the edge compute node 140 may be a Multi-Access Edge Computing (MEC) server/host (e.g., MEC host 1802 of FIG. 18), an O-RAN RAN intelligent controller (RIC) (e.g., Non-RT RIC 2012 and/or Near-RT RIC 2014 of FIG. 20 or the like), and/or some other edge compute node such as those discussed herein.

The environment that the Agent 140 interacts with is a multi-access network 100x where there are UEs 101 with multiple radio interfaces are capable of connecting with multiple RANs including one or more RAN nodes 130-1, 130-2, and 130-3 (collectively referred to as "RAN nodes 130" or "RANs 130") having respective coverage areas 133-1, 133-2, and 133-3 (collectively referred to as "coverage areas 133" or "coverage area 133") one or more of which utilize different radio access technologies (RATs). The RAN nodes 130 in FIG. 1a may correspond to one or more of the NANs 1131-1133 of FIG. 11 discussed infra, and the UEs 101 may correspond to the UEs 1121a and 1121b and/or IoT devices 1110 of FIG. 11.

For RL, within an episode, the agent 140 is faced with a state s of its environment 100x. Based on the current state s of the environment 100x, the agent 140 selects an action a. After choosing an action a, the agent 140 obtains a new (next) state s'. The next state s' depends on both the chosen action a and observations of the environment 100x based on the performed action a. The action a is the agent's 140 methods, operations, tasks, etc., that allows the agent 140 to interact with, and change the environment 100x, and thus, transfer between states s. In FIG. 1a, the agent 140 obtains or identifies a state s based on observations from the UEs 101 and/or RANs/RAN nodes 130 about environment 100x, and determines the action a based on the state s. For example, the agent 140 will obtain observation data based on various measurements and/or contextual data, determines a state of the environment (state s) based on the obtained observation data, and then selects/determines operational parameters and/or traffic management strategies (action a) based on the state s. After implementing and/or performing the action a, the agent 140 will obtain new observation data (next state s') and then selects new operational parameters and/or traffic management strategies (e.g., a next action a'). In some implementations, during an initial state, conventional predetermined rules can be used for traffic management and the RL model can be applied at the later stage (e.g., after an initial batch of observation data is collected).

Figure 3:
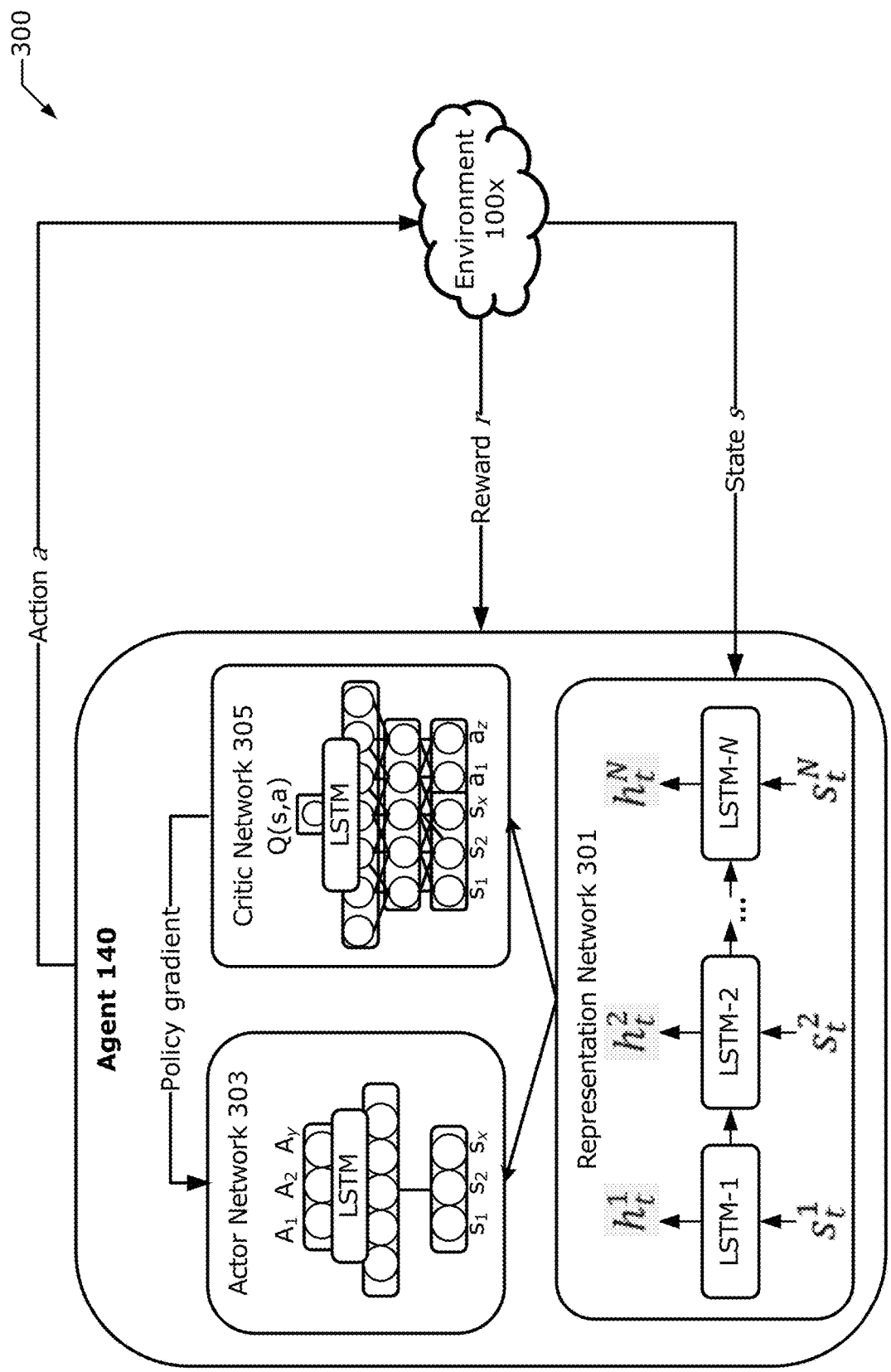
FIG. 3 shows an example Single-Agent DRL architecture.

In the example of FIG. 1a, the agent 140 is shown collecting observation data from one or more RANs/RAN nodes 130 and one or more UEs 101. Additionally or alternatively, core network functions may provide performance indicators to the agent 140, which may be used to determine the state of the environment 100x. In addition to collecting observations from UEs 101, RANs/RAN nodes 130, and core network functions, the agent 140 can collect observation data from other edge compute nodes 140 collocated with other RANs/RAN nodes 130 (not shown by FIG. 1a) to expand the coverage area for traffic management learning. Such collection may be useful for joint traffic management for a wider coverage area among multiple edge compute nodes 140, where each participating edge compute nodes 140 can again share their observation data for future episodes, epochs, or iterations of the RL learning/inference determination. In these implementations, the agent 140 and/or a representation network (e.g., representation network 301 of FIG. 3, representation network 901 of FIG. 9, and/or the like) can be trained with observation data obtained from the other UEs 101, RANs/RAN nodes 130, and core network functions covered/served by the other edge compute nodes 140. Additionally or alternatively, various edge compute nodes 140 can share feature outputs from their agents 140 and/or a representation networks (e.g., representation network 301 of FIG. 3, representation network 901 of FIG. 9, and/or the like), and a global agent or representation network can be trained to extract the impact from respective UEs 101, RANs/RAN nodes 130, etc., served by different edge compute nodes 140.

Additionally, the behavior (e.g., traffic management strategies, operations, etc.) of each element/entity in the environment 100x is part of the environment 100x that the agent 140 learns to navigate. To improve its performance, the agent 140 is provided with feedback on whether the agent 140 is achieving its objective (e.g., improving network conditions, conserving network and/or computing resources, etc.); this feedback is in the form of a reward r, which is a numerical score representative of meeting a goal. Every action a performed by the agent 140 yields a reward r. The agent 140 alters its behavior to increase the amount of reward it accumulates. A collection of one or more states, one or more actions, and one or more rewards may be referred to as experience data. A single data structure can be used to contain the experience data (e.g., an experience buffer or replay buffer such as those discussed infra).

In some implementations, the decision of which action a to choose is based on a policy π, which provides guidance on the optimal action(s) to take in a certain state with the goal of maximizing the total rewards. Each state is associated with a value function V(s), which predicts the expected amount of future reward(s) that can be received in a given state by acting on the corresponding policy. The "return" on an action is a future reward that the agent may obtain after performance of that action. The future reward or return can be calculated as a total sum of discounted rewards going forward. An optimal value function produces a maximum return, and an optimal policy achieves optimal value functions. In some implementations, the policy π is a mapping from a state s to one or more probabilities of selecting each possible action a given that state s. The reward r is a numerical value received by the agent 140 from the environment as a direct response to the agent's 140 actions a. The agent 140 attempts to maximize the overall reward it receives during an epoch or episode (an episode being all states that come in between an initial-state and a terminal-state), and so rewards r are the motivation the agent 140 needs in order to act in a desired manner. All actions yield rewards r, which can be roughly divided to three types, including positive rewards that emphasize a desired action, negative rewards that deemphasize a particular action, and zero rewards which indicates a neutral action.

Performance of the action a involves instructing the UEs 101 and/or RANs/RAN nodes 130 to perform various actions/tasks/operations. Based on those actions/tasks/operations, a new state s' based on observations is provided to the Agent 140 by the UEs 101 and/or RANs/RAN nodes 130. The observations may be various types of data, such as network-related data, signal measurements, etc., and/or various data such as those discussed herein.

Referring to FIG. 1b, the agent 140 (or the iMTM 114) is responsible for deciding the traffic steering/splitting strategy (e.g., Action a) for individual multi-access UEs 101 and/or RANs/RAN nodes 130 in multi-access environment 100x based on the observation collected from the environment 100x (state s). After performing the traffic steering/splitting strategy recommended by the agent 140 (e.g., Action a), a new observation (state s or state s') can be collected from the environment 100x and a reward r can be calculated according to an engineered reward function. In some implementations, the reward function may be an objective function. In some implementations, the reward function can be generated using a reward machine (RM) (an RM takes abstracted descriptions of the environment as input, and outputs one or more reward functions). The reward r can be provided by one or more network elements from environment 100x, generated by the edge compute node 140, and/or by some other element/entity.

A deep neural network (DNN) 100b may be used as the artificial brain of the agent 140 (or the iMTM 114) to handle very large and complicated observation spaces. The DNN 100b determines the traffic steering/splitting strategy (e.g., Action a) for individual multi-access UEs 101 and/or RANs/RAN nodes 130. The DRL-MTM 100 (or DNN 100b) learns to choose the best or most optimal traffic management strategies according to runtime statistics and without relying on any optimization models or pre-defined policies. Examples of the traffic management-related action space a may include traffic steering (e.g., select a RAT through which to route the traffic), traffic splitting (e.g., split the traffic across multiple RATs), and/or traffic sharing (e.g., sending traffic from multiple different flows over the same link/channel). In some implementations, the traffic sharing strategies may involve defining one radio link as a default link/connection to support multiple users and multiple different traffic flows. In some implementations, a reward function (e.g., for providing reward r) may be implemented as a utility function of the network QoS target (e.g., network throughput, packet delay, jitter, alpha-fairness, etc.). Here, the utility function produces a utility value representative the expected immediate reward r for taking an action a in some state s plus the sum of the long-term rewards over the rest of the agent's 140 lifetime, assuming the agent 140 acts using the suitable (or optimal) policy π. In one implementation, the reward is calculated as a function of QoS measurements from all UEs 101, which may be expressed using the reward function (RF1), and an example per user utility function U(i, t) for a user i at time t can be expressed as utility function (UF1):

$$r_t = ?_i U(i, t) \tag{RF1}$$

$$U(i, t) = \frac{1}{\text{delay}(i, t)} \tag{UF1}$$

The long-term rewards may be calculated by summing all of the rewards produced over a period of time (or an entire episode). Additionally or alternatively, a performance threshold for a current ML model can be defined for cases when an observed state s indicates poor traffic performance. For example, if the observed performance is below a threshold, a previous ML model or a model-based traffic management algorithm that provided relatively good performance may be swapped in for the current ML model. The observation space, action space, and reward(s) in the DRL-MTM architecture 100a are discussed infra.

FIG. 1c illustrates an example artificial neural network (ANN) 100c, which may correspond to the DNN 100b of FIG. 1b. Additionally or alternatively, the ANN 100c may be suitable for use by one or more of the computing systems (or subsystems) of the various implementations discussed herein, implemented in part by a hardware accelerator, and/or the like. The ANN 100c may be a multi-layer feedforward neural network (FNN) comprising an input layer $L_x$, one or more hidden layers $L_a$, $L_b$, and $L_c$, and an output layer $L_y$ (where a, b, c, x, and y may be numbers). Additionally or alternatively, the ANN 100c can be in some other type of topology (or combination of topologies), such as Convolution NN (CNN), Recurrent NN (RNN), a Long Short Term Memory (LSTM) algorithm, a deep CNN (DCN), a Deconvolutional NN (DNN), a gated recurrent unit (GRU), a deep belief NN, a feed forward NN (FFN), a deep FNN (DFF), a deep stacking network, a Markov chain, a perception NN, a Bayesian Network (BN), a Dynamic BN (DBN), a Linear Dynamical Systems (LDS), a Switching LDS (SLDS), and so forth. In one example implementation, the ANN 100c is a neural network of a DRL agent (e.g., DNN 100b and/or iMTM 114) that is used as one or more function approximators.

Each of the layers L comprises one or more neurons 110c (note that not all neurons 110c are labeled in FIG. 1c for the sake of brevity). The neurons 110c may also be referred to as nodes 110c, processing elements (PEs) 110c, or the like. Each neuron 110c has one or more inputs and produces a single output which can be sent to multiple other neurons 110c (the inputs and outputs may be referred to as "signals"). The inputs can be the feature values of a sample of external data (e.g., input variables $x_i$), or they can be the outputs of other neurons 110c. The outputs of the final output neurons 110c (e.g., output variables $y_i$) accomplish the desired/configured task. The neurons 110c and edges may also have weights that adjust as learning proceeds. The weight increases or decreases the strength of the signal at a connection. Neurons 110c may have a threshold such that a signal is sent only if the aggregate signal crosses that threshold. The neurons 110c can be aggregated or grouped into one or more layers L where different layers L may perform different transformations on their inputs.

Signals travel from the first layer (the input layer $L_1$), to the last layer (the output layer $L_y$), possibly after traversing the layers $L_a$, $L_b$, and $L_c$ multiple times. In FIG. 1c, the input layer $L_a$ receives data of input variables $x_i$ (where i=1, . . . , p, where p is a number). Hidden layers $L_a$, $L_b$, and $L_c$ processes the inputs $x_i$, and eventually, output layer $L_y$ provides output variables $y_j$ (where j=1, . . . , p', where p' is a number that is the same or different than p). In the example of FIG. 1c, for simplicity of illustration, there are only three hidden layers $L_a$, $L_b$, and $L_c$ in the ANN 100c, however, the ANN 100c may include many more (or fewer) hidden layers $L_a$, $L_b$, and $L_c$ than are shown. The output variables $y_j$ may be in the form of determinations, inferences, predictions, and/or assessments. The input variables $x_i$ can be set as a vector containing the relevant data (e.g., observations, ML features, etc.). Additionally or alternatively, the output variables $y_j$ can be set as a vector containing the relevant data (e.g., determinations, inferences, predictions, assessments, and/or the like).

Usually, neural networks have fixed input and output dimensions. In a multi-access network, the number UEs 101 with active transmission(s) and/or the number of traffic flows for different QoS requirements can vary over time. If the DRL-MTM is implemented as a neural network whose input and output dimensions depend on the number of active UEs 101 or flows, the neural network designed for certain number of active UEs 101 or flows cannot be used when the number of active UEs 101 or flows changes. In such case, either the neural network will have to be retrained with complete different size from scratch, or the neural network can be designed for a large number of UEs 101 or flows and the input can be zero-padded if the actual number of UEs 101 or flows is smaller than the neural network size. However, these strategies are not very scalable to deal with varying wireless network sizes. Two scalable DRL-MTM architectures are discussed infra to accommodate the real-world dynamic user/UE 101 movement and traffic flow establishment and termination. These scalable DRL-MTM architectures include Collaborative Multi-Agent DRL (see e.g., FIG. 2) and Single Agent DRL (see e.g., FIG. 3). Either of these architectures can use some or all the aspects of ANN 100c discussed previously.

1.1. Collaborative Multi-Agent DRL

Figure 2:
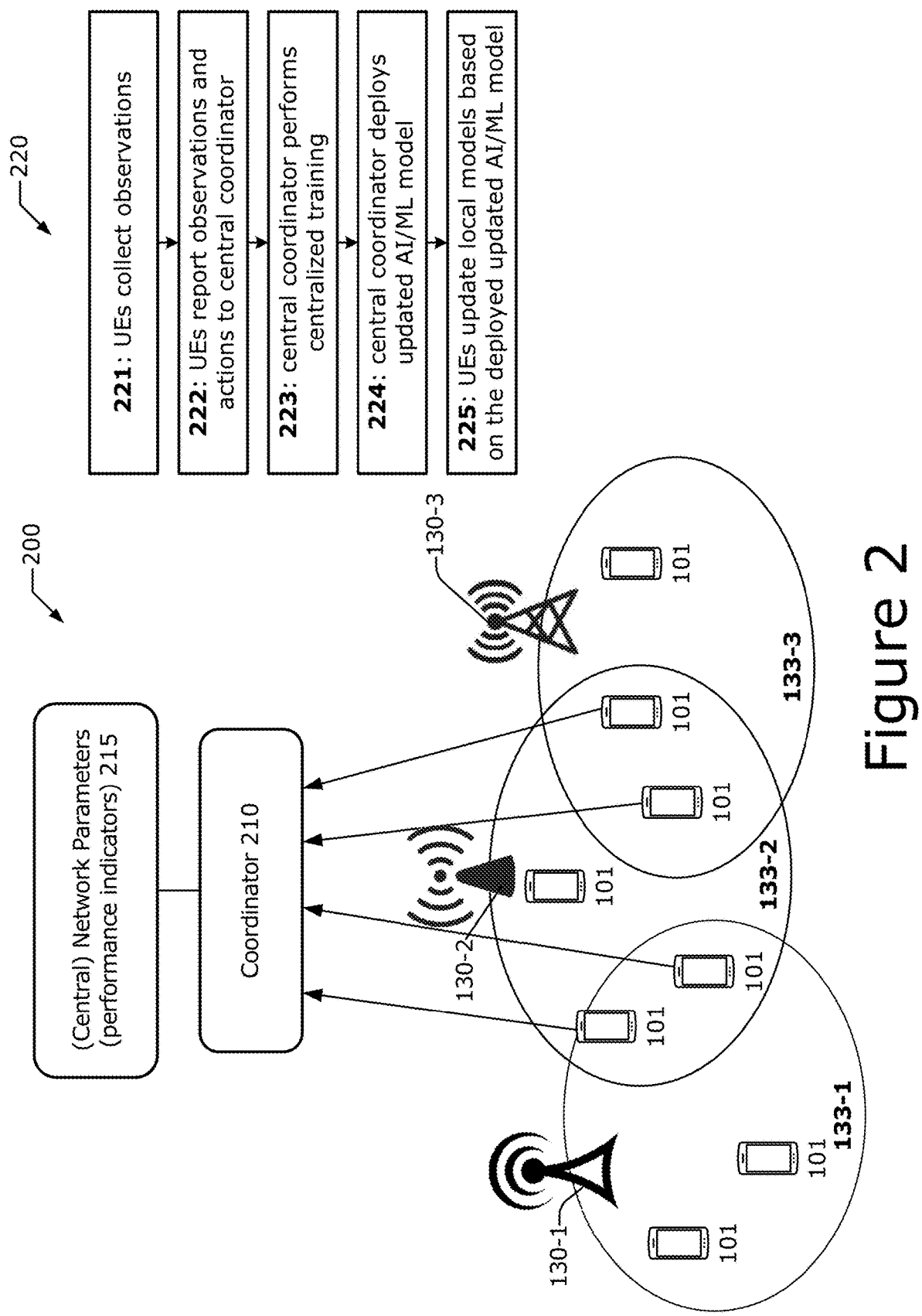
FIG. 2 depicts an example Collaborative Multi-Agent DRL.

FIG. 2 shows an example Collaborative Multi-Agent DRL architecture 200 according to various embodiments. In architecture 200, each multi-access UE 101 is configured as an agent, and in this implementation, each of these agents may be referred to as a "multi-agent 101". Some or all multi-agents 101 interact with the environment 100x to collect observation data and/or runtime statistics. In some implementations, individual multi-agents 101 determine a state of the environment 100x. In other implementations, the observations and/or runtime statistics are sent to a coordinator entity 210 that determines the state of the environment 100x. The coordinator entity 210 is employed as a centralized training engine or host at one or more edge compute nodes and/or RIC (e.g., edge compute node 140). Network parameters 215 (e.g., from a core network or one or more network functions (NFs)) may also be used by the coordinator 210 for the state of the environment 100x. The network parameters 215 may be various performance indicators, such as those discussed herein. The states are gathered at the central training engine 210, and the reward is shared among the multi-agents 101.

With a shared team reward across all the participating multi-agents 101, the coordinator 210 can centrally train a common model (e.g., ANN 100c) and deploy it to one or more multi-agents 101. Then, the multi-agents 101 derive an action based on the deployed model by independently predicting the traffic steering or splitting ratio according to their individual observations from interacting with the environment 100x. The central training engine 210 will train the model (e.g., update the weights), and the trained model will be deployed to the participating multi-agents 101. In cases where the state is determined by individual multi-agents 101 so each multi-agent 101 can only determine the action based on its own observed state using the deployed model. Such architecture 200 allows centralized training and distributed inferences.

FIG. 2 also shows an example Collaborative Multi-Agent DRL procedure 220, which begins at operation 221 where each UE 101 collects observations from the environment, which are used for the state input and reward calculation for RL agent. At operation 222, individual UEs 101 report their observations and the actions it took to the central coordinator 210. At operation 223, the central coordinator 210 performs centralized training based on the observations and actions reported by some or all of the UEs 101. For RL model update, a centralized reward is calculated by the coordinator 210 based on the collected observations. At operation 224, the coordinator 210 can deploy the updated AI/ML model to some or all agents (e.g., UEs 101). In some implementations, the update model is deployed once the updated model passes certain verification/testing criteria. At operation 225, the UEs 101 update their local model to the latest AI/ML model deployed by the coordinator 210. The UEs 101 perform traffic steering/splitting actions according to the strategy computed by the AI/ML model based on current observation(s). After operation 225, the process may repeat by looping back to operation 221.

In some implementations, the collaborative multi-agent DRL mechanism allows agents to collaborate with each other while each agent 140 only determines the traffic management strategy for one UE 101. In some implementations, multiple agents can be collocated at one UE 101 or one edge compute node 140 to determine the traffic management strategies for more than one UE 101.

1.2. Single-Agent DRL with Variable Input Dimension

FIG. 3 shows an example Single-Agent DRL architecture 300. In this embodiment, a single agent 140 is implemented by an edge compute node and/or RIC (e.g., edge compute node 140). The agent 140 collects RAN observations from RAN nodes 130 and/or directly from one or more UEs 101. To overcome fixed neural network input dimension issues discussed previously, the embodiments herein leverage an RNN to take input with variable size to learn a representation for some or all active UEs 101 and/or flows and their dynamics. RNNs have an internal state that can represent context information. RNNs keep information about past inputs for an amount of time that is not fixed a priori, but rather depends on its weights and on the input data.

In this example, the RNN includes a representation network 301 (also referred to as "feature extraction network 301", "feature learning network 301" or the like), an actor network 303, and a critic network 305. The representation network 301 discovers the representations needed for feature detection or classification from raw data (e.g., the collected observation data). The actor network 303 and the critic network 305 implement actor-critic learning. Actor-critic learning is an RL technique in which an agent 140 simultaneously learns a policy function (actor network 303) and a value function (critic network 305). The policy function (actor network 303) is the decision making entity with one or more tunable parameters, and the value function (critic network 305) evaluates the determined action a to produce feedback to help improve the training process for the policy function (actor network 303). In DRL, the policy function and/or the value function is computed by respective multi-layer neural networks. The independent-layer structure of a DNN (see e.g., ANN 100c of FIG. 1c) allows the gradient computations through backpropagation. In the context of RL, backpropagation refers to a computational implementation of the chain rule wherein an algorithm determines the relevant partial derivatives by means of a backward pass. In embodiments, each of the network 301, 303, and 305 may be neural networks such as the ANN 100c of FIG. 1c.

Both the actor network 303 and the critic network 305 compute action predictions for a current state and generate a temporal difference (TD) error signal each time step. The input to the actor network 303 is a current state (which is a representation produced by the representation network 301), and the actor network 303 outputs a value representing an action chosen from an action space (e.g., a set of potential actions to take). The input to the critic network 305 is the current state (which is the representation produced by the representation network 301), and the critic network 305 outputs feedback or an approximation for the predicted action. The feedback may be a grade, rank, degree, rating, quality, or some other value indicating the adequacy or superiority of the predicted action in relation to other potential actions. The feedback may be a state-value from a state-value function (e.g., V(s)) or a quality value (a "Q value" or "action-value") from a Q value function (e.g., Q(s, a)). Additionally or alternatively, the critic network 305 outputs a probability distribution over various actions, and an expected return from the current position. Additionally or alternatively, the critic network 305 outputs one or more values for each state-action pair. In either case, the actor network 303 in turn attempts to improve its policy based on the approximation provided by the critic network 305. In other words, the actor network 303 determines the action a, and the critic network 305 evaluates the action a and determines adjustments to be made in the action determination/learning process.

In some implementations, the learning approach of the actor network 303 and/or the critic network 305 is a policy gradient learning approach such as, for example, a cross-entropy loss function, Monte Carlo policy gradient, finite horizon MDP, infinite horizon average reward, infinite horizon discounted reward, Deterministic Policy Gradient (DPG), Deep DPG (DDPG), Twin Delayed DDPG (TD3), and/or the like. Additionally or alternatively, critic network 305 performs Q-learning or deep Q-learning using function approximation or quantization techniques. When the critic network 305 acts as a function approximator, it attempts to approximate a value function of a policy used by the actor network 303. When the critic network 305 uses quantization techniques, it predicts the reward values produced using a particular policy.

In the example of FIG. 3, the RNN comprises one or more Long Short-Term Memory (LSTM) networks. An LSTM is a type of RNN capable of learning order dependence in sequence prediction problems. The LSTM layer in representation network 301 (also referred to as "LSTM layer 301") serves as a feature extraction layer that abstracts out impacts contributed by active UEs 101 and/or individual flows. LSTM layer 301 includes LSTM-1 to LSTM-N (where N is a number), each of which takes a state as an input (e.g., state $s_t^1$ to state $s_t^N$, where $s_t^i$ is a state at time t), and outputs respective features (e.g., feature $h_t^1$ to feature $h_t^N$, where $h_t^i$ is a feature at time t and/or a learned preference for selecting action $a_t^i$ in state $s_t^i$). The outputs of the LSTM layer 301 (e.g., features $h_t^1$ to $h_t^N$) are input to both an actor network 303 and critic network 305 in the policy gradient RL framework.

Additional RNN layer(s) (e.g., LSTM layer(s)) can be added in the actor network 303 and in the critic network 305 for the policy gradient RL framework to learn the measurement sequence correlation and incorporate it for decision making. For example, the learned measurement sequence correlation can be used by the actor network 303 to better determine an action, and the learned measurement sequence correlation can be used by the critic network 305 to better determine the feedback. Policy gradient methods involve directly modeling and optimizing a policy π. Policy gradient methods provide a scheme for estimating which direction to shift one or more weights in order to make the agent 140 better at its task(s). Instead of randomly shifting each weight, the experience data is analyzed to guess whether it would be better to increase or decrease a particular weight. In this case, the policy gradient may indicate whether to adjust the weights assigned to certain traffic management strategies, for example, increasing or decreasing the weights assigned to individual links for specific types of data (or QoS requirements) and/or the like.

In some implementations, the LSTM of the actor network 303 (also referred to as "LSTM layer 303") determines actions A (including actions $A_1$ to $A_y$, where y is a number) based on the states (including states $s_1$ to $s_x$ where x is a number) and/or the representation from the representation network 301. In some implementations, the LSTM of the critic network 305 (also referred to as "LSTM layer 305") determines a quality value (or "Q value") based on a Q function (e.g., Q(s, a)) using states (including states $s_1$ to $s_x$) and actions (including actions $a_1$ to $a_z$ where z is a number) as inputs. The Q value is a measure of the overall expected reward r assuming the agent 140 is in state s and performs action a, and then continues until the end of the episode following some policy π (also referred to as a "decision-making rule π" or "decision-making rules π"). The critic network 305 may perform Q-learning or deep Q-learning using function approximation or quantization techniques. The LSTM layer 305 produces a policy gradient based on the Q value and provides the policy gradient to the actor network 303, which is then used for producing future actions.

In FIG. 3, at each episode or epoch, only one target UE 101 (or target flow) is triggered to get an action update. Observation information of active UEs 101 (or flows) are used in the LSTM layer 301 to learn a representation of the current environment dynamics. The agent 140 will combine the learned representation and the target target UE's 101 (or target flow's) observation as input to the actor network 303 and critic network 305, use policy gradient framework to train the neural networks 303 and 305, and derive an action and update the traffic steering/splitting rule(s) for the target target UE 101 (or target flow).

Additionally or alternatively, the RL model and/or agent 140 can be distributed among multiple edge compute nodes 140 for distributed training and/or inference determination. For example, a first part of the training can be done on first edge compute node 140, a second part of the training can be done on a second edge compute node 140, and so forth. Three types of distributed training can be deployed among multiple edge compute nodes 140. A first distributed training implementation involves partitioning and/or parallelizing data and distributing different sets of the partitioned/parallelized data among respective edge compute nodes 140, and the RL model is hosted in a single edge compute node 140. For example, observation data collected from different UEs 101, RAN nodes 130, etc., can be partition to subset of data traces and one edge compute node 140 update the ML model based on its data trace set; then, one central training engine implemented by an edge compute node 140 can gather the updated model or the gradient update from multiple edge compute nodes 140 to perform global model update. A second distributed training implementation involves parallelizing the RL model and distributing the parallelized RL model among different edge compute nodes 140. For example, different stages of the RL model can run in a different edge compute nodes 140. A third distributed training implementation is a hybrid approach, which includes both the first and second distributed training implementations. Furthermore, if training is accomplished using among multiple edge compute nodes 140, then the potential latency should be considered while designing the data and/or model parallelism/partitioning scheme.

1.3. Observation Data and Triggering Mechanisms for Model Updates

As mentioned previously, in FIGS. 1*a*-3 the agent 140 obtains or determines a state s based on observations from the UEs 101 and/or RANs/RAN nodes 130, determines and performs an action a based on the state s. Examples of the observations (e.g., state s, s' in FIGS. 1*a*-3) sent from the environment 100*x* to a training engine (e.g., operated by one or more edge compute nodes 140 and/or a cloud computing system/service) may include one or more other measurements such as any of those discussed herein, application requirements, operational parameters (e.g., operational information of UEs 101 and/or RANs 130), contextual information, hardware configurations of the UEs 101 and/or RANs 130, resource usage (at specific devices and/or network/radio resources), and/or any other suitable observations or aspects.

For the architectures 200 and 300, mechanisms to trigger traffic management strategy updates for certain UEs 101 can be employed. Various observations and/or measurements can be used to detect the UEs 101 that need to be triggered for policy updates. These detection techniques can be done either at the edge compute node 140 or at the NAN 130 to trigger traffic management policy update for the qualified and/or selected UEs 101.

In some embodiments, two kinds of measurement feedback are used for these purposes: per UE measurements/feedback, per NAN measurements/feedback (e.g., Central Unit (CU), Distributed Unit (DU), Remote Unit (RU) (or Remote Remote Unit (RRU)), base station (e.g., eNB, gNB, etc.), access point, etc.).

Examples of per UE measurements/feedback include various types of delay (e.g., packet delay, etc.) including average delay, delay variation, etc.; packet loss rate; packet drop rate; PHY rate; goodput; UE throughput (e.g., average DL UE throughput in NAN 130, average UL UE throughput in NAN 130, distribution of DL UE throughput in NAN 130, distribution of UL UE throughput in NAN 130, percentage of unrestricted DL UE data volume in NAN 130, percentage of unrestricted UL UE data volume in NAN 130, etc.); jitter; alpha fairness ("a-fairness"); channel quality indicator (CQI) related measurements; Modulation Coding Scheme (MCS) related measurements; and/or the like. Based on the per UE measurements, if a QoS target is not met relatively consistently for a certain period of time (e.g., packet delay for certain UE 101 violates the requirement for 10 s period), the UE 101 will be triggered for a traffic management strategy update. The update rule can also take into account multiple metrics such as high delay, high packet loss rate, and/or the like.

Examples of per NAN measurements include physical resource block (PRB) utilization, cell throughput, radio utilization level per NAN (e.g., physical radio resource utilization and the like), packet delay, data volume measurements, CQI related measurements, MCS related measurements, and/or the like. Based on NAN-based measurements, a group of UEs 101 belonging to (or being served by) the same NAN 130 (e.g., DU, etc.) can be triggered for policy update if the NAN 130 (e.g., DU, etc.) consistently experiences specific conditions such as, for example, high PRB utilization level, low throughput, and/or the like.

Examples of the packet delay measurements for per UE and/or the per NAN measurements include distribution of delay DL air-interface (e.g., the distribution of the time it takes for packet transmission over the air-interface in the downlink direction); average delay UL on over-the-air interface (e.g., the average (arithmetic mean) over-the-air packet delay on the uplink); Average RLC packet delay in the UL (e.g., the average (arithmetic mean) RLC packet delay on the uplink, which may be delay within the gNB-DU); average PDCP re-ordering delay in the UL (e.g., the average (arithmetic mean) PDCP re-ordering delay on the uplink, which may be the delay within the gNB-CU-UP), distribution of DL delay between NG-RAN and UE (e.g., the distribution of DL packet delay between NG-RAN and UE, which is the delay incurred in NG-RAN (including the delay at gNB-CU-UP, on F1-U and on gNB-DU) and the delay over Uu interface); distribution of UL delay between NG-RAN and UE (e.g., the distribution of UL packet delay between NG-RAN and UE, which is the delay incurred in NG-RAN (including the delay at a CU-UP, on F1-U and on a DU) and the delay over Uu interface); DL packet delay between NG-RAN and PDU session anchor (PSA) UPF; average delay DL in CU-UP (e.g., the average (arithmetic mean) PDCP SDU delay on the downlink within the gNB-CU-UP, for all PDCP packets); average delay DL on F1-U (e.g., the average (arithmetic mean) GTP packet delay DL on the F1-U interface); average delay DL in gNB-DU (e.g., the average (arithmetic mean) RLC SDU delay on the downlink within the gNB-DU, for initial transmission of all RLC packets); distribution of delay DL in CU-UP (e.g., the distribution of PDCP SDU delay on the downlink within the gNB-CU-UP, for all PDCP packets); distribution of delay DL on F1-U (e.g., the distribution of GTP packet delay DL on the F1-U interface); distribution of delay DL in gNB-DU (e.g., the distribution of RLC SDU delay on the downlink within the gNB-DU, for initial transmission of all RLC packets); and the like.

Examples of the packet loss rate measurements for per UE and/or the per NAN measurements include UL PDCP SDU Loss Rate (e.g., the fraction of PDCP SDU packets which are not successfully received at gNB-CU-UP; a measure of the UL packet loss including any packet losses in the air interface, in the gNB-CU and on the F1-U interface); UL F1-U Packet Loss Rate (e.g., the fraction of PDCP SDU packets which are not successfully received at gNB-CU-UP. It is a measure of the UL packet loss on the F1-U interface); DL F1-U Packet Loss Rate (e.g., the fraction of PDCP SDU packets which are not successfully received at the gNB-DU); and the like.

Examples of the packet drop rate measurements for per UE and/or the per NAN measurements include DL PDCP SDU Drop rate in gNB-CU-UP (e.g., the fraction of PDCP SDU packets which are dropped on the downlink, due to high traffic load, traffic management etc in the gNB-CU-UP); DL Packet Drop Rate in gNB-DU (e.g., the fraction of RLC SDU packets which are dropped on the downlink, due to high traffic load, traffic management etc in the gNB-DU); and the like.

Examples of the data volume measurements for per UE and/or the per NAN measurements include DL PDCP PDU data volume (e.g., the data volume (amount of PDCP PDU bits) in the DL delivered from a CU to a DU); UL PDCP PDU data volume (e.g., the data volume (amount of PDCP PDU bits) in the UL delivered from a DU to a CU); DL PDCP SDU data volume (e.g., the data volume (amount of PDCP SDU bits) in the DL delivered to the PDCP layer); and/or UL PDCP SDU data volume per interface (e.g., the data volume (amount of PDCP SDU bits) in the UL delivered to a CU-UP from a DU (F1-U interface), from external a CU-UP (Xn-U interface), and from external eNB (X2-U interface).

Examples of the CQI related measurements for per UE and/or the per NAN measurements include wideband CQI distribution (e.g., the distribution of wideband CQI reported by UEs 101 in a cell 133). Measurements of CQI reported by UEs 101 is a useful metric reflecting RF signal quality and service quality. Examples of the MCS related measurements for per UE and/or the per NAN measurements include MCS distribution in Physical Downlink Shared Channel (PDSCH) (e.g., the distribution of the MCS scheduled for PDSCH RB by NG-RAN); MCS distribution in Physical Uplink Shared Channel (PUSCH) (e.g., the distribution of the MCS scheduled for PUSCH RB by NG-RAN); PDSCH MCS distribution for MU-MIMO (e.g., the distribution of the MCS scheduled for PDSCH RB by NG-RAN in MU-MIMO scenario); and/or PUSCH MCS Distribution for MU-MIMO (e.g., the distribution of the MCS scheduled for PUSCH RB by NG-RAN in MU-MIMO scenario). Additionally or alternatively, other channel state information (CSI) may be reported such as, for example, CQI, precoding matrix indicator (PMI), CSI-RS resource indicator (CRI), SS/PBCH Block Resource indicator (SSBRI), layer indicator (LI), rank indicator (RI), L1-RSRP and/or L1-SINR.

Additionally or alternatively, the measurements for the observations and/or policy update triggering can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 101, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements as discussed in [T528552].

Additionally or alternatively, the training engine and/or agent 140 can use performance indicators from a core network (or individual NFs) as part of the observation data (e.g., state data for determining appropriate actions and/or for policy update triggering). Performance indicators comprise performance data aggregated over a group of NFs, such as, for example, average latency along a network slice. The performance indicators can be derived from performance measurements collected at a particular NFs that belong to the group. The aggregation method is identified in the performance indicator definition. Performance indicators at the network slice subnet level can be derived from the performance measurements collected at the NFs that belong to the network slice subnets or to the constituent network slice subnets. The performance indicators at the network slice subnet level can be made available via the corresponding performance management service for network slice subnet. The performance indicators at the network slice level, can be derived from the network slice subnet level Performance Indicators collected at the constituent network slice subnets and/or NFs. The network slice level performance indicators can be made available via the corresponding performance management service for network slice.

Additionally or alternatively, in cases where is discrepancy in the observation data from one or more UEs 101, one or more RANs 130, and/or core network NFs (e.g., missing reports, erroneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., operating system type and version, etc.). Various configurations may be used to define any of the aforementioned data collection parameters. Such configurations may be defined by suitable specifications/standards, such as 3GPP, ETSI and/or O-RAN standards.

2. Performance Assurance for Reinforcement Learning in Multi-Access Traffic Management Services As more and more client devices (e.g., UEs 1111, 1121 of FIG. 11) are equipped with multiple radio interfaces, there has been increasing interest to establish multiple concurrent connections between a multi-radio device (e.g., multi-access UE) and a multi-access network (e.g., NANs 1131-1133 of FIG. 11) for enhanced bandwidth and reliability. The rise of edge computing inspires a new multi-access traffic convergence model: converging multi-access traffic at the edge with an intelligent traffic manager that distributes packet across multiple paths to achieve better QoS. Emerging data-driven AI/ML techniques can be used to develop multi-access traffic distribution strategies.

The present disclosure considers reinforcement learning (RL) approaches that learn policies and/or parameters for traffic management and/or for distributing multi-access traffic through interacting with the environment. However, bad actions during exploration and early training stage for online RL may cause severe performance degradation. In cellular networks, possible consequences can be failure to fulfill service-level agreement, or damage to user experience, such as connection interruption and outage. The present disclosure provides artificial intelligence (AI) and/or machine learning (ML) techniques for multi-access traffic management. The present disclosure provides various mechanisms to enhance/improve and/or ensure performance while applying RL for multi-access traffic management Existing solutions include [AC6833PCT], which describes model-based solutions based on network utility optimization for multi-access traffic distribution. Other previous/existing solutions for multi-access traffic management require a predefined policy. For example, a TCP layer or application layer approach specifies a policy beforehand, such as multi-path TCP (MP-TCP) and Quick UDP (QUIC). There are no other solutions that use an RL-based approach for multi-access traffic distribution problem or solutions to mitigate potential performance degradation during exploration when applying RL for wireless network problems. Performance of model-based solutions are highly dependent on the accuracy of the model itself. Also, such solutions require accurate and extensive observation from the environment to achieve good performance. This may be impractical in many network deployment settings.

The present disclosure provides mechanisms for performance (network performance) assurance while applying reinforcement learning for multi-access traffic management. In particular, RL and/or DRL is used to determine traffic distribution strategies for multi-access traffic management. The present disclosure discusses (1) guided exploration, (2) enforcing safety action space, (3) performance monitoring, and (4) opportunistic exploration test flows. Data-driven AI/ML techniques have the potential to better adapt to different radio environments and improve performance. The embodiments herein minimize the risk of performance degradation during online learning, thereby improving network resource consumption efficiencies.

The AI/ML traffic management techniques discussed herein can be used for realizing edge/cloud RAN intelligence that can potentially offer unprecedented QoS improvements and enhancements. Specific implementations of the embodiments herein can be provided by various standards and/or specification such as ETSI, 3GPP, O-RAN Alliance, Open RAN, Open Network Edge Services Software (OpenNESS), and/or the like. For example, code/APIs, message format, and message exchange signaling between edge/cloud server and RAN nodes can be specified in such standards/specifications.

Figure 4:
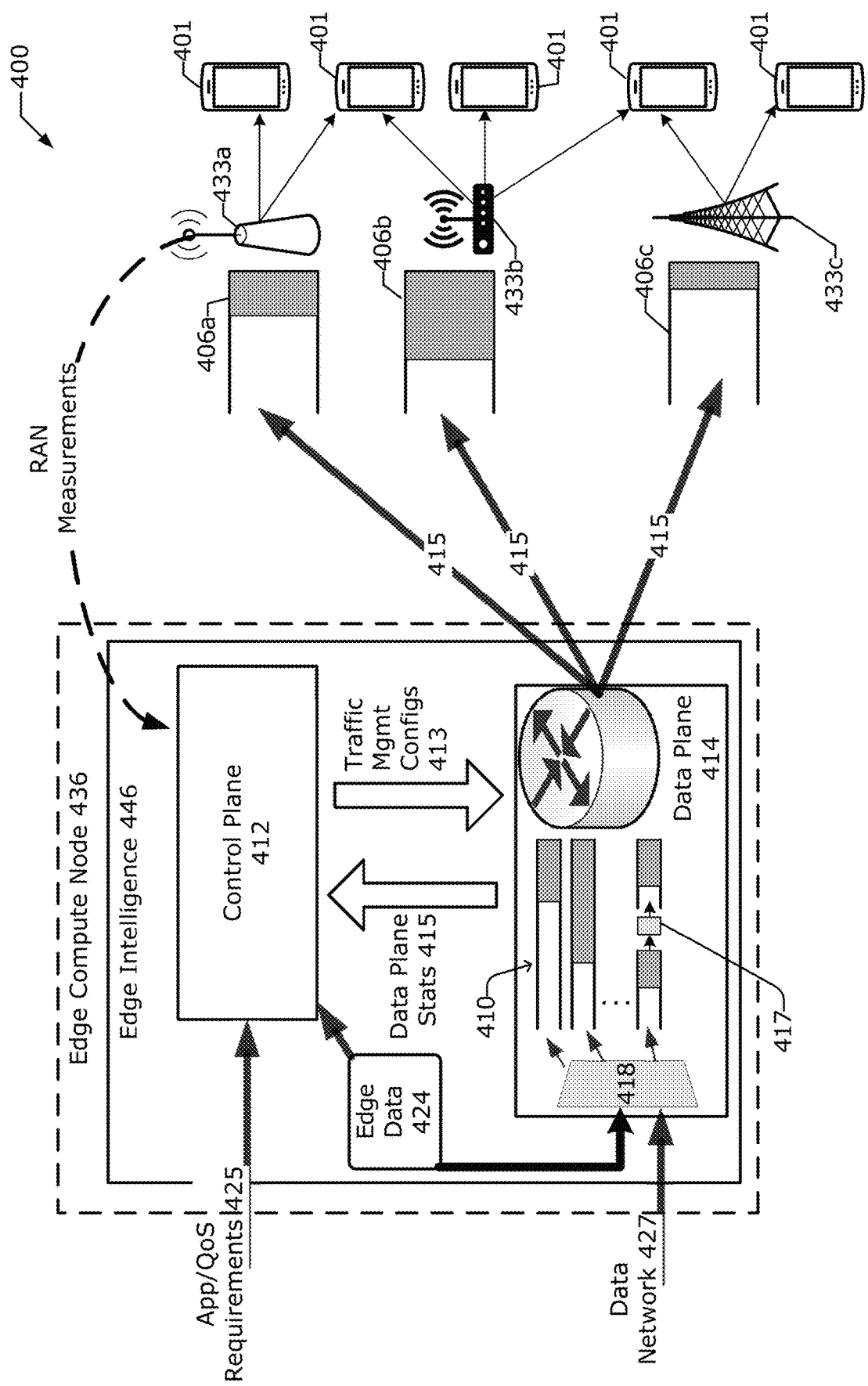
FIG. 4 depicts an example Edge-based Multi-Access Traffic Management Framework.

FIG. 4 depicts an example edge-based multi-access traffic management framework 400. In this example, UEs 401 with multiple radio interfaces can simultaneously establish more than one connection to the edge network including heterogeneous radio access technologies (RATs) (e.g., LTE, 5G/NR, WiFi, etc.) as last-hop connectivity. UEs 401 may be the same or similar as the UEs 101 discussed previously, and/or UEs 1111, 1112 discussed infra.

Drastically increasing demand for wireless data and devices has led to an increasing requirement for both peak rates and area spectral efficiency. This, in turn, has led to an increasingly denser and heterogeneous deployment of wireless infrastructure, where the deployed networks are disparate in various features, such as access technology (RAT), coverage area per access network node, deployed frequency band and bandwidth, and backhaul capabilities. As a result, most of the UEs 401 in a dense wireless network are usually located in overlapping coverage areas of multiple access network nodes of differing RATs. UEs 401 with the ability to aggregate traffic from multiple radio links or RATs (e.g. 5G, LTE, WLAN, WiMAX, Bluetooth®, etc.) can leverage multi-link aggregation to boost their throughput and QoS. The rise of heterogeneous wireless network (HetNet) deployments with mixed topologies and different RATs along with UEs 401 with multiple radio interfaces being commonplace, have opened up opportunities to increase the network throughput and reliability by transmitting and aggregating traffic from multiple RATs.

Edge computing technologies can support applications with low latency requirements and/or high QoS requirements (e.g., AR/VR, cloud gaming, and the like) by placing the distributed computing and storage resources in proximity to data providers and consumers. One such emerging edge computing technology is Multi-access Edge Computing (MEC) (see e.g., [MEC003]). An example edge network 400 is shown by FIG. 4 and may correspond to edge cloud 1210 of FIG. 12 and/or the edge computing system configurations depicted in FIGS. 11-24.

Figure 11:
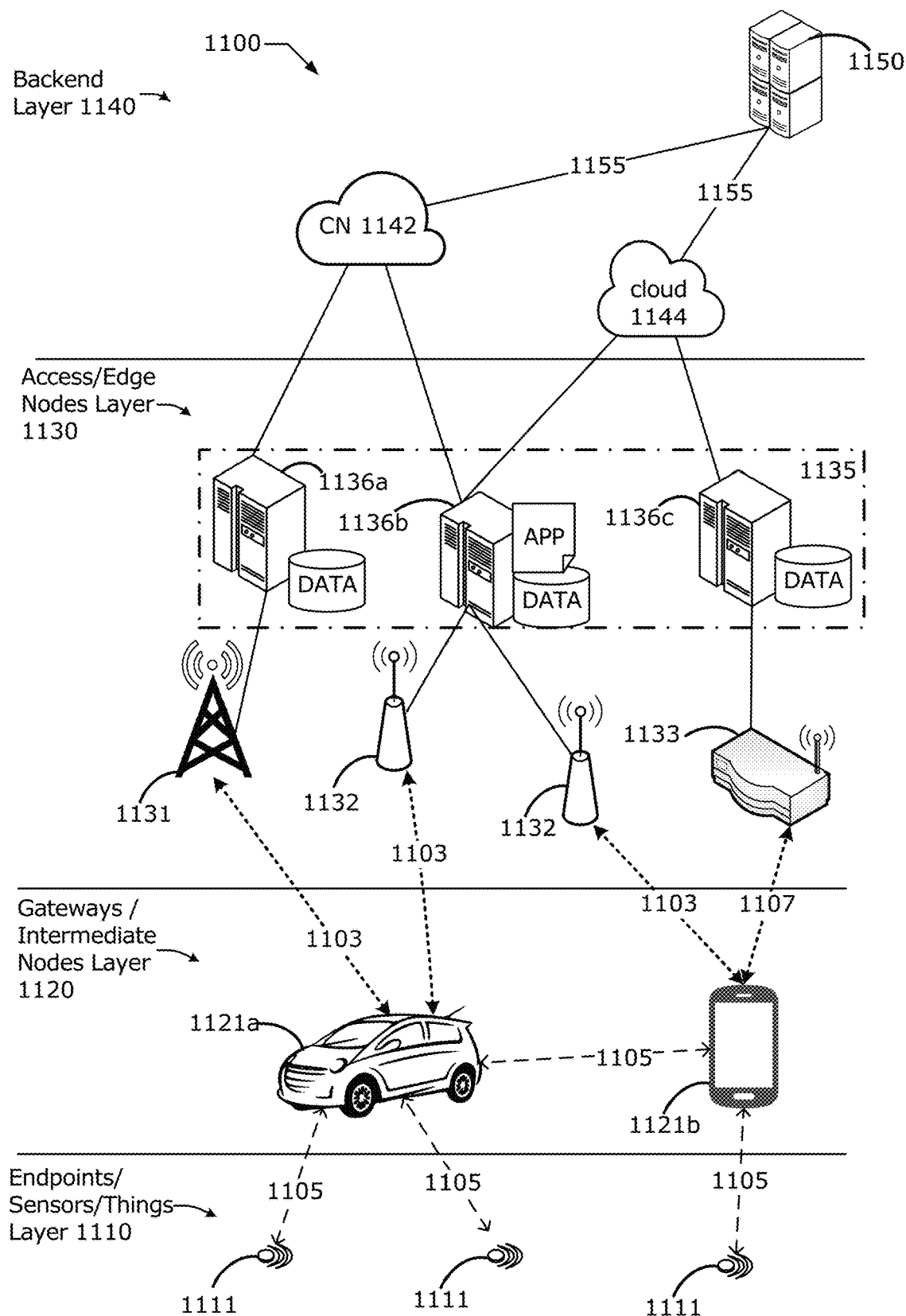
FIG. 11 illustrates an example edge computing environment.

The framework 400 includes UEs 401, which are computing systems/devices within an edge computing network 400 that offload computational workloads/tasks to edge compute node 436 or otherwise obtain services from the edge computing network and/or a cloud system (see e.g., cloud 1144 of FIG. 11). The edge network includes edge compute node 436 (or edge server 436), which is one or more computing systems or servers from which the compute nodes 401 consume services. The edge server 436 may be co-located with one or more NANs 433a, 433b, or 433c (collectively referred to as "NAN 433" or "NANs 433"), which may be the same or similar as any of NANs 130 discussed previously and/or NANs 1131, 1132, 1133 of FIG. 11. Respective connections 415 may connect or communicatively couple the edge compute node 436 with one or more NANs 433. Furthermore, the compute nodes 401 may obtain services from cloud system over licensed access or unlicensed access via a core network (including core network (CN) server(s)). The licensed access is represented by a series of connections/links making up respective paths and the unlicensed access is represented by a series of connections/links making up respective paths). The some channels/connections may be used for either licensed or unlicensed access.

The edge compute node 436 is a physical computer system(s) that may include an edge platform and/or virtualization infrastructure, and provides compute, storage, and network resources to edge computing applications. The edge server 436 is disposed at an edge of a corresponding access network (e.g., networks provided by individual NANs 433), and provides computing resources and/or various services (e.g., computational task and/or workload offloading, cloud-computing capabilities, IT services, and other like resources and/or services as discussed herein) in relatively close proximity to network subscribers (e.g., compute nodes 401 also referred to as "UEs," "edge users," and/or the like). The virtualization infrastructure (VI) of the edge server 436 provides virtualized environments and virtualized resources for the edge hosts (e.g., edge server 436), and the edge computing applications may run as VMs and/or application containers on top of the VI. The edge compute node 436 may correspond to edge compute nodes 1136 of FIG. 11 within edge system/network 1135 of FIG. 11.

Figure 18:
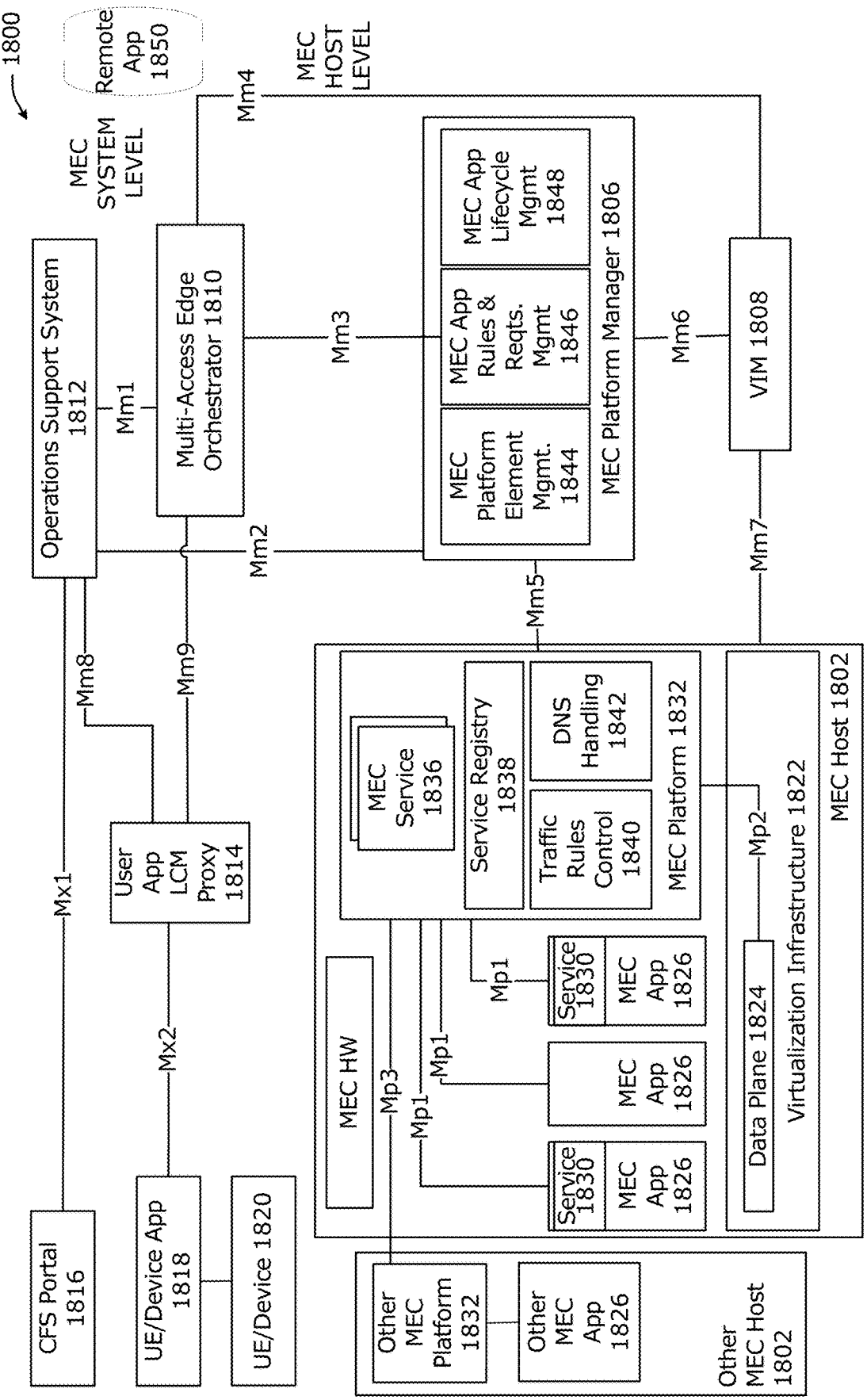
FIG. 18 illustrates a MEC system reference architecture.
Figure 19:
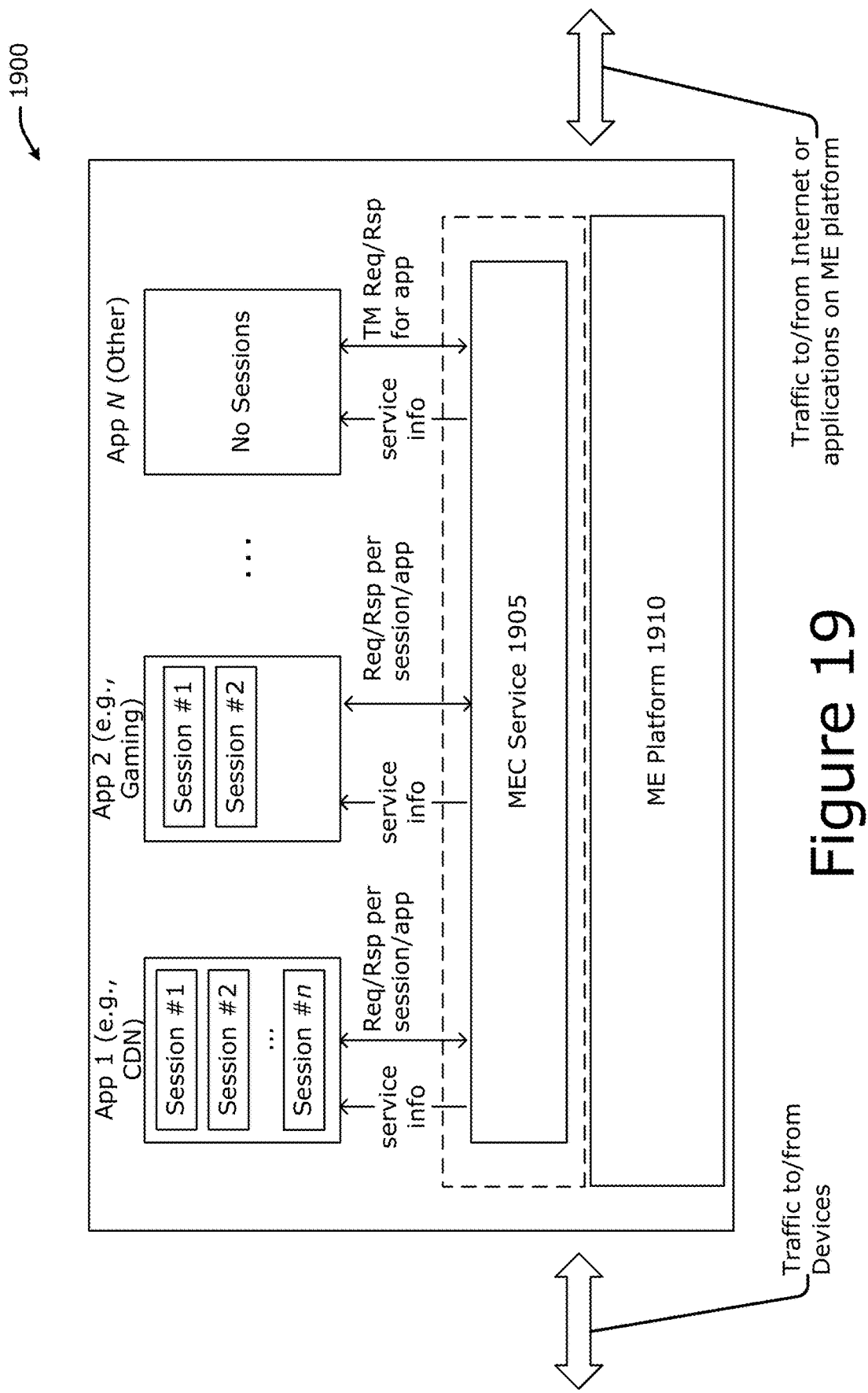
FIG. 19 illustrates an example MEC service architecture.

One example implementation of the edge system/network 400 is a Multi-access Edge Computing (MEC) system/framework, where the edge server 436 is implemented as a MEC host according to the MEC architectures (see e.g., FIGS. 18-19 discussed infra and/or FIGS. 25 to 41 of U.S. Provisional App. No. 63/003,834 filed Apr. 1, 2020 ("[AC6833Z]"), the contents of which are hereby incorporated by reference in their entirety). MEC is a network architecture that allows cloud computing capabilities and computing services to be performed at the edge of a cellular network, including application computation offloading. MEC provides mechanisms that allow applications to be run and to perform related processing tasks closer to network subscribers (also referred to as "edge users," "edge compute nodes," "edge nodes," or the like). The MEC hosts(s) execute computing services (e.g., "edge services" and/or "microservices"). In this way, network congestion may be reduced and applications may have better performance. MEC technology is designed to be implemented at the cellular base stations, and may enable flexible and rapid deployment of new applications and services for subscribers. Combining elements of information technology and telecommunications networking, MEC also allows cellular operators to open their RANs to authorized third-parties, such as application developers and content providers. Other edge network implementations may be used in other embodiments.

When a compute node 401 has multiple radio interfaces (or multiple communication chips/circuitries), the compute node 401 can transmit and/or receive data through multiple paths. This means that there can be different multi-radio or multi-path convergence points to aggregate and/or distribute traffic between e2e communication link(s). According to various embodiments, when a compute node 401 has multiple radio interfaces, a new multi-radio convergence point can take place at the edge of the network to offer multi-path traffic management for low latency communication as envisioned for 3GPP 5G/NR networks (see e.g., FIGS. 23 to 41 of [AC6833Z]). With new intelligence enabled by edge-computing, multi-RAT deployments can be utilized more efficiently by cleverly distributing traffic to multiple network paths based on edge measurements In some implementations, the edge compute node 436 and UEs 401 can utilize a suitable convergence technology (e.g., Zhu et al., "Generic Multi-Access (GMA) Convergence Encapsulation Protocols," IETF INTAREA/Network Working Group, version 7, (17 May 2020) ("[GMA]")), at the data plane to distribute and aggregate traffic over multiple paths. Another example is that UEs 401 can establish dual connectivity as specified in 3GPP and the edge intelligence resides in a CU (see e.g., 3GPP TS 37.340 v 16.4.0 (2021 Jan. 6) ("[TS37340]")).

Computing power offered by edge compute node 436 can be leveraged to realize intelligent multi-access traffic management. An intelligent multi-access traffic manager 446 located at the edge 436 computes traffic distribution rules (e.g., traffic management configurations 413 in FIG. 4) at the control plane 412, which are provided to the data plane 414 and UEs 401 to inform the data plane 414 and the UEs 401 about how to route packets over the multiple paths. The traffic distribution control plane 412 collects feedback from wireless infrastructure (e.g., RAN measurements from one or more NANs 433) and/or directly from users (e.g., UE measurements from one or more UEs 401), incorporates data flow/App/QoS requirements 425 provided by higher layer(s), and gathers telemetry statistics 415 from the data plane 414 to determine how data flows should be routed over the multi-paths in order to meet heterogeneous QoS targets. Additionally or alternatively, the traffic distribution control plane 412 collects performance indicators from one or more network functions (NFs) in a core network (e.g., CN 1142 or the like). Edge data 424 and data network data 427 are provided to the data plane 414, filtered by a packet filter 418, and sorted into one or more QoS (data flow) queues 410. A network coding engine 417 may also be used to route data from the data flows (queues 410) over the multi-paths.

In one example implementation, the intelligent traffic distributor 446 can be part of a Multi Access Management Services (MAMS) server (see e.g., Kanugovi et al., "Multi-Access Management Services (MAMS)", Internet Engineering Task Force (IETF), Request for Comments (RFC) 8743 (March 2020) ("[RFC8743]")). In another example implementation, the intelligent traffic distributor 446 can be part of a CU of a CU/DU-split architecture of cellular RAN handling dual connectivity.

In O-RAN framework (see e.g., FIGS. 20-24 discussed infra), the traffic distributor control plane that calculates traffic distribution rules can be part of the RAN intelligence controller (RIC). Emerging data-driven machine learning (ML) techniques can be used to develop advanced multi-access traffic distribution strategies such as those discussed previously in section 1 and/or discussed in [AD2644-Z].

FIGS. 1a and 1b show an example architecture 100 of a model-free deep reinforcement learning framework for multi-access traffic management (DRL-MTM). In FIGS. 1a and 1b, the agent of DRL-MTM is located at an edge compute node 436, such as a MEC server/host, a RAN intelligent controller (RIC) as defined in O-RAN Alliance, and/or some other edge compute node such as those discussed herein. The environment 100x that the agent 140 will interact with is a multi-access network where there are UEs 101 (or UEs 401) with multiple radio interfaces are capable of connecting with multiple RANs 130 (or RANs 433), one or more of which utilize different radio access technologies (RATs). Referring to FIG. 1b, the agent 140 is responsible for deciding the traffic steering/splitting strategy for each multi-access UEs 101 (or UEs 401) based on the observation(s) collected from the environment 100x. After performing the traffic steering/splitting strategy recommended by the agent 140, new observation can be collected from the environment 100x and a reward r can be calculated according to an engineered reward function as discussed herein.

Figure 5:
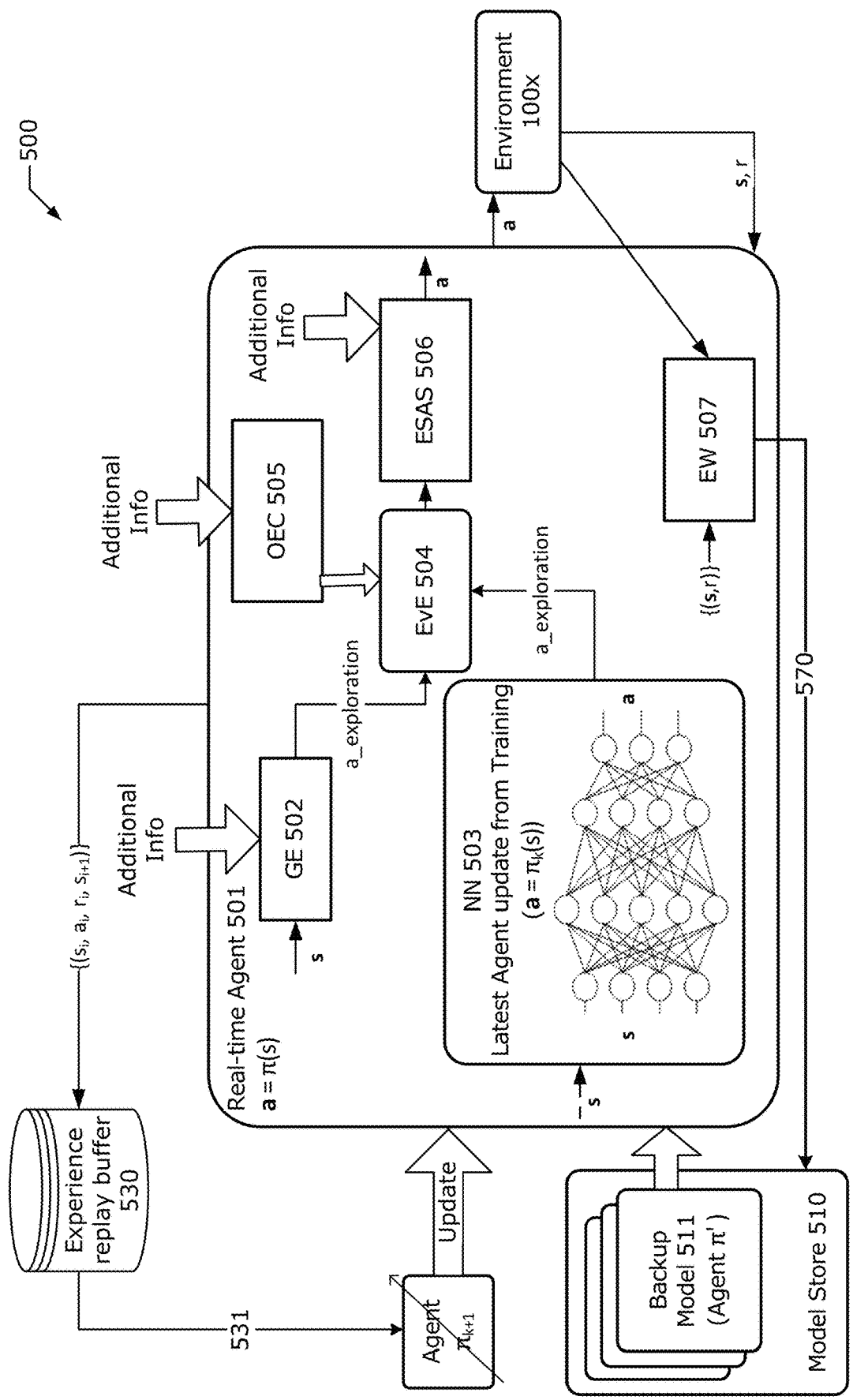
FIG. 5 depicts an example performance assurance for reinforcement learning architecture.

Online RL requires exploration with real-life cellular networks, which may risk failure to fulfill service-level agreements (SLAs) and/or degrade user experience (UX) based on, for example, connection interruptions and outages. The present disclosure provides the following strategies to minimize the risk of performance degradation during the online training phase in RL for multi-access traffic management: guided exploration; enforce safety action space; performance monitoring (model monitoring); and opportunistic exploration test flows FIG. 5 illustrates example framework 500 for providing the performance assurance mechanisms for RL. The framework 500 includes an Environment (e.g., environment 100x) provides a state s to the real-time agent 501. The real-time agent 501 includes a guided exploration mechanism (GE) 502, a neural network (NN) 503, an exploitation-versus-exploration mechanism (EvE) 504, an opportunistic exploration control mechanism (OEC) 505, an enforce safety action space mechanism (ESAS) 506, and an early warning mechanism (EW) 507.

The real-time agent 501 determines an action a by applying the state s to a policy π (e.g., a=π(s) where "π(s)" is an action taken in state s under deterministic policy π). The state s is provided to the GE 502, which outputs an exploration action ("a_exploration") based on the state s and additional information, and feeds the a_exploration to the EvE 504. The GE 502 may employ one or more suitable exploration algorithms such as, for example, random exploration (e.g., epsilon-greedy, softmax function, etc.), curiosity based exploration, upper confidence bounds (UCB), Boltzman exploration, Thompson sampling, entropy loss term, noise-based exploration, intrinsic reward (bonus) exploration (e.g., count-based exploration, prediction-based exploration, etc.), optimism in face of uncertainty exploration, Hoeffding's inequality, state-action exploration, parameter exploration, memory-based exploration (e.g., episodic memory exploration, direct exploration, etc.), Q-value exploration, and/or the like. Additional or alternative aspects of the GE 502 is discussed infra in section 2.1. The state s is also provided to the NN 503 to obtain a latest Agent update from training (e.g., $a = \pi_k(s)$), which also outputs an exploration action ("a_exploration") that is provided to the EvE 504.

The EvE 504 determines an appropriate strategy by balancing exploitation options and exploration options based on the a_explorations it obtains. Exploitation involves making the best (optimal) decision given the currently available information, whereas exploration involves collecting information about unknown options even where there are risks involved in collecting that information. Here, the best (optimal) long-term strategy may involve short-term sacrifices (in terms of the amount of reward to be obtained). This is because the actions taken will affect the new observations that will be obtained in a next iteration. For the exploitation v. exploration analysis, the EvE 504 can implement a multi-armed bandit algorithm, such as the techniques discussed in Wu et al., "Adaptive Exploration-Exploitation Tradeoff for Opportunistic Bandits", Proceedings of the 35th International Conference on Machine Learning (ICML 2018), pp. 5306-5314, Stockholmsmässan, Stockholm Sweden, (30 Nov. 2018). Additional or alternative aspects of the EvE 504 is discussed infra in section 2.2.

The OEC 505 provides configurations and/or controls (based on additional information) to the EvE 504, and the EvE 504 analyzes the a_explorations based on the configurations and/or controls. For example, the OEC 505 may refine the action space (or set of potential actions) based on the external information. Additional or alternative aspects of the OEC 505 is discussed infra in section 2.4. The analyzed a_explorations are provided to the ESAS 506, which produces the action a that is provided back to the environment. The ESAS 506 performs a safety check before any update to system configurations is deployed (e.g., before a selected action is deployed to one or more UEs 401). The ESAS 506 may be in the form of an acceptable range of actions or a set of constraints described by linear or non-linear functions of the actions.

Additionally, the EW 507 obtains the state s and reward r (if any) and provides indication 570 to back-up model store 510 if performance measurements indicate that the action(s) a are drifting towards sub-optimal performance outcomes. In response to the indication 570, a back-up model 511 is selected and provided to the real-time agent 501 to replace a currently implemented model (e.g., NN 503). Additional or alternative aspects of the EW 507 is discussed infra in section 2.3.

Additionally, a current state $s_i$, current action $a_i$, current reward $r_i$, and a next state $s_{i+1}$ may be stored in an experience replay buffer 530. The replay buffer 530 is a buffer of past experiences, which is used to stabilize training by decorrelating the training examples in each batch used to update the NN 503. The replay buffer 530 records past states $s_i$, the actions $a_i$ taken at those states $s_i$, the received reward $r_i$ from those actions $a_i$, and the next state $s_{i+1}$ that was observed. The replay buffer 530 stores this data as a collection of experience tuples ($s_i$, $a_i$, $r_i$, $s_{i+1}$). The tuples are gradually added to the replay buffer 530 as the agent 501 interacts with the environment 100x. Additionally, the replay buffer 530 could also save a goal in addition to the experience tuples. One implementation is a replay buffer 530 of fixed size, with new data added to the end of the replay buffer 530 so that it pushes the oldest experience out. Other buffer/queue implementations may be used as well including caching systems and the like. The replay buffer 530 (or the data stored therein) can be used to prevent action values from oscillating or diverging catastrophically by buffering past experience and sampling (training) data 531 from the replay buffer 530, instead of using the latest experience. The act of sampling a small batch of tuples 531 from the replay buffer 530 in order to learn is known as experience replay. In addition to breaking harmful correlations, experience replay allows enables learning from individual tuples multiple times, recalling rare occurrences, and in general making better use of experience. Here, the sample (training) data 531 is provided to the agent 501 for a next epoch or episode (e.g., Agent $\pi_{k+1}$), which is then used to update the agent 501.

In O-RAN framework implementations (see e.g., FIGS. 20-24), the real-time agent is located at near-real-time (RT) RIC. Model training is located at non-RT RIC for off-line RL or at near-RT RIC for on-line RL. The real-time agent can be implemented as a single xApp integrating RI, inference model with the four performance assurance mechanisms mentioned previously. Alternatively, real-time agent can be implemented as multiple xApps where the four performance assurance mechanisms communicate with each other and the RL inference model via xApp APIs.

2.1. Guided Exploration

RL uses a trial-and-error strategy to learn a policy to react to observed system conditions. By interacting with the environment and observing the outcome from past actions, the RL agent 501 adapts its policy $\pi$ so that the expected long-term reward is maximized. However, the RL agent 501 cannot react well to situations that it did not experience previously. In order to test as many possible situations, the RL agent 501 is usually allowed to occasionally take exploration actions that are different from the optimal policy produced by RL. The risk is that a bad exploration action may result in catastrophic performance degradation. For example, in the multi-access traffic management use case, a bad exploration action may lead to congestion on one access link that causes a long queue (e.g., queue 410 in FIG. 4) to accumulate data, and degrade latency performance for a long period of time.

According to various embodiments, instead of randomly determining an action, the exploration actions (a_exploration) for RL are selected with some guidance. For multi-access traffic management, the exploration actions for RL can be chosen using existing non-ML algorithms or using pre-trained ML algorithms.

The existing non-ML algorithms, such as rule-based or model-based heuristic algorithms, to generate a suggested set of actions to be chosen for exploration (e.g., the output of GE 502). For example, traffic distribution rules determined by solutions developed in [AC6833PCT] and/or [AC6833Z] can be used as the guided exploration actions.

The pre-trained ML algorithms to generate a suggested set of actions to be chosen for exploration, such as one or more of the exploration algorithms discussed previously. The pre-trained ML algorithms can be trained based on data collected from different network environments. The pre-trained ML algorithms can also be an action prediction model trained through supervised learning.

The non-ML algorithms and/or the pre-trained ML algorithms may be implemented as a separate microservices (e.g., xApp(s) in O-RAN) and the RL agent 501 can subscribe those services to obtain recommended traffic distribution actions. The recommended traffic distribution actions can be shared via API. Additionally or alternatively, the RL agent 501 may add extra randomness to the guided actions for exploration. For example, a small random variation can be added to the guided action recommended by non-ML or ML algorithms.

2.2. Enforce Safety Action Space

As mentioned previously, a bad action may result in catastrophic performance degradation. For RL, a bad action may be taken for exploration purpose or because the RL algorithm has not converged to a good enough solution. To prevent the risk of significant performance loss, extra protection should be taken while performing an action determined by the RL algorithm. Specifically, every action to be taken should pass a safety check (e.g., ESAS 506) before any update to system configuration is performed. For multi-access traffic management, a safety action space (e.g., ESAS 506) can be constructed where the action space defines the criteria that the traffic distribution rules generated by the RL algorithm must satisfy. The safety action space criteria can comprise one or more of the following formats:

Acceptable range of actions: For multi-access traffic management, an acceptable range of actions can be the range of traffic distribution ratio of a data flow over an individual path. The ratio of traffic belonging to flow i to be routed over path r is denoted as $x_{i,r}$. An example safety bound can specify a lower bound and an upper bound for $x_{i,r}$ (e.g., $x_{LB} \leq x_{i,r} \leq x_{UB}$). The safety range can be based on guided action produced by non-ML and/or other ML algorithms as described previously. For example, suppose the guided action for steering flow i to over path r is $x_{i,r}^{(g)}$. The safety range can be $x_{i,r}^{(g)} - \delta \leq x_{i,r} \leq x_{i,r}^{(g)} + \delta$, where $\delta$ is a predetermined or configured safety margin.

A set of constraints described by linear or non-linear functions of the actions: For multi-access traffic management, expected QoS metrics may be estimated via some mathematical models. Those models can be used to estimate whether the action produced by RL can satisfy QoS targets for the data flow. Example constraint functions include: an expected total radio resource utilization level being below certain threshold; an expected total radio resource utilization level for a set of flows with certain QoS levels is below a threshold; and/or expected data flow throughput is above certain threshold.

The safety constraints can be provided via A1-policy from non-real-time RIC or provided by another xApp via an xApp API. Additionally or alternatively, action safety can be enforced by near-RT RIC platform management module or by another xApp (e.g., ESAS 506). For example, in framework 500 of FIG. 5, an action a produced by the RL agent 501 is sent to the ESAS 506, and the ESAS 506 determines whether to accept and perform the recommended action a from the RL agent 501. The ESAS 506 may be implemented as an xApp or some other type of edge application. Additionally or alternatively, the safety check can be incorporated within the RL agent 501.

2.3. Performance and/or Model Monitoring

The time-varying nature of the wireless environment and user traffic dynamic makes it challenging to ensure the predetermined safety check criteria is always accurate. Therefore, it requires extra performance monitoring mechanism to avoid catastrophic performance degradation from inferior actions produced by RL agent.

Here, an early warning mechanism (e.g., EW 507) is implemented together with online RL in order to detect whether the model generated by RL is drifting towards sub-optimal solutions. In addition to traditional AI/ML model monitoring metrics, performance measurements reflecting wireless network conditions can provide more insightful indication for model effectiveness. For multi-access traffic management, the following metrics can be used to monitor the performance of the AI/ML model generated by RL to trigger early warning: average value of one way or e2e delay for one or more data flow(s); delay variation trends; buffer (e.g., queue 410) accumulation; CQI variation trends; MCS distribution trends; and/or the like. A threshold linked to one of the performance metrics can be provided to the EW 507 via A1-policy from non-RT RIC or via xApp API from near-RT RIC management module or another xApp.

The RL training agent 501 keeps at least one copy of at least one previously trained AI/ML model that provided reasonably good performance as back-up (e.g., back-up models 511 in model store 510). Additionally or alternatively, the RL training agent 501 can keep the last K versions of one or more AI/ML models created during online training. Once the metrics for performance monitoring violates (or exceeds) a corresponding threshold, the RL training agent 501 can replace current model 503 with one of the past trained (back-up) AI/ML models 511 providing satisfactory performance guarantee and restart online RL from that model 511.

2.4. Opportunistic Exploration Test Flows

Though applying guided exploration 502 and enforcing safety action space 506 can prevent the RL agent 501 from outputting actions a that are likely to cause poor performance, restriction of the action space may result in data deficiency to cover all possible statistical scenarios and could lead to sub-optimal RL solutions. Accordingly, an opportunistic exploration mechanism 505 is used to test more risky actions when there is no risk to hurt UEs 101 and/or flows sensitive to the target QoS metric(s).

In some implementations, the OEC 505 only applies more risky actions to (1) testing flows and/or (2) data flows with less stringent QoS targets. Additionally or alternatively, to avoid hurting the performance of other flows with high QoS requirements, the OEC 505 performs such exploratory actions when (1) there is performance assurance in place to guarantee the QoS for high QoS flows and/or (2) there is no ongoing transmission of high QoS data flows.

3. Deep Contextual Bandit Reinforcement Learning in Multi-Access Traffic Management Services The emergence of edge computing enables new convergence point for different wireless access technology. As the edge network will move closer to the radio access network (RAN) to meet the delay requirement of new applications, intelligent multi-access traffic management strategies can be developed at or by edge compute nodes (e.g., multi-access computing (MEC) servers/hosts) to meet the diverse UE quality-of-service (QoS) requirement, as shown by FIG. 1a, where many UEs 101 can have multiple radio interfaces, and can access multiple RANs and/or RAT types (e.g., LTE, 5G/NR, WiFi, WiMAX, Bluetooth®, DSL, etc.). The present disclosure provides artificial intelligence (AI) and/or machine learning (ML) techniques for multi-access traffic management. In particular, embodiments herein include deep contextual bandit RL for intelligent traffic management for edge networks.

Previous/existing solutions include [AC6833PCT], which describes model-based solutions based on network utility optimization for multi-access traffic distribution. Other previous/existing solutions for multi-access traffic management require a predefined policy. For example, a TCP layer or application layer approach specifies a policy beforehand, such as multi-path TCP (MP-TCP) and Quick UDP (QUIC). However, the previous/existing solutions rely on mathematical model or pre-defined control policy. Performance of model-based solutions are highly dependent on the accuracy of the model itself. Also, such solutions require accurate and extensive observation from the environment to achieve good performance. This may be impractical in many network deployment settings.

The embodiments herein leverage recent development in AI/ML to develop a model-free approach to learn the best/optimal strategy for traffic management by interacting with the environment and collecting runtime statistics without relying on optimization models or predefined policies. In section 1 and [AD2644-Z], RL for traffic management is accomplished by modeling the wireless multi-RAT network interaction as Markov decision process.

Discussed infra is a deep contextual bandit RL architecture for multi-access traffic management. In some implementations, the deep contextual bandit RL architecture comprises three components, including: (1) representation learning, where latent features are extracted from raw contexts (e.g., observation from a wireless environment 100x and/or other contextual information); (2) DRL, where an agent derives a policy based on a reward and outputs from the representation learning; and (3) design of states, action, and reward for the intelligent traffic management embodiments. In some implementations, the deep contextual bandit RL architecture involves one or more edge compute nodes (e.g., edge compute node 140 of FIG. 1, edge compute node 1136 of FIG. 11, etc.) implementing one or more of the aforementioned aspects of the deep contextual bandit RL architecture. Embodiments also include e2e training and inference. The AI/ML traffic management, including the deep contextual bandit RL architecture, implementations discussed herein can be used for realizing edge/cloud RAN intelligence that can potentially offer unprecedented QoS improvements/enhancements.

The AI/ML traffic management techniques discussed herein can be a component for realizing edge/cloud RAN intelligence that can potentially offer unprecedented QoS improvements and enhancements. Specific implementations of the embodiments herein can be provided by various standards and/or specification such as ETSI, 3GPP, O-RAN Alliance, Open RAN, Open Network Edge Services Software (OpenNESS) (see e.g., https://www.openness.org/), and/or the like. For example, code/APIs, message format, and message exchange signaling between edge/cloud server and RAN nodes can be specified in such standards/specifications.

Figure 6:
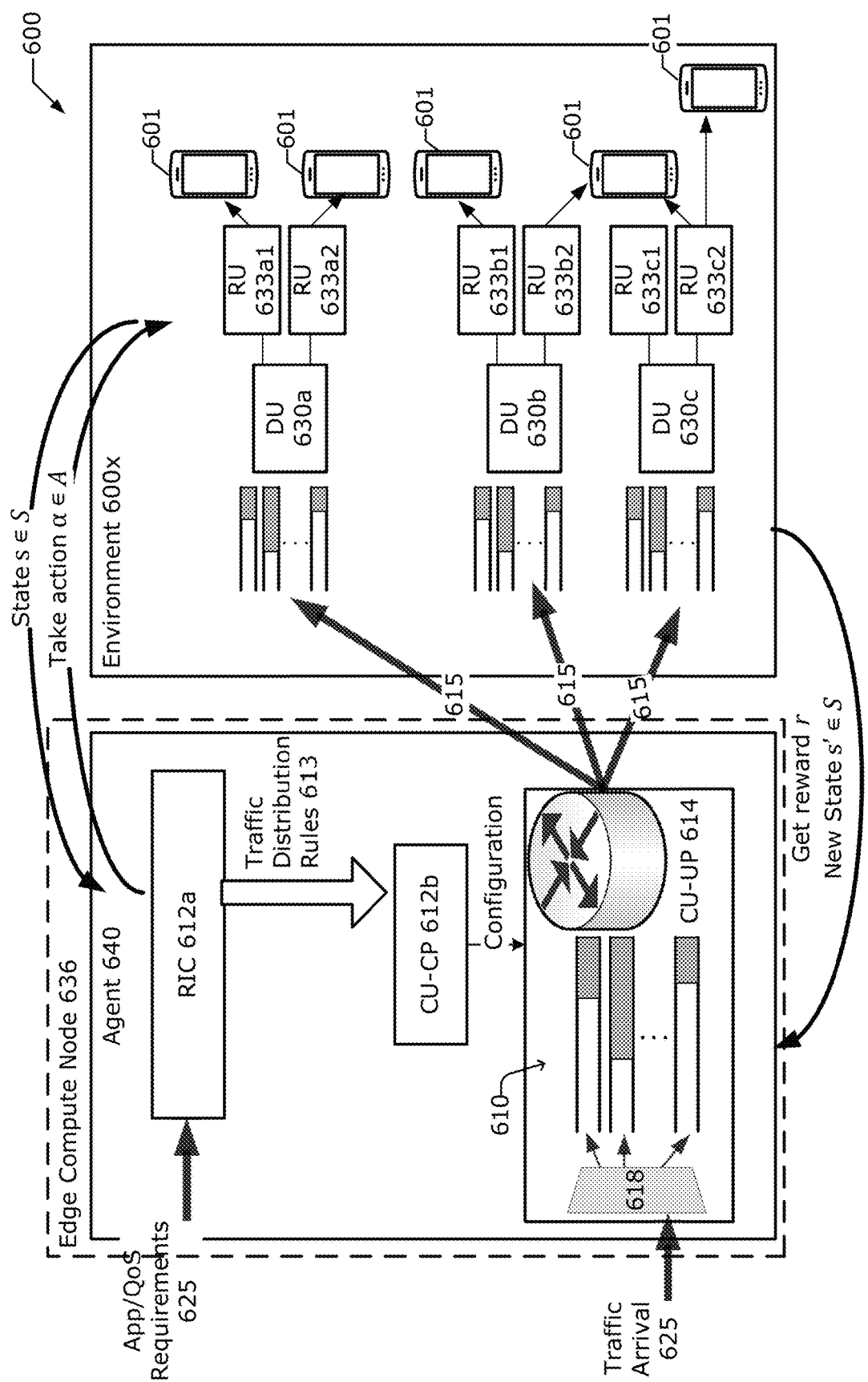
FIG. 6 depicts an intelligent multi-access traffic management architecture.

FIG. 6 depicts an example intelligent multi-access traffic management architecture 600. In various embodiments, the intelligent traffic management agent 640 is located at an edge compute node 636, which may be the same or similar as edge compute node(s) 140 of FIG. 1, edge compute node 436 of FIG. 4, and/or edge compute nodes 1136 of FIG. 11. The environment 600x that the agent 640 interacts with is a multi-access network where there are UEs 601 with multiple radio interfaces connected to multiple RANs, some of which utilize different RATs. Each RAN may include a DUs 630 and one or more RUs 633 (e.g., DU 630a and RUs 633a1 and 633a2 may belong to a first RAN, DU 630b and RUs 633b1 and 633b2 may belong to a second RAN, and DU 630c and RUs 633c1 and 633c2 may belong to a third RAN). The RANs (e.g., DUs 630 and/or RUs 633) in FIG. 6 may correspond to one or more of the NANs 130 of FIG. 1a, NANs 433 of FIG. 4, and/or NANs 1131-1133 of FIG. 11 discussed infra. Additionally, the UEs 601 may correspond to the UEs 101 of FIG. 1a, compute nodes 401 of FIG. 4, UEs 1121a and 1121b and/or IoT devices 1110 of FIG. 11, and/or the like.

The agent 640 is responsible for deciding the traffic management strategies (e.g., action α∈A where A is a set of all possible/potential actions) such as traffic steering and/or traffic splitting strategies for the multi-RAT UEs 601 based on the observations (e.g., state s) collected from the environment 600x. After performing the traffic steering/splitting strategy recommended by the agent 640, new observations can be collected from the environment 600x (e.g., new state s'∈S where S is a set of all states, which may or may not include the terminal state) and a reward r can be calculated according to an engineered reward function.

Figure 20:
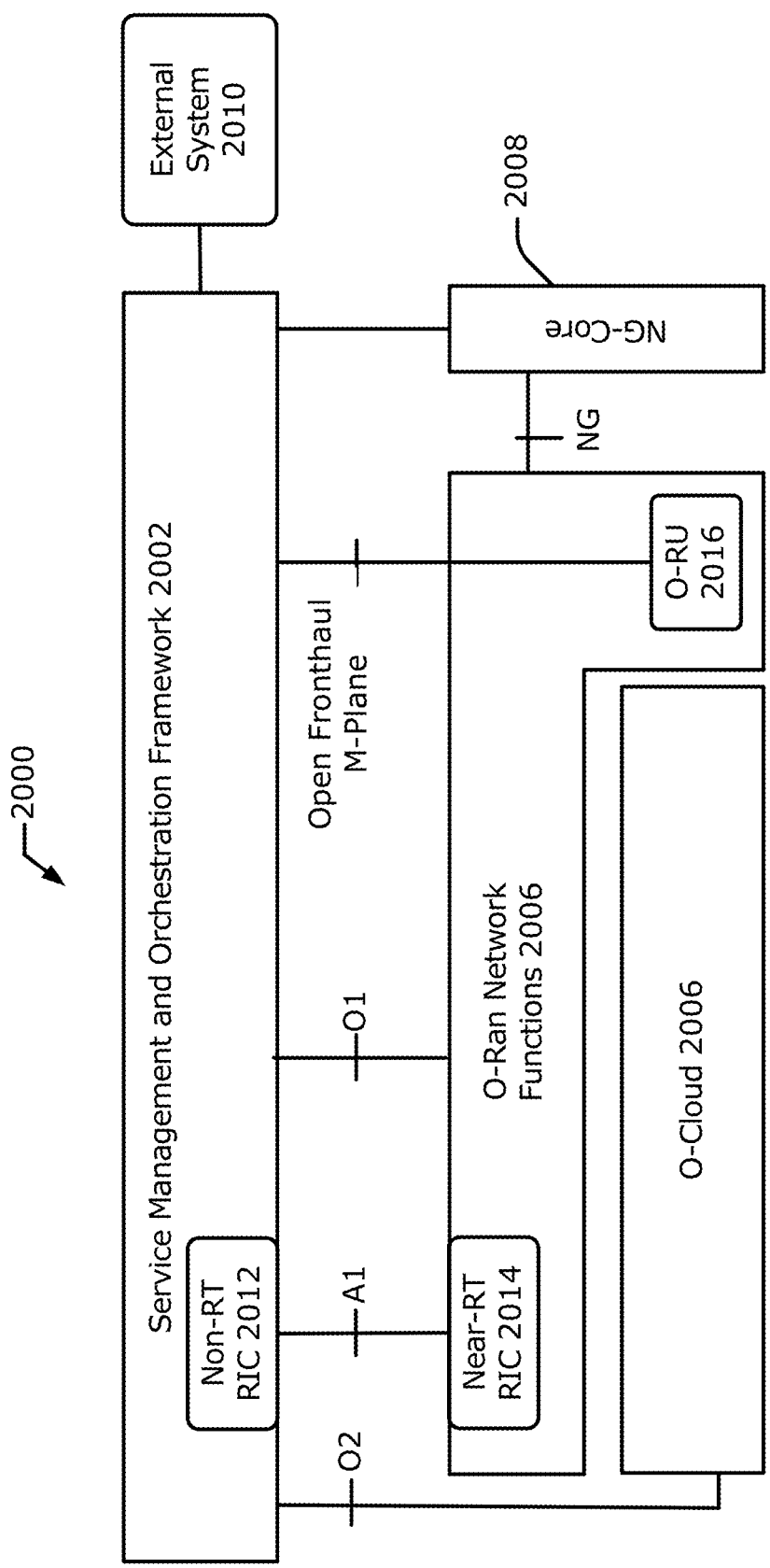
FIG. 20 depicts an Open RAN (O-RAN) system architecture.

The agent 640 located at the edge compute node 636 includes an RAN Intelligent Controller (RIC) 612a (which may correspond to the Non-RT RIC 2012 and/or Near-RT RIC 2014 of FIG. 20 discussed infra) computes traffic distribution rules 613, which are provided to the centralized unit control plane entity (CU-CP) 612b, and the CU-CP 612b informs the centralized unit user plane entity (CU-UP) 614 and the UEs 601 about how to route packets over the multiple paths (e.g., paths between individual UEs 601 and one or more RUs 633). The RIC 612a and/or the CU-CP 612b collect feedback from wireless infrastructure (e.g., RAN measurements from one or more DUs 630 and/or one or more RUs 633) and/or directly from users (e.g., UE measurements from one or more UEs 601), and incorporates data flow/App/QoS requirements 625 provided by higher layer(s) to determine how data flows should be routed over the multi-paths in order to meet heterogeneous QoS targets. Additionally or alternatively, the RIC 612a and/or the CU-CP 612b collect telemetry statistics from the CU-UP 614. Additionally or alternatively, the RIC 612a and/or the CU-CP 612b collect performance indicators from one or more network functions (NFs) in a core network (e.g., CN 1142 or the like). Traffic 625 arrives at the CU-UP 614, is filtered by a packet filter 618, is sorted into respective QoS (data flow) queues 610, and then routed from the data flows (queues 410) over the multi-paths for delivery to corresponding UEs 601 via links 615.

Figure 7:
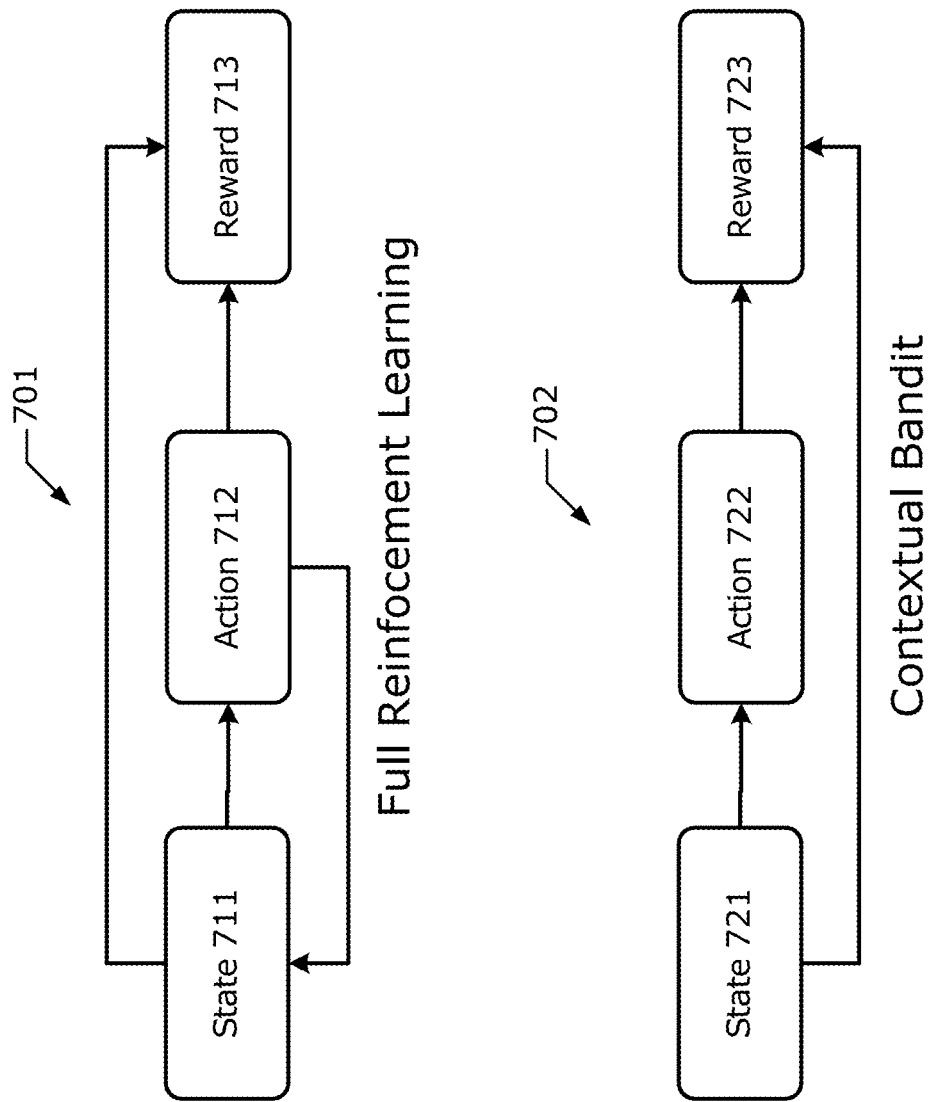
FIG. 7 depicts full reinforcement learning and contextual bandit paradigms.

Referring to FIG. 7, which shows examples of full RL 701 and contextual bandit 702. Usually, RL assumes the underlying environment 600x can be modelled by a Markov Decision Process (MDP). The immediate reward 713 for full RL 701 depends on current state 711 and the action 712 being taken, and the action 712 also affects the next state 711. Since the influence of current action 712 propagates through future states 711, the expected long-term cumulative reward 713 should be used when evaluating the performance of a policy that determines the action 712 to be taken given current state 711 observation. For complete MDP, the state-action space can be very large, hence RL 701 may fail to learn the state 711—action 712—reward 713 mapping, and even forget the learned policy Tr. For these reasons, full RL 701 is often difficult to solve and tends to have poor generalization performance for unseen environments.

According to various embodiments, contextual bandit (CB) 702 (which is one form of RL) is used. In CB 702, the reward 723 is affected by state 721 and action 722 pair, but the action 722 does not affect the future state 721. The goal becomes finding the policy Tr, which can maximize the expected average reward 723 for current state 721 observation.

It has been observed that the multi-RAT/multi-access traffic management problem can be modelled as CB 702 problem as the traffic management decisions and QoS performance can be determined by certain contexts which are not affected by the action 722. By transforming the problem into CB 702, much faster training convergence and much better generalization results for inference can be achieved in comparison with existing solutions.

In the multi-RAT/multi-access traffic management problem based on [AC6833PCT], it has been identified that traffic load, channel condition, backhaul delay, are key features that have fundamental impact on the traffic management decisions and QoS performance. Hence, these features can be used as the context input to the CB 702.

Figure 8:
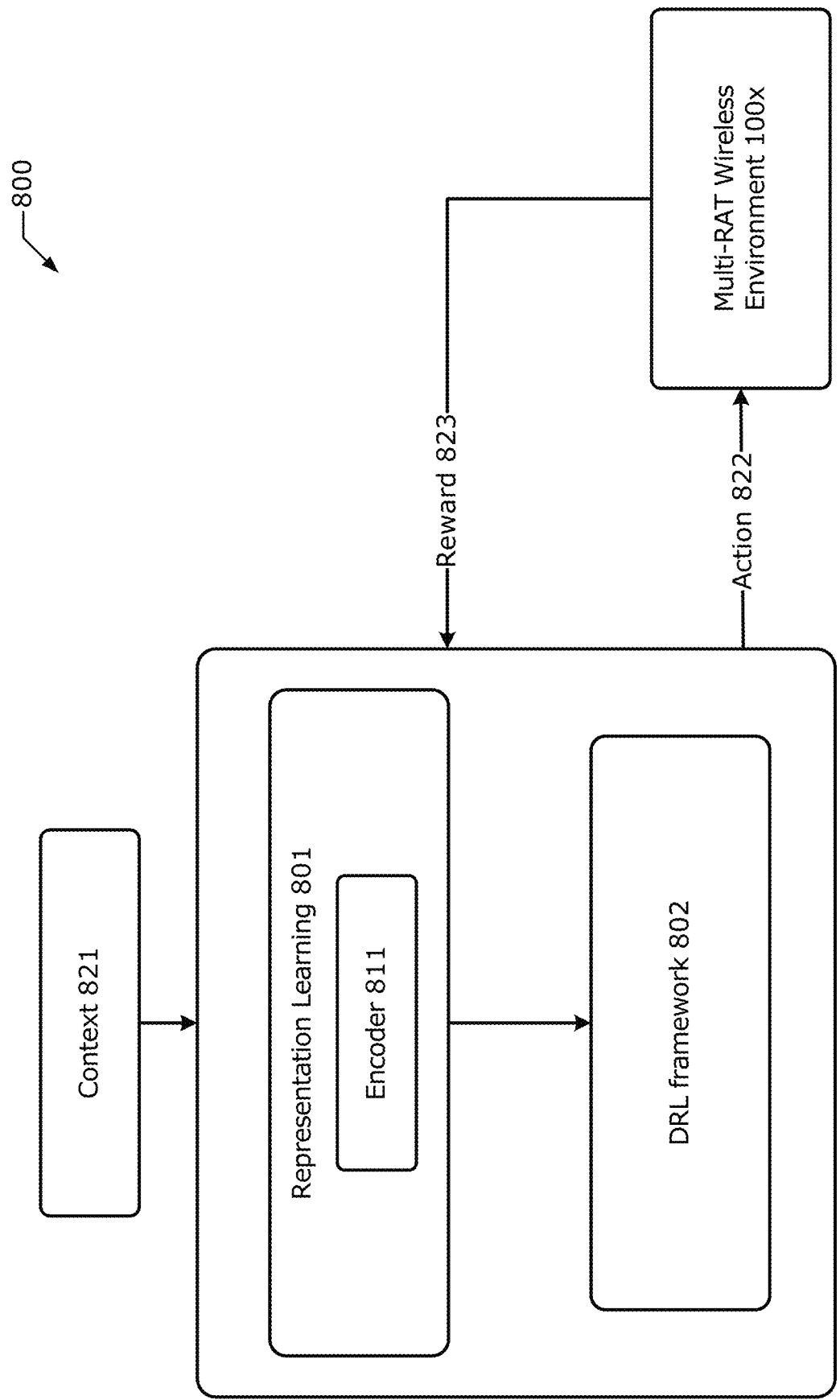
FIG. 8 depicts a deep contextual bandit reinforcement learning framework.

FIG. 8 shows example components of a deep CB RL framework 800, which may be implemented by the agent 640 of FIG. 6. Here, a representation learning entity 801 takes raw contexts (contextual data) 821, and uses an encoder 811 to extract one or more latent features from the raw contexts 821. As examples, the encoder 811 includes one or more of an LSTM network, graph embedding, a graph neural network, an attention network, and/or the like.

The DRL entity 802 takes output from representation learning entity 801 and reward(s) 823 collected by interacting with the environment 100x, and derives a mapping between the state (e.g., based on the raw contexts 821), action 822, and reward 823. In embodiments, the DRL entity 802 uses actor-critic RL and a policy gradient such as deep deterministic policy gradient (DDPG) to derive the mappings.

The design of state 721/821, action 722/822, and reward 723/823 is used to design the context space to be continuous (e.g., time series of traffic load, channel condition, and backhaul delay) or discrete (e.g., average traffic load, channel condition, and backhaul delay). In some embodiments, the action space is designed to be continuous (e.g., traffic splitting ratio). In some embodiments, the reward function may be a utility function of the network QoS target (e.g., network throughput, packet delay, jitter, alpha-fairness, etc.). For example, for latency-sensitive traffic, the reward r can be defined as:

$$r = \frac{1}{\Sigma d_i}$$

where $d_i$ is the end-to-end packet delay for the i-th packet. If the system experiences worse packet delay QoS, the reward r becomes smaller, otherwise, the reward r improves as the delay QoS improves.

Figure 9:
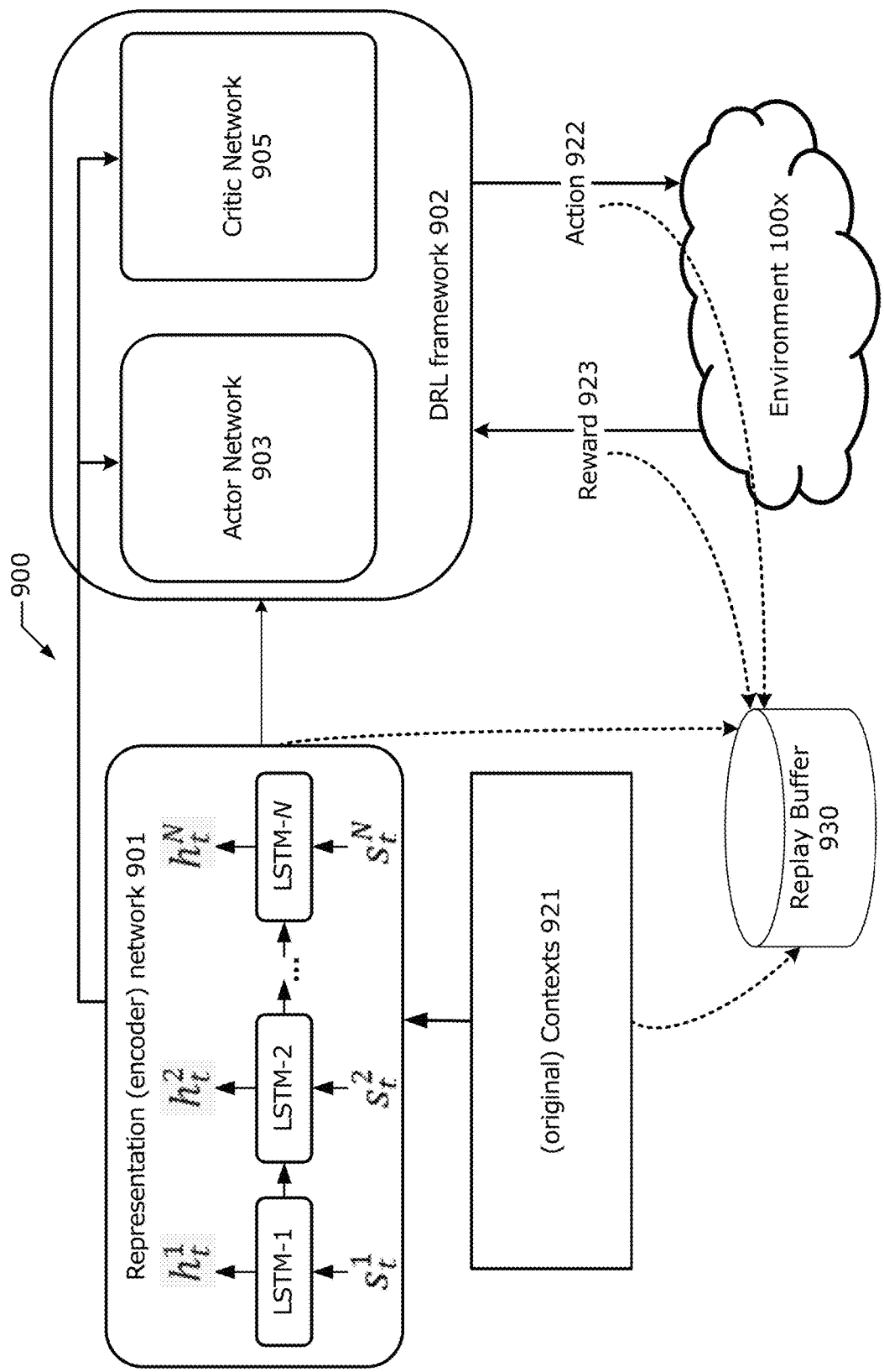
FIG. 9 depicts an example system architecture.

FIG. 9 depicts an example system architecture 900, which may be implemented (at least in part) by the agent 640 of FIG. 6. The architecture 900 includes a representation (encoder) network 901 (which may correspond to representation learning entity 801 of FIG. 8), a DRL framework 902 (which may correspond to DRL framework 802 of FIG. 8), and a replay buffer 930 (which may be the same or similar as the replay buffer 530 of FIG. 5). The DRL framework 902 may employ a policy gradient learning approach such as Actor-Critic, DDPG, and/or some other policy gradient method such as those discussed herein. The DRL framework 902 includes an actor network 903 and a critic network 905. The critic network 905 updates value function parameters w, and depending on the algorithm it could be action-value $Q_w(a|s)$ or state-value $V_w(s)$. The actor network 903 updates the policy parameters θ for $π_θ(a|s)$, in the direction suggested by the critic network 905. The replay buffer 930 may store experience data structures of, for example, ($s_t$, $a_t$, $r_t$, $s_{t+1}$) or the like. At each timestep the actor network 903 and the critic network 905 are updated by sampling a mini-batch uniformly from the replay buffer 930. An example training process and an inference process for the system architecture 900 can be performed as follows.

3.1. Training Process

During the training stage, three neural networks may be trained including the representation/encoder network 901, an actor network 903, and a critic network 905. The training process may be as follows:

First, randomly initialize critic network 905, actor network 903, and representation/encoder network 901 with parameters $θ^Q$, $θ^μ$, and $θ^E$, respectively (the parameters $θ^Q$, $θ^μ$, and $θ^E$ may also be referred to as weights $θ^Q$, $θ^μ$, $θ^E$, respectively). Additionally, initialize replay buffer 930. Second, initialize a random process for action exploration.

Third, all active UEs 601 collect contexts 921 from the environment 100x and pass them to the representation (encoder) network 901. The contexts 921 may include observations such as measured traffic load, PHY rate, signal-to-noise ratio (SNR), backhaul delay, and/or any other measurements and/or information discussed herein. This information may be collected from groups of UEs 601 and/or a target UE 601 to whom the agent will provide the action recommendation. Fourth, the representation network 901 obtains a representation of the current contexts 921 for the groups of UEs 601 as well as the target UE 601.

Fifth, the agent selects an action according to the current policy π and exploration noise. With ϵ probability, the agent can randomly sample the action space or use an existing heuristic algorithm, with 1−ϵ the agent chooses the action derived from the policy π plus action noise generated from the random process. Sixth, the agent then deploys the action for the target UE 601, and the reward is collected. The action, state, and reward transition are stored (e.g., in an experience data structure) in the replay buffer 930.

Seventh, a minibatch of size N is randomly sampled from the replay buffer 930, with the i index referring to the i-th sample. The target for the temporal difference (TD) error computation $y_i$ is computed from the immediate reward for the contextual bandit problem. Additionally or alternatively, TD error computation $y_i$ is computed from the immediate reward and the outputs of the target actor and critic networks, having weights $θ^{μ'}$ and $θ^{Q'}$, respectively. Then, the critic network ($θ^Q$) 905 is trained to minimize the following loss function (LF):

$$L = \frac{1}{N}\Sigma_i (y_i - Q(c_i, a_i | θ^Q)^2)$$ (LF)

In the loss function (LF), $y_i$ is the TD target where $y_i = r_i$, $r_i$ is the reward, and $c_i$ is the encoded context (e.g., encoded version of contexts 921). Eighth, the actor network ($θ^μ$) 903 is trained based on policy gradient to maximize the following reward function (RF2).

$$J = \frac{1}{N}\Sigma_i (\nabla_a Q(c, a | θ^Q)|_{c=c_i, a=μ(c_i)}, \nabla_{θ^μ} μ(c|θ^μ)|_{c=c_i}$$ (RF2)

In the reward function (RF), $\nabla_a Q$ is a gradient of the critic network 905 with respect to actions a, and $\nabla_{θ^μ}μ$ is the policy gradient of the actor network 903. The gradient $\nabla_a Q$ is used to update the parameters of the actor network 903 if the action a has a higher Q value that a previous action.

Ninth, the encoder network ($θ^E$) 901 is trained based on sampled policy gradient w as follows:

$$\nabla_{θ^E} J = \frac{1}{N}\sum_i (\nabla_a Q(c, a|θ^Q)|_{c=c_i, a=μ(c_i)}, \nabla_c μ(c|θ^μ)|_{c=E(s_i)} \nabla_{θ^E} E(s|θ^E)|_{s=s_i}$$

In the above policy gradient theorem, $s_i$ is the original input context (e.g., contexts 921), $\nabla_{θ^E} E$ is the policy gradient for the encoder network ($θ^E$) 901, and $\nabla_{θ^E} J$ is a gradient of the reward.

3.2. Inference Process

During the inference stage, only the representation network 901 and actor network 903 need to be deployed. The inference process may be as follows: First, a UE 601 observes one or more contexts from the environment 100x, and passes the observed contexts to the representation network 901. Second, the learned representation of the current dynamics and target UE 601 (e.g., features $h_t^i$ where i=1, . . . , N) are passed to the actor network 903. Third, the action 922 predicted by the actor network 903 is deployed to the target UE 601 (in the environment 100x), and the UE 601 performs the predicted action 922 accordingly.

3.3. Simulation Results

Figure 10A:
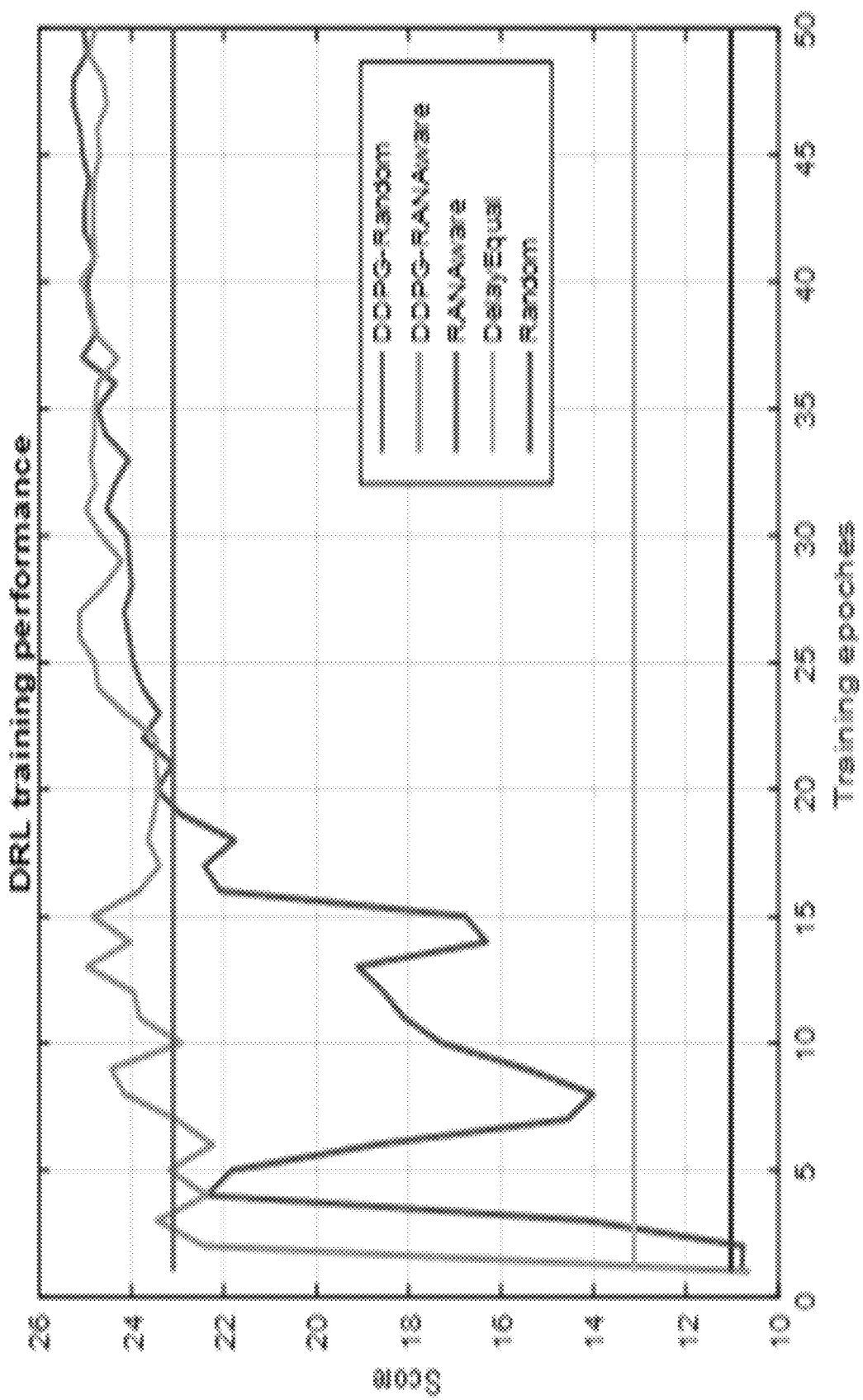
FIGS. 10a and 10b depict performance results of an example deep contextual bandit reinforcement learning system.
Figure 10B:
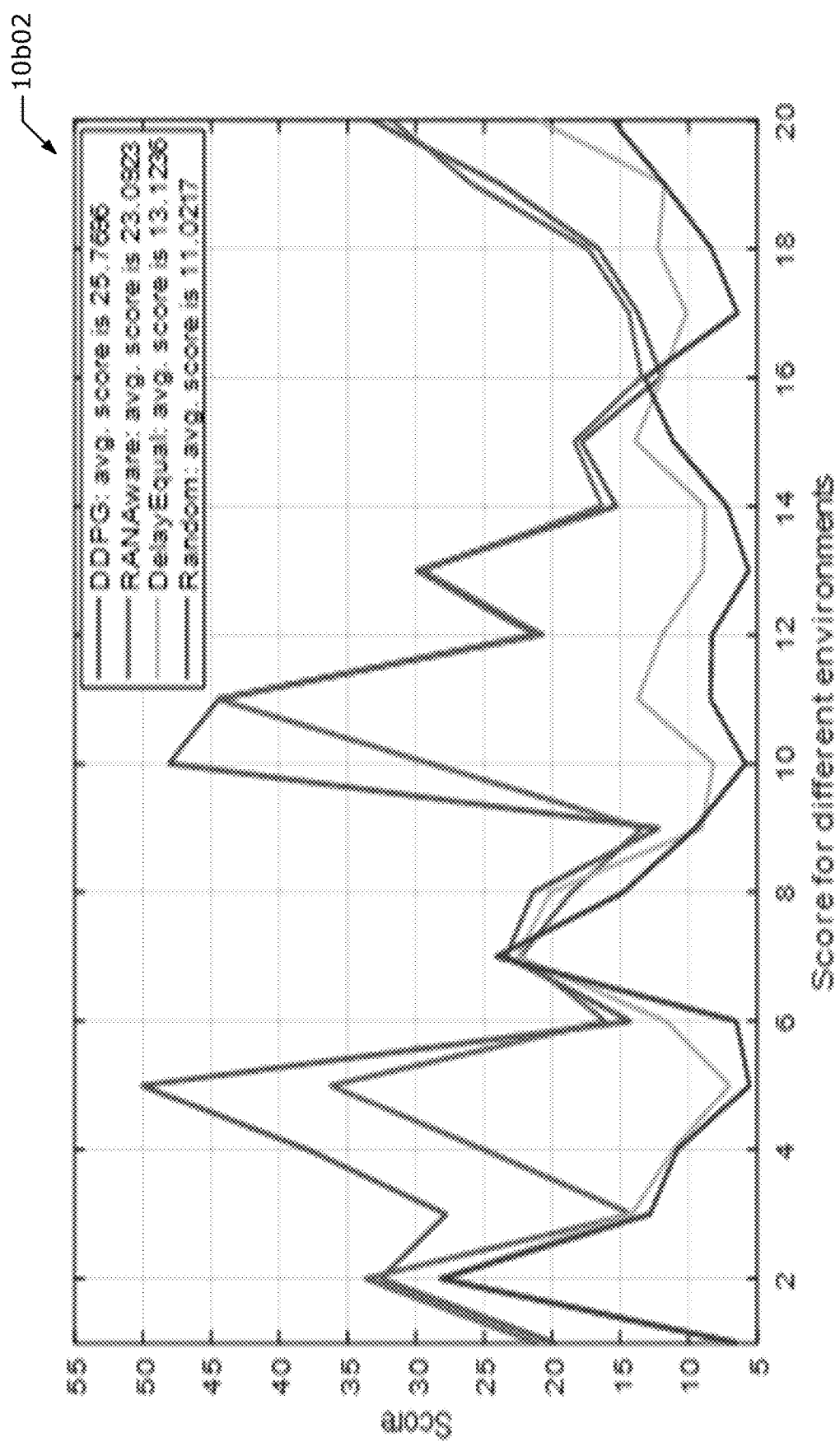

FIGS. 10a and 10b depict performance results of an example deep CB RL system such as the system described with respect to FIGS. 8-9. In particular, FIG. 10a includes a DRL training performance graph showing scores of various approaches versus training epochs, and FIG. 10b includes a DRL performance graph showing scores of the various approaches versus scores for different environments. In the graphs of FIGS. 10a and 10b, results of the deep CB RL system are labelled "DDPG" including "DDPG-random" and "DDPG-RANAware". DDPG-random indicates a randomly chosen action during the exploration stage while DDPG-RANAware indicates that a RANAware heuristic was used during the exploration phase (see e.g., [AC6833PCT], [AC6833Z]). "RANAware", "DelayEqual", and "random" are different heuristic algorithms that are compared with DDPG. From these graphs, it can be observed that the data-driven approach (DDPG) can outperform all existing solutions, and achieve higher score and better QoS performance than the existing solutions.

4. Edge Computing System Configurations and Arrangements

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, many other edge computing/networking technologies may be applicable to the present disclosure in various combinations and layouts of devices located at the edge of a network. Examples of such other edge computing/networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

FIG. 11 illustrates an example edge computing environment 1100. FIG. 11 specifically illustrates the different layers of communication occurring within the environment 1100, starting from endpoint sensors or things layer 1110 (e.g., operating in an Internet of Things (IoT) network topology) comprising one or more IoT devices 1111 (also referred to as edge endpoints 1110 or the like); increasing in sophistication to gateways or intermediate node layer 1120 comprising one or more user equipment (UEs) 1121a and 1121b (also referred to as intermediate nodes 1120 or the like), which facilitate the collection and processing of data from endpoints 1110; increasing in processing and connectivity sophistication to access node layer 1130 (or "edge node layer 1130") comprising a plurality of network access nodes (NANs) 1131, 1132, and 1133 (collectively referred to as "NANs 1131-1133" or the like) and a plurality of edge compute nodes 1136a-c (collectively referred to as "edge compute nodes 1136" or the like) within an edge computing system 1135; and increasing in connectivity and processing sophistication to a backend layer 1110 comprising core network (CN) 1142 and cloud 1144. The processing at the backend layer 1110 may be enhanced by network services as performed by one or more remote application (app) servers 1150 and/or other cloud services. Some or all of these elements may be equipped with or otherwise implement some or all features and/or functionality discussed herein.

The environment 1100 is shown to include end-user devices, such as intermediate nodes 1120 and endpoints 1110, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1131, 1132, and/or 1133. The NANs 1131-1133 are arranged to provide network connectivity to the end-user devices via respective links 1103, 1107 between the individual NANs and the one or more UEs 1111, 1121.

As examples, the communication networks and/or access technologies may include cellular technology such as LTE, MuLTEfire, and/or NR/5G (e.g., as provided by Radio Access Network (RAN) node 1131 and/or RAN nodes 1132), WiFi or wireless local area network (WLAN) technologies (e.g., as provided by access point (AP) 1133 and/or RAN nodes 1132), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1120 include UE 1121a and UE 1121b (collectively referred to as "UE 1121" or "UEs 1121"). In this example, the UE 1121a is illustrated as a vehicle UE, and UE 1121b is illustrated as a smartphone (e.g., handheld touchscreen mobile computing device connectable to one or more cellular networks). However, these UEs 1121 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1110 include UEs 1111, which may be IoT devices (also referred to as "IoT devices 1111"), which are uniquely identifiable embedded computing devices (e.g., within the Internet infrastructure) that comprise a network access layer designed for low-power IoT applications utilizing short-lived UE connections. The IoT devices 1111 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1111 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1111 can utilize technologies such as M2M or MTC for exchanging data with an MTC server (e.g., a server 1150), an edge server 1136 and/or edge computing system 1135, or device via a PLMN, ProSe or D2D communication, sensor networks, or IoT networks. The M2M or MTC exchange of data may be a machine-initiated exchange of data.

The IoT devices 1111 may execute background applications (e.g., keep-alive messages, status updates, etc.) to facilitate the connections of the IoT network. Where the IoT devices 1111 are, or are embedded in, sensor devices, the IoT network may be a WSN. An IoT network describes an interconnecting IoT UEs, such as the IoT devices 1111 being connected to one another over respective direct links 1105. The IoT devices may include any number of different types of devices, grouped in various combinations (referred to as an "IoT group") that may include IoT devices that provide one or more services for a particular user, customer, organizations, etc. A service provider (e.g., an owner/operator of server 1150, CN 1142, and/or cloud 1144) may deploy the IoT devices in the IoT group to a particular area (e.g., a geolocation, building, etc.) in order to provide the one or more services. In some implementations, the IoT network may be a mesh network of IoT devices 1111, which may be termed a fog device, fog system, or fog, operating at the edge of the cloud 1144. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1144 to Things (e.g., IoT devices 1111). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1130) and/or a central cloud computing service (e.g., cloud 1144) for performing heavy computations or computationally burdensome tasks. On the other hand, edge cloud computing consolidates human-operated, voluntary resources, as a cloud. These voluntary resource may include, inter-alia, intermediate nodes 1120 and/or endpoints 1110, desktop PCs, tablets, smartphones, nano data centers, and the like. In various implementations, resources in the edge cloud may be in one to two-hop proximity to the IoT devices 1111, which may result in reducing overhead related to processing data and may reduce network delay.

Additionally or alternatively, the fog may be a consolidation of IoT devices 1111 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1144. The fog operating at the edge of the cloud 1144 may overlap or be subsumed into an edge network 1130 of the cloud 1144. The edge network of the cloud 1144 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1136 or edge devices). The Fog layer resides on top of the edge layer and is a consolidation of networking devices such as the intermediate nodes 1120 and/or endpoints 1110 of FIG. 11.

Data may be captured, stored/recorded, and communicated among the IoT devices 1111 or, for example, among the intermediate nodes 1120 and/or endpoints 1110 that have direct links 1105 with one another as shown by FIG. 11. Analysis of the traffic flow and control schemes may be implemented by aggregators that are in communication with the IoT devices 1111 and each other through a mesh network. The aggregators may be a type of IoT device 1111 and/or network appliance. In the example of FIG. 11, the aggregators may be edge nodes 1130, or one or more designated intermediate nodes 1120 and/or endpoints 1110. Data may be uploaded to the cloud 1144 via the aggregator, and commands can be received from the cloud 1144 through gateway devices that are in communication with the IoT devices 1111 and the aggregators through the mesh network. Unlike the traditional cloud computing model, in some implementations, the cloud 1144 may have little or no computational capabilities and only serves as a repository for archiving data recorded and processed by the fog. In these implementations, the cloud 1144 centralized data storage system and provides reliability and access to data by the computing resources in the fog and/or edge devices.

Being at the core of the architecture, the Data Store of the cloud 1144 is accessible by both Edge and Fog layers of the aforementioned edge-fog network.

As mentioned previously, the access networks provide network connectivity to the end-user devices 1120, 1110 via respective NANs 1131-1133. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1131, 1132. This virtualized framework allows the freed-up processor cores of the NANs 1131, 1132 to perform other virtualized applications, such as virtualized applications for various elements discussed herein.

The UEs 1121, 1111 may utilize respective connections (or channels) 1103, each of which comprises a physical communications interface or layer. The connections 1103 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1111, 1121 and the NANs 1131-1133 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1111, 1121 and NANs 1131-1133 may operate using LAA, enhanced LAA (eLAA), and/or further eLAA (feLAA) mechanisms. The UEs 1121, 1111 may further directly exchange communication data via respective direct links 1105, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1121, 1111 provide radio information to one or more NANs 1131-1133 and/or one or more edge compute nodes 1136 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1121, 1111 current location). As examples, the measurements collected by the UEs 1121, 1111 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2020 December) ("U5382151"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 1131-1133 and provided to the edge compute node(s) 1136.

The radio information may be reported in response to a trigger event and/or on a periodic basis. Additionally or alternatively, individual UEs 1121, 1111 report radio information either at a low periodicity or a high periodicity depending on a data transfer that is to take place, and/or other information about the data transfer.

Additionally or alternatively, the edge compute node(s) 1136 may request the measurements from the NANs 1131-1133 at low or high periodicity, or the NANs 1131-1133 may provide the measurements to the edge compute node(s) 1136 at low or high periodicity. Additionally or alternatively, the edge compute node(s) 1136 may obtain other relevant data from other edge compute node(s) 1136, core network functions (NFs), application functions (AFs), and/or other UEs 1111, 1121 such as Key Performance Indicators (KPIs), with the measurement reports or separately from the measurement reports.

The UE 1121*b* is shown to be configured to access an access point (AP) 1133 via a connection 1107. In this example, the AP 1133 is shown to be connected to the Internet without connecting to the CN 1142 of the wireless system. The connection 1107 can comprise a local wireless connection, such as a connection consistent with any IEEE 802.11 protocol, wherein the AP 1133 would comprise a wireless fidelity (WiFi®) router. Additionally or alternatively, the UEs 1121 and IoT devices 1111 can be configured to communicate using suitable communication signals with each other or with any of the AP 1133 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1131 and 1132 that enable the connections 1103 may be referred to as "RAN nodes" or the like. The RAN nodes 1131, 1132 may comprise ground stations (e.g., terrestrial access points) or satellite stations providing coverage within a geographic area (e.g., a cell). The RAN nodes 1131, 1132 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1131 is embodied as a NodeB, evolved NodeB (eNB), or a next generation NodeB (gNB), and the RAN nodes 1132 are embodied as relay nodes, distributed units, or Road Side Unites (RSUs). Any other type of NANs can be used.

Any of the RAN nodes 1131, 1132 can terminate the air interface protocol and can be the first point of contact for the UEs 1121 and IoT devices XE111. Additionally or alternatively, any of the RAN nodes 1131, 1132 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. Additionally or alternatively, the UEs 1111, 1121 can be configured to communicate using OFDM communication signals with each other or with any of the NANs 1131, 1132 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the present disclosure is not limited in this respect.

For most cellular communication systems, the RAN function(s) operated by the RAN or individual NANs 1131-1132 organize downlink transmissions (e.g., from any of the RAN nodes 1131, 1132 to the UEs 1111, 1121) and uplink transmissions (e.g., from the UEs 1111, 1121 to RAN nodes 1131, 1132) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1111, 1121 at each transmission time interval (TTI). A TTI is the duration of a transmission on a radio link 1103, 1105, and is related to the size of the data blocks passed to the radio link layer from higher network layers.

The NANs 1131/1132 may be configured to communicate with one another via respective interfaces or links (not shown), such as an X2 interface for LTE implementations (e.g., when CN 1142 is an Evolved Packet Core (EPC)), an Xn interface for 5G or NR implementations (e.g., when CN 1142 is an Fifth Generation Core (5GC)), or the like. The NANs 1131 and 1132 are also communicatively coupled to CN 1142. Additionally or alternatively, the CN 1142 may be an evolved packet core (EPC) network, a NextGen Packet Core (NPC) network, a 5G core (5GC), or some other type of CN. The CN 1142 may comprise a plurality of network elements, which are configured to offer various data and telecommunications services to customers/subscribers (e.g., users of UEs 1121 and IoT devices 1111) who are connected to the CN 1142 via a RAN. The components of the CN 1142 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1142 may be referred to as a network slice, and a logical instantiation of a portion of the CN 1142 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1142 components/functions.

The CN 1142 is shown to be communicatively coupled to an application server 1150 and a network 1150 via an IP communications interface 1155, the one or more server(s) 1150 comprise one or more physical and/or virtualized systems for providing functionality (or services) to one or more clients (e.g., UEs 1121 and IoT devices 1111) over a network. The server(s) 1150 may include various computer devices with rack computing architecture component(s), tower computing architecture component(s), blade computing architecture component(s), and/or the like. The server(s) 1150 may represent a cluster of servers, a server farm, a cloud computing service, or other grouping or pool of servers, which may be located in one or more datacenters. The server(s) 1150 may also be connected to, or otherwise associated with one or more data storage devices (not shown). Moreover, the server(s) 1150 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1150 offer applications or services that use IP/network resources. As examples, the server(s) 1150 may provide traffic management services, cloud analytics, content streaming services, immersive gaming experiences, social networking and/or microblogging services, and/or other like services. In addition, the various services provided by the server(s) 1150 may include initiating and controlling software and/or firmware updates for applications or individual components implemented by the UEs 1121 and IoT devices 1111. The server(s) 1150 can also be configured to support one or more communication services (e.g., Voice-over-Internet Protocol (VoIP) sessions, PTT sessions, group communication sessions, social networking services, etc.) for the UEs 1121 and IoT devices 1111 via the CN 1142.

The Radio Access Technologies (RATs) employed by the NANs 1131-1133, the UEs 1121, 1111, and the other elements in FIG. 11 may include one or more V2X RATs, which allow these elements to communicate directly with one another, with infrastructure equipment (e.g., NANs 1131-1133), and other devices. Any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond).

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Intl "V2X Communications Message Set Dictionary" (formerly "Dedicated Short Range Communication (DSRC) Message Set Dictionary") (2020 Jul. 23) ("[J2735 202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018 Mar. 2) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer comprises (which now incorporates IEEE 802.11p) and IEEE 802.2 Logical Link Control (LLC) ("REEE80221") and/or IEEE/ISO/IEC 8802-2-1998 protocols, as well as features for Decentralized Congestion Control (DCC) methods discussed in ETSI TS 102 687 V1.2.1 (2018 April) ("PS1026871"). The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March).

The cloud 1144 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1144 include application capabilities type, infrastructure capabilities type, and platform capabilities type. A cloud capabilities type is a classification of the functionality provided by a cloud service to a cloud service customer (e.g., a user of cloud 1144), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1144 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1144 may represent a network such as the Internet, a local area network (LAN), a wide area network (WAN), a wireless local area network (WLAN), or a wireless wide area network (WWAN) including proprietary and/or enterprise networks for a company or organization, or combinations thereof.

Here, the cloud 1144 includes one or more networks that comprise computers, network connections among the computers, and software routines to enable communication between the computers over network connections. In this regard, the cloud 1144 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1144 may be via a wired or a wireless connection using the various communication protocols discussed infra. More than one network may be involved in a communication session between the illustrated devices. Connection to the cloud 1144 may require that the computers execute software routines which enable, for example, the seven layers of the OSI model of computer networking or equivalent in a wireless (cellular) phone network. Cloud 1144 may be used to enable relatively long-range communication such as, for example, between the one or more server(s) 1150 and one or more UEs 1121 and IoT devices 1111. Additionally or alternatively, the cloud 1144 may represent the Internet, one or more cellular networks, local area networks, or wide area networks including proprietary and/or enterprise networks, TCP/Internet Protocol (IP)-based network, or combinations thereof. In these implementations, the cloud 1144 may be associated with network operator who owns or controls equipment and other elements necessary to provide network-related services, such as one or more base stations or access points, one or more servers for routing digital data or telephone calls (e.g., a core network or backbone network), etc. The backbone links 1155 may include any number of wired or wireless technologies, and may be part of a LAN, a WAN, or the Internet. In one example, the backbone links 1155 are fiber backbone links that couple lower levels of service providers to the Internet, such as the CN 1112 and cloud 1144.

Additionally or alternatively, the various access technologies may include cellular technology such as LTE, MuLTEfire, and/or NR/5G (e.g., as provided by Radio Access Network (RAN) nodes 1131-1132, WLAN (e.g., WiFi®) technologies (e.g., as provided by an access point (AP) 1133), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The edge compute nodes 1136 may include or be part of an edge system 1135 (or edge network 1135). The edge compute nodes 1136 may also be referred to as "edge hosts 1136" or "edge servers 1136." The edge system 1135 includes a collection of edge servers 1136 (e.g., MEC hosts/servers 1136-1 and 1136-2 of Figure XP1) and edge management systems (not shown by FIG. 11) necessary to run edge computing applications (e.g., MEC Apps XP136 of Figure XP1) within an operator network or a subset of an operator network. The edge servers 1136 are physical computer systems that may include an edge platform (e.g., MEC platform XP137 of Figure XP1) and/or virtualization infrastructure (e.g., VI XP138 of Figure XP1), and provide compute, storage, and network resources to edge computing applications. Each of the edge servers 1136 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1120 and/or endpoints 1110. The VI of the edge servers 1136 provide virtualized environments and virtualized resources for the edge hosts, and the edge computing applications may run as VMs and/or application containers on top of the VI. One example implementation of the edge system 1135 is a MEC system 1135, which is discussed in more detail infra with respect to Figures XP1-XP2. It should be understood that the disclosed MEC systems and services deployment examples are only one illustrative example of edge computing systems/networks 1135, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 11, each of the NANs 1131, 1132, and 1133 are co-located with edge compute nodes (or "edge servers") 1136a, 1136b, and 1136c, respectively. These implementations may be small-cell clouds (SCCs) where an edge compute node 1136 is co-located with a small cell (e.g., pico-cell, femto-cell, etc.), or may be mobile micro clouds (MCCs) where an edge compute node 1136 is co-located with a macro-cell (e.g., an eNB, gNB, etc.). The edge compute node 1136 may be deployed in a multitude of arrangements other than as shown by FIG. 11. In a first example, multiple NANs 1131-1133 are co-located or otherwise communicatively coupled with one edge compute node 1136. In a second example, the edge servers 1136 may be co-located or operated by RNCs, which may be the case for legacy network deployments, such as 3G networks. In a third example, the edge servers 1136 may be deployed at cell aggregation sites or at multi-RAT aggregation points that can be located either within an enterprise or used in public coverage areas. In a fourth example, the edge servers 1136 may be deployed at the edge of CN 1142. These implementations may be used in follow-me clouds (FMC), where cloud services running at distributed data centers follow the UEs 1121 as they roam throughout the network.

In any of the implementations discussed herein, the edge servers 1136 provide a distributed computing environment for application and service hosting, and also provide storage and processing resources so that data and/or content can be processed in close proximity to subscribers (e.g., users of UEs 1121, 1111) for faster response times The edge servers 1136 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1136 from the UEs 1111/1121, CN 1142, cloud 1144, and/or server(s) 1150, or vice versa. For example, a device application or client application operating in a UE 1121/1111 may offload application tasks or workloads to one or more edge servers 1136. In another example, an edge server 1136 may offload application tasks or workloads to one or more UE 1121/1111 (e.g., for distributed ML computation or the like).

Figure 12:
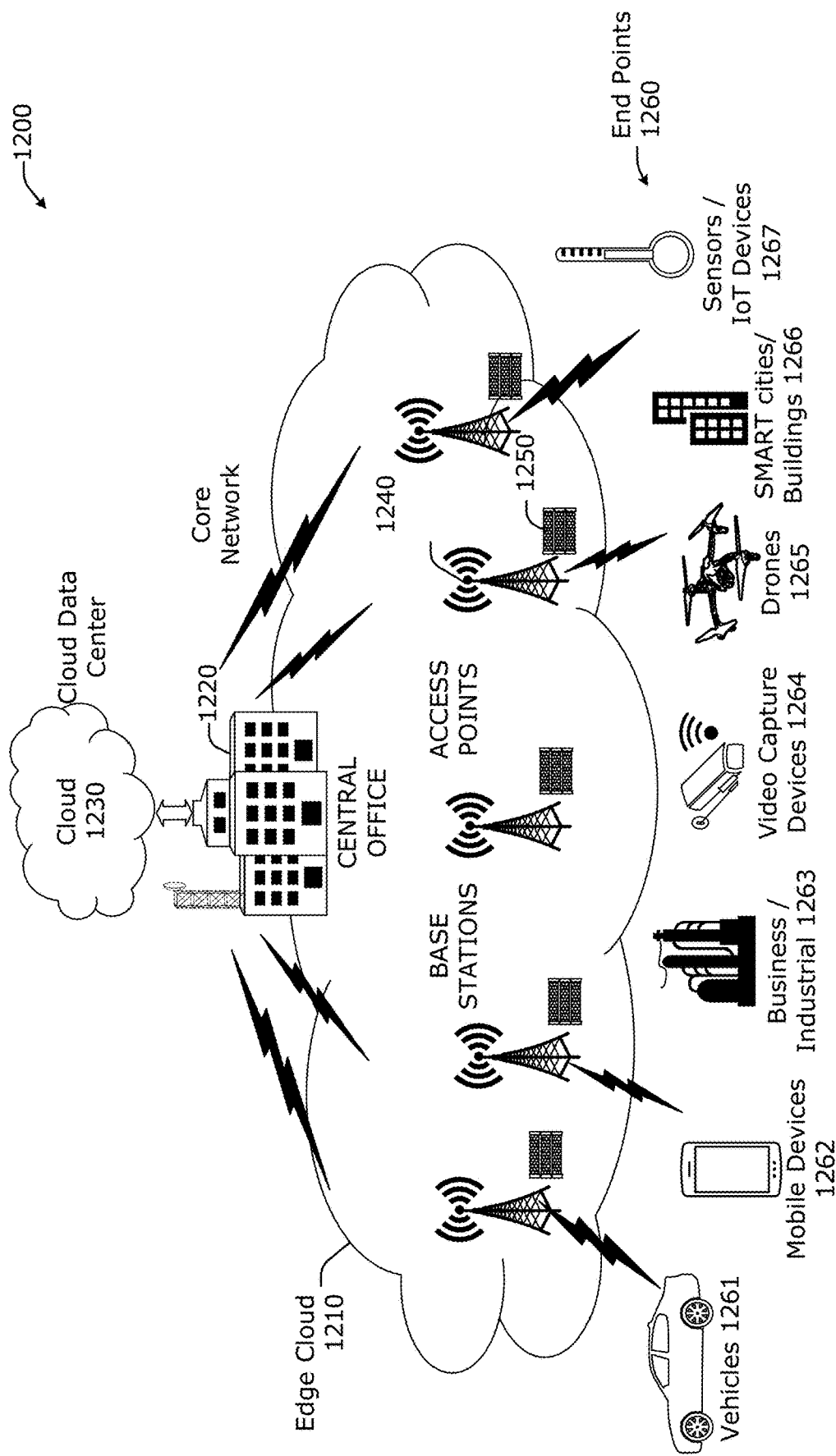
FIG. 12 illustrates an overview of an edge cloud configuration for edge computing.

FIG. 12 is a block diagram 1200 showing an overview of a configuration for edge computing, which includes a layer of processing referred to in many of the following examples as an "edge cloud". As shown, the edge cloud 1210 is co-located at an edge location, such as a network access node (NAN) 1240 (e.g., access point or base station), a local processing hub 1250, or a central office 1220, and thus may include multiple entities, devices, and equipment instances. The edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities and building devices 1266, sensors and IoT devices 1267, etc.) than the cloud data center 1230. Compute, memory, and storage resources which are offered at the edges in the edge cloud 1210 are critical to providing ultra-low latency response times for services and functions used by the endpoint data sources 1260 as well as reduce network backhaul traffic from the edge cloud 1210 toward cloud data center 1230 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 13:
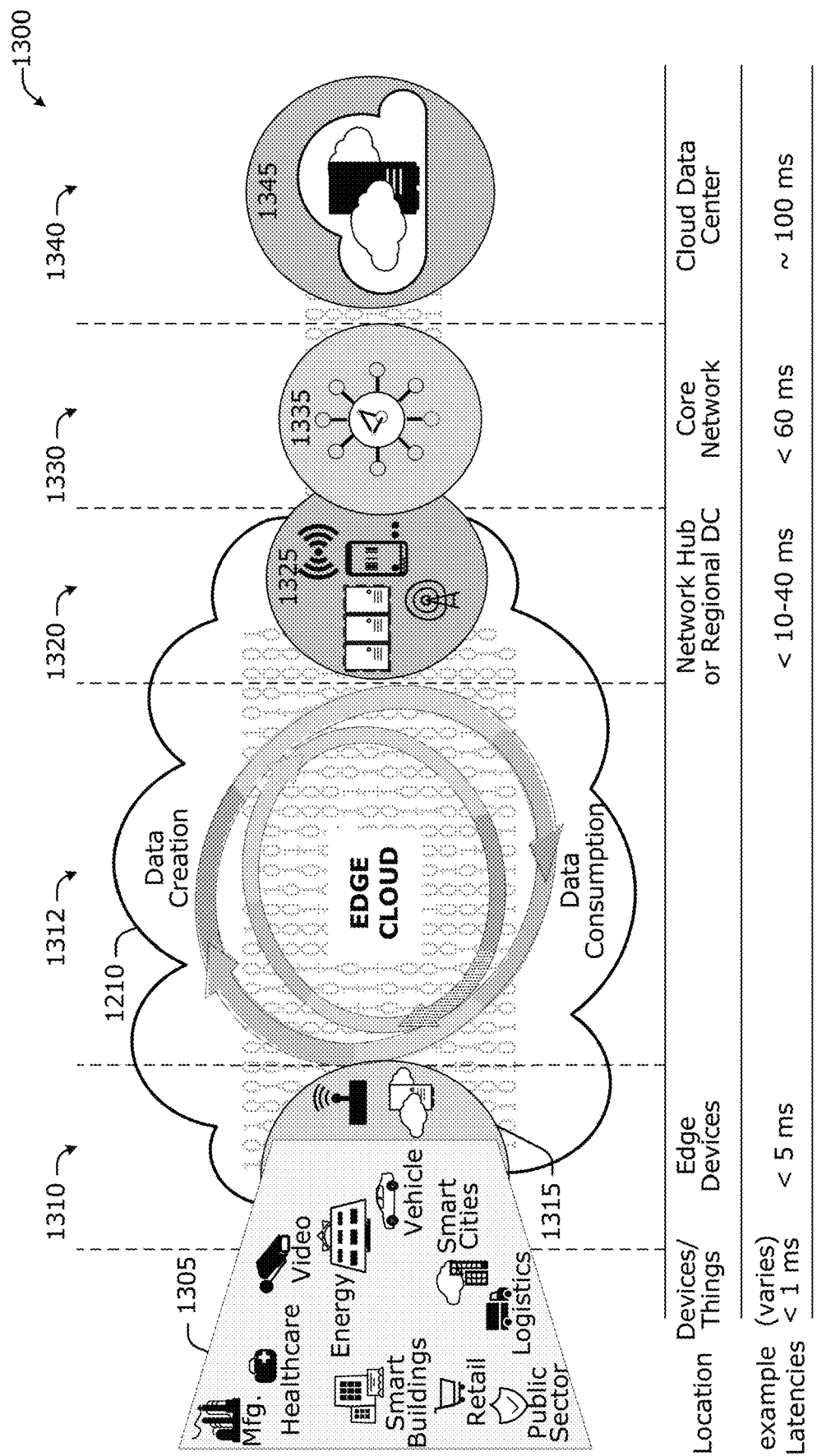
FIG. 13 illustrates operational layers among endpoints, an edge cloud, and cloud computing environments.

FIG. 13 illustrates operational layers among endpoints, an edge cloud, and cloud computing environments. Specifically, FIG. 13 depicts examples of computational use cases 1305, utilizing the edge cloud 1210 among multiple illustrative layers of network computing. The layers begin at an endpoint (devices and things) layer 1300, which accesses the edge cloud 1210 to conduct data creation, analysis, and data consumption activities. The edge cloud 1210 may span multiple network layers, such as an edge devices layer 1310 having gateways, on-premise servers, or network equipment (nodes 1315) located in physically proximate edge systems; a network access layer 1320, encompassing base stations, radio processing units, network hubs, regional data centers (DC), or local network equipment (equipment 1325); and any equipment, devices, or nodes located therebetween (in layer 1312, not illustrated in detail). The network communications within the edge cloud 1210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1300, under 5 ms at the edge devices layer 1310, to even between 10 to 40 ms when communicating with nodes at the network access layer 1320. Beyond the edge cloud 1210 are core network 1330 and cloud data center 1340 layers, each with increasing latency (e.g., between 50-60 ms at the core network layer 1330, to 100 or more ms at the cloud data center layer). As a result, operations at a core network data center 1335 or a cloud data center 1345, with latencies of at least 50 to 100 ms or more, will not be able to accomplish many time-critical functions of the use cases 1305. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1335 or a cloud data center 1345, a central office or content data network may be considered as being located within a "near edge" layer ("near" to the cloud, having high latency values when communicating with the devices and endpoints of the use cases 1305), whereas an access point, base station, on-premise server, or network gateway may be considered as located within a "far edge" layer ("far" from the cloud, having low latency values when communicating with the devices and endpoints of the use cases 1305). It will be understood that other categorizations of a particular network layer as constituting a "close", "local", "near", "middle", or "far" edge may be based on latency, distance, number of network hops, or other measurable characteristics, as measured from a source in any of the network layers 1300-1340.

The various use cases 1305 may access resources under usage pressure from incoming streams, due to multiple services utilizing the edge cloud. To achieve results with low latency, the services executed within the edge cloud 1210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1210 (network layers 1300-1340), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Here, a "producer" refers to an entity or element that provides a service to other entities or elements on the same edge node or on different edge nodes, and a "consumer" refers to an entity or element that can consumer end user traffic and/or user services from a producer on the same or different edge nodes. For example, a producer app may provide location services, mapping services, transcoding services, AI/ML services, and/or other like services. Additionally or alternatively, a consumer app may be a content delivery network (CDN) node, AR or VR apps, gaming apps, and/or some other type of app. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1210.

As such, the edge cloud 1210 is formed from network components and functional features operated by and within edge gateway nodes, edge aggregation nodes, or other edge compute nodes among network layers 1310-1330. The edge cloud 1210 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1210 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1210 may be servers, multi-tenant servers, appliance computing devices, and/or any other type of computing devices. For example, the edge cloud 1210 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, and/or sensors 2772 of FIG. 27, and/or the like). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, actuators (e.g., actuators 2774 of FIG. 27) etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 27. The edge cloud 1210 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 14:
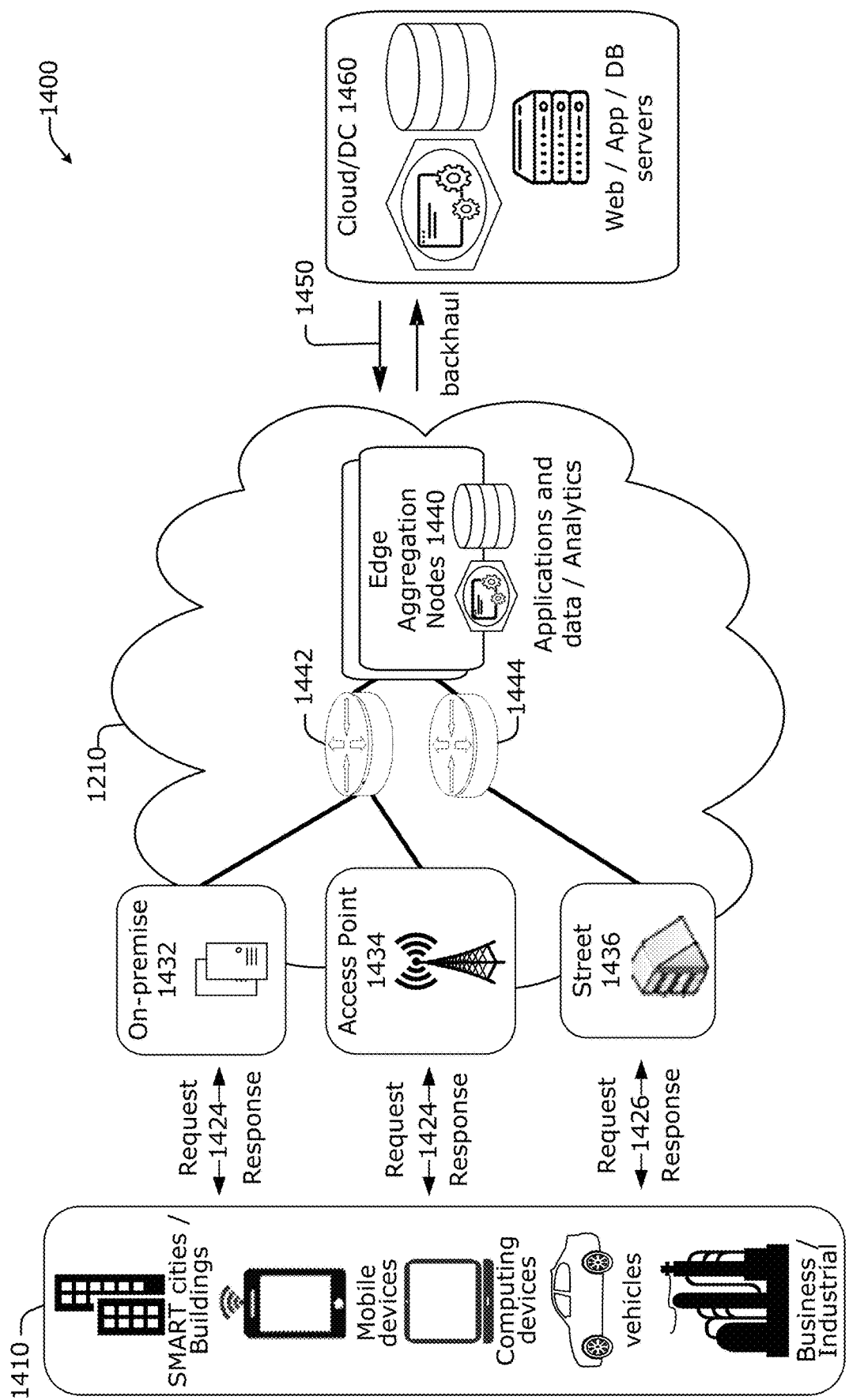
FIG. 14 illustrates an example approach for networking and services in an edge computing system.

In FIG. 14, various client endpoints 1410 (in the form of mobile devices, computers, autonomous vehicles, business computing equipment, industrial processing equipment) exchange requests and responses that are specific to the type of endpoint network aggregation. For instance, client endpoints 1410 may obtain network access via a wired broadband network, by exchanging requests and responses 1422 through an on-premise network system 1432. Some client endpoints 1410, such as mobile computing devices, may obtain network access via a wireless broadband network, by exchanging requests and responses 1424 through an access point (e.g., cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442, 1444 within the edge cloud 1210 to aggregate traffic and requests. Thus, within the edge cloud 1210, the TSP may deploy various compute and storage resources, such as at edge aggregation nodes 1440, to provide requested content. The edge aggregation nodes 1440 and other systems of the edge cloud 1210 are connected to a cloud or data center 1460, which uses a backhaul network 1450 to fulfill higher-latency requests from a cloud/data center for websites, applications, database servers, etc. Additional or consolidated instances of the edge aggregation nodes 1440 and the aggregation points 1442, 1444, including those deployed on a single server framework, may also be present within the edge cloud 1210 or other areas of the TSP infrastructure.

Figure 15:
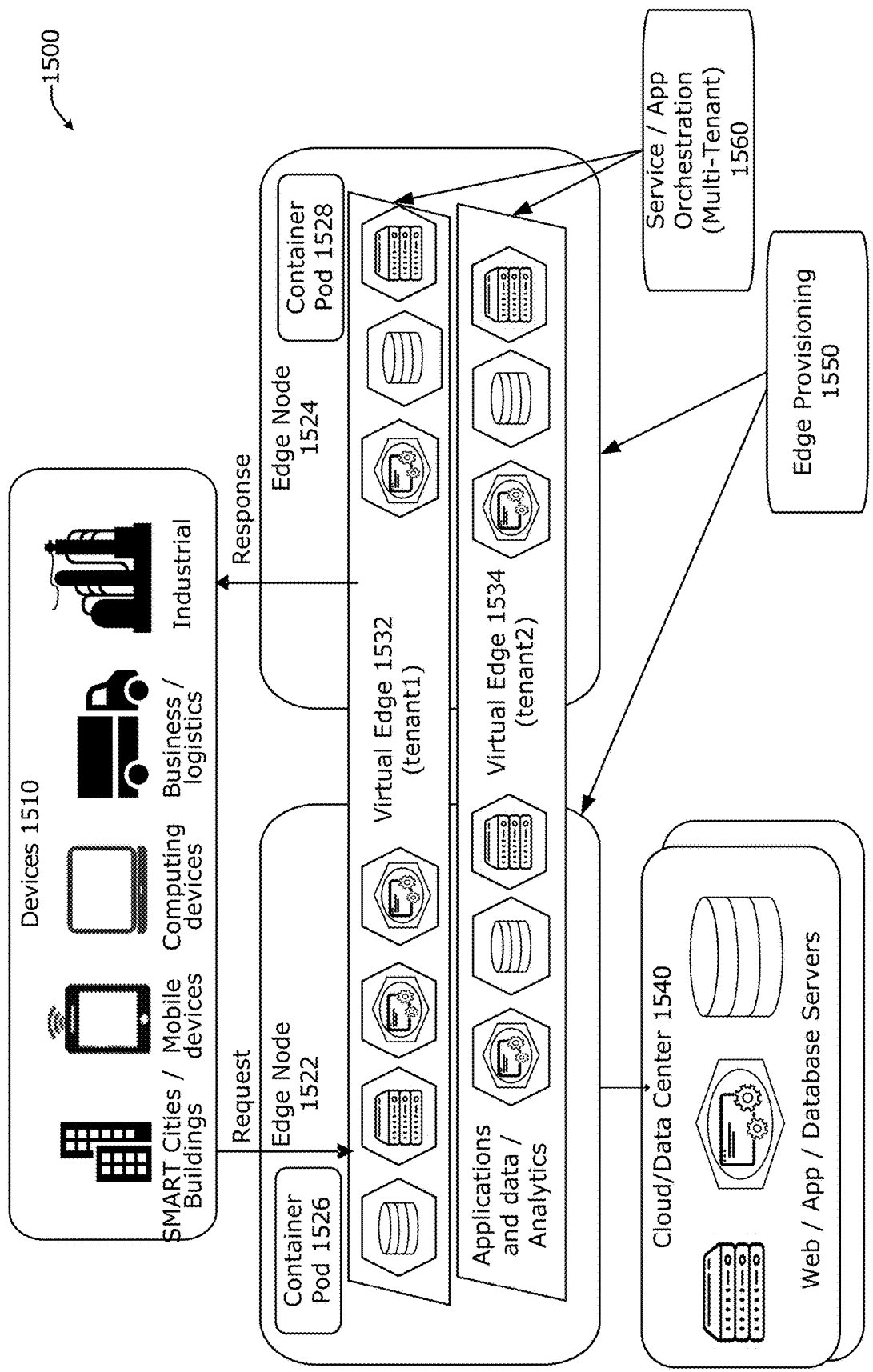
FIG. 15 illustrates deployment of a virtual edge configuration in an edge computing system operated among multiple edge nodes and multiple tenants.

FIG. 15 illustrates deployment and orchestration for virtualized and container-based edge configurations across an edge computing system operated among multiple edge nodes and multiple tenants (e.g., users, providers) which use such edge nodes. Specifically, FIG. 15 depicts coordination of a first edge node 1522 and a second edge node 1524 in an edge computing system 1500, to fulfill requests and responses for various client endpoints 1510 (e.g., smart cities/building systems, mobile devices, computing devices, business/logistics systems, industrial systems, etc.), which access various virtual edge instances. Here, the virtual edge instances 1532, 1534 provide edge compute capabilities and processing in an edge cloud, with access to a cloud/data center 1540 for higher-latency requests for websites, applications, database servers, etc. However, the edge cloud enables coordination of processing among multiple edge nodes for multiple tenants or entities.

In FIG. 15, these virtual edge instances include: a first virtual edge 1532, offered to a first tenant (Tenant 1), which offers a first combination of edge storage, computing, and services; and a second virtual edge 1534, offering a second combination of edge storage, computing, and services. The virtual edge instances 1532, 1534 are distributed among the edge nodes 1522, 1524, and may include scenarios in which a request and response are fulfilled from the same or different edge nodes. The configuration of the edge nodes 1522, 1524 to operate in a distributed yet coordinated fashion occurs based on edge provisioning functions 1550. The functionality of the edge nodes 1522, 1524 to provide coordinated operation for applications and services, among multiple tenants, occurs based on orchestration functions 1560.

Some of the devices 1510 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1522, 1524 may operate as security feature enforcement points for local resources allocated to multiple tenants per node. Additionally, tenant runtime and application execution (e.g., in instances 1532, 1534) may serve as an enforcement point for a security feature that creates a virtual edge abstraction of resources spanning potentially multiple physical hosting platforms. Finally, the orchestration functions 1560 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1510, 1522, and 1540 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 15. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1522, 1524 may implement the use of containers, such as with the use of a container "pod" 1526, 1528 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1532, 1534 are partitioned according to the needs of each container.

With the use of container pods, a pod controller oversees the partitioning and allocation of containers and resources. The pod controller receives instructions from an orchestrator (e.g., orchestrator 1560) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1560 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 16:
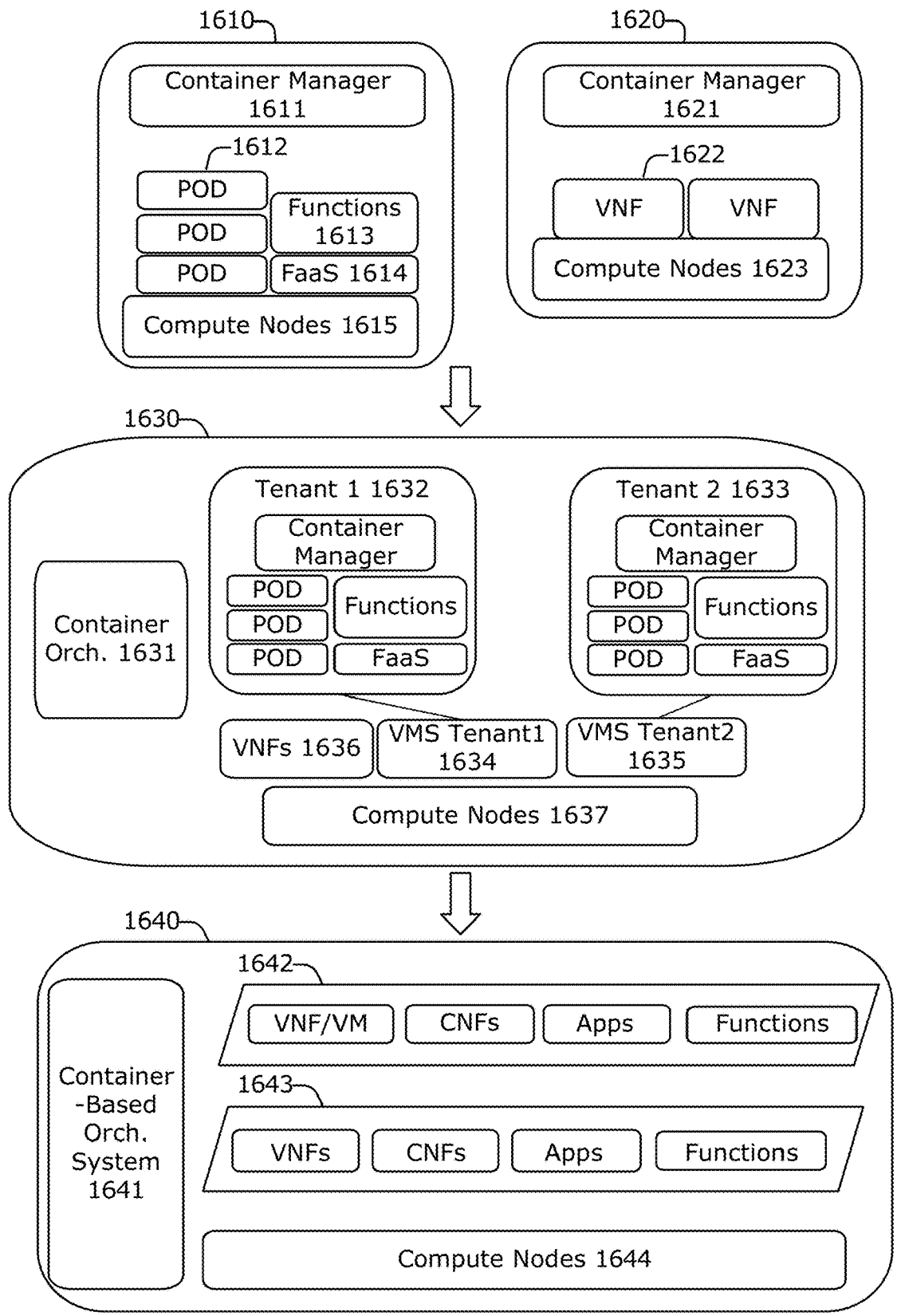
FIG. 16 illustrates various compute arrangements deploying containers in an edge computing system.

FIG. 16 illustrates additional compute arrangements deploying containers in an edge computing system. As a simplified example, system arrangements 1610, 1620 depict settings in which a pod controller (e.g., container managers 1611, 1621, and container orchestrator 1631) is adapted to launch containerized pods, functions, and functions-as-a-service instances through execution via compute nodes 1615 in arrangement 1610, or to separately execute containerized virtualized network functions through execution via compute nodes 1623 in arrangement 1620. This arrangement is adapted for use of multiple tenants in system arrangement 1630 (using compute nodes 1637), where containerized pods (e.g., pods 1612), functions (e.g., functions 1613, VNFs 1622, 1636), and functions-as-a-service instances (e.g., FaaS instance 1614) are launched within virtual machines (e.g., VMs 1634, 1635 for tenants 1632, 1633) specific to respective tenants (aside the execution of virtualized network functions). This arrangement is further adapted for use in system arrangement 1640, which provides containers 1642, 1643, or execution of the various functions, applications, and functions on compute nodes 1644, as coordinated by an container-based orchestration system 1641.

The system arrangements of depicted in FIG. 16 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 16, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 17:
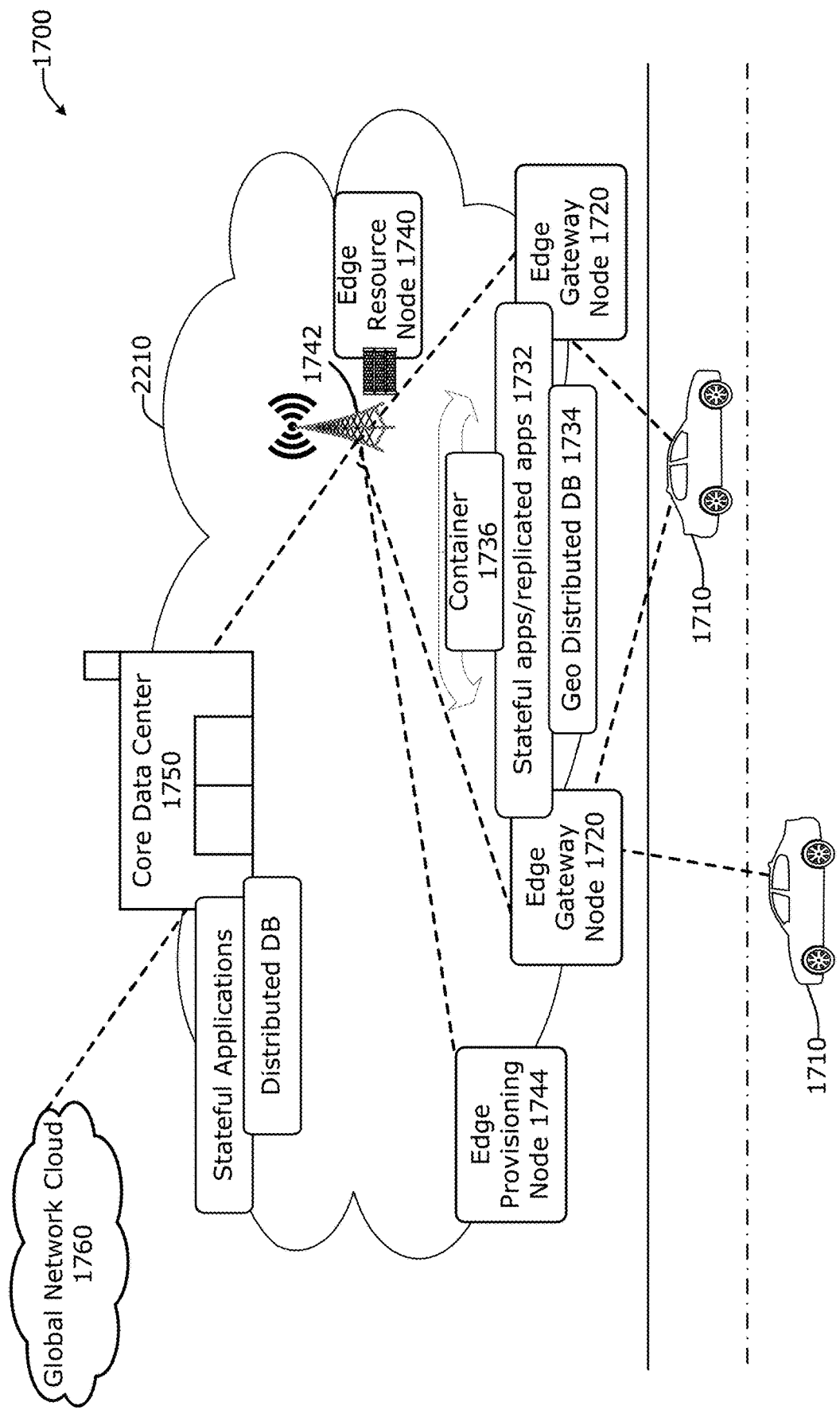
FIG. 17 illustrates a compute and communication use case involving mobile access to applications in an edge computing system.

FIG. 17 shows an example arrangement in which the edge computing systems and arrangements discussed herein may be applicable in various solutions, services, and/or use cases involving mobility. FIG. 17 shows vehicle compute and communication use case involving mobile access to applications in an edge computing system 1700 that implements an edge cloud 1210. In this use case, respective client compute nodes 1710 may be embodied as in-vehicle compute systems (e.g., in-vehicle navigation and/or infotainment systems) located in corresponding vehicles which communicate with the edge gateway nodes 1720 during traversal of a roadway. For instance, the edge gateway nodes 1720 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1710 and a particular edge gateway device 1720 may propagate so as to maintain a consistent connection and context for the client compute node 1710. Likewise, mobile edge nodes may aggregate at the high priority services or according to the throughput or latency resolution requirements for the underlying service(s) (e.g., in the case of drones). The respective edge gateway devices 1720 include an amount of processing and storage capabilities and, as such, some processing and/or storage of data for the client compute nodes 1710 may be performed on one or more of the edge gateway devices 1720.

The edge gateway devices 1720 may communicate with one or more edge resource nodes 1740, which are illustratively embodied as compute servers, appliances or components located at or in a network access node (NAN) 1742 (e.g., a base station of a cellular network). As discussed above, the respective edge resource nodes 1740 include an amount of processing and storage capabilities and, as such, some processing and/or storage of data for the client compute nodes 1710 may be performed on the edge resource node 1740. For example, the processing of data that is less urgent or important may be performed by the edge resource node 1740, while the processing of data that is of a higher urgency or importance may be performed by the edge gateway devices 1720 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1740 also communicate with the core data center 1750, which may include compute servers, appliances, and/or other components located in a central location (e.g., a central office of a cellular communication network). The core data center 1750 may provide a gateway to the global network cloud 1760 (e.g., the Internet) for the edge cloud 1210 operations formed by the edge resource node(s) 1740 and the edge gateway devices 1720. Additionally, in some examples, the core data center 1750 may include an amount of processing and storage capabilities and, as such, some processing and/or storage of data for the client compute devices may be performed on the core data center 1750 (e.g., processing of low urgency or importance, or high complexity).

The edge gateway nodes 1720 or the edge resource nodes 1740 may offer the use of stateful applications 1732 and a geographic distributed database 1734. Although the applications 1732 and database 1734 are illustrated as being horizontally distributed at a layer of the edge cloud 1210, it will be understood that resources, services, or other components of the application may be vertically distributed throughout the edge cloud (including, part of the application executed at the client compute node 1710, other parts at the edge gateway nodes 1720 or the edge resource nodes 1740, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1736 (or pod of containers) may be flexibly migrated from an edge node 1720 to other edge nodes (e.g., 1720, 1740, etc.) such that the container with an application and workload does not need to be reconstituted, re-compiled, re-interpreted in order for migration to work. However, in such settings, there may be some remedial or "swizzling" translation operations applied.

For example, the physical hardware at node 1740 may differ from edge gateway node 1720 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 17 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1720, some others at the edge resource node 1740, and others in the core data center 1750 or global network cloud 1760.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1700 can include or be in communication with an edge provisioning node 1744. The edge provisioning node 1744 can distribute software such as the example computer readable instructions 2782 of FIG. 27, to various receiving parties for implementing any of the methods described herein. The example edge provisioning node 1744 may be implemented by any computer server, home server, content delivery network, virtual server, software distribution system, central facility, storage device, storage disk, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 1744. For example, the entity that owns and/or operates the edge provisioning node 1744 may be a developer, a seller, and/or a licensor (or a customer and/or consumer thereof) of software instructions such as the example computer readable instructions 2782 of FIG. 27. The receiving parties may be consumers, service providers, users, retailers, OEMs, etc., who purchase and/or license the software instructions for use and/or re-sale and/or sub-licensing.

In an example, edge provisioning node 1744 includes one or more servers and one or more storage devices/disks. The storage devices and/or storage disks host computer readable instructions such as the example computer readable instructions 2782 of FIG. 27, as described below. Similarly to edge gateway devices 1720 described above, the one or more servers of the edge provisioning node 1744 are in communication with a NAN 1742 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 2782 from the edge provisioning node 1744. For example, the software instructions, which may correspond to the example computer readable instructions 2782 of FIG. 27, may be downloaded to the example processor platform/s, which is to execute the computer readable instructions 2782 to implement the methods described herein.

In some examples, the processor platform(s) that execute the computer readable instructions 2782 can be physically located in different geographic locations, legal jurisdictions, etc. In some examples, one or more servers of the edge provisioning node 1744 periodically offer, transmit, and/or force updates to the software instructions (e.g., the example computer readable instructions 2782 of FIG. 27) to ensure improvements, patches, updates, etc. are distributed and applied to the software instructions implemented at the end user devices. In some examples, different components of the computer readable instructions 2782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

4.1. Multi-Access Edge Computing (MEC) Aspects

FIG. 18 illustrates a MEC system reference architecture (or MEC architecture) 1800 providing functionalities in accordance with ETSI GS MEC 003 v2.1.1 (2019 January) ("[MEC003]"); ETSI GS MEC 009 V2.1.1 (2019-01) ("[MEC009]"); ETSI GS MEC 011 V1.1.1 (2017 July) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 February) ("[MEC014]"); ETSI GS MEC 015 v2.1.1 (2020-06) ("[MEC015]"); ETSI GS MEC 028 v2.1.1 (2020 June) ("[MECO28]"); ETSI GS MEC 029 v2.1.1 (2019 July) ("[MECO29]"); ETSI MEC GS 030 v2.1.1 (2020 April) ("[MEC030]"); among many other ETSI MEC standards. MEC offers application developers and content providers cloud-computing capabilities and an IT service environment at the Edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 1800 includes MEC hosts 1802, a virtualization infrastructure manager (VIM) 1808, an MEC platform manager 1806, an MEC orchestrator 1810, an operations support system (OSS) 1812, a user app proxy 1814, a UE app 1818 running on UE 1820, and CFS portal 1816. The MEC host 1802 can include a MEC platform 1832 with filtering rules control component 1840, a DNS handling component 1842, a service registry 1838, and MEC services 1836. The MEC services 1836 can include at least one scheduler, which can be used to select resources for instantiating MEC apps (or NFVs) 1826 upon virtualization infrastructure (VI) 1822. The MEC apps 1826 can be configured to provide services 1830, which can include processing network communications traffic of different types associated with one or more wireless connections (e.g., connections to one or more RANs or core network functions) and/or some other services such as those discussed herein. The other MEC host 1802 may have a same or similar configuration/implementation as the MEC host 1802, and the other MEC app 1826 instantiated within other MEC host 1802 can be similar to the MEC apps 1826 instantiated within MEC host 1802. The VI 1822 includes a data plane 1824 coupled to the MEC platform 1822 via an MP2 interface. Additional interfaces between various network entities of the MEC architecture 1800 are illustrated in FIG. 18.

The MEC system 1800 includes three groups of reference points, including "Mp" reference points regarding the MEC platform functionality; "Mm" reference points, which are management reference points; and "Mx" reference points, which connect MEC entities to external entities. The interfaces/reference points in the MEC system 1800 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 1800 may be access-agnostic and not dependent on a particular deployment. MEC enables implementation of MEC apps 1826 as software-only entities that run on top of a VI 1822, which is located in or close to the network Edge. A MEC app 1826 is an application that can be instantiated on a MEC host 1802 within the MEC system 1800 and can potentially provide or consume MEC services 1836.

The MEC entities depicted by FIG. 18 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 1820, and is discussed in more detail infra. The MEC host level includes one or more MEC hosts 1802, 1804 and MEC management entities, which provide functionality to run MEC Apps 1826 within an operator network or a subset of an operator network. The MEC management entities include various components that handle the management of the MEC-specific functionality of a particular MEC platform 1832, MEC host 1802, and the MEC Apps 1826 to be run.

The MEC platform manager 1806 is a MEC management entity including MEC platform element management component 1844, MEC app rules and requirements management component 1846, and MEC app lifecycle management component 1848. The various entities within the MEC architecture 1800 can perform functionalities as discussed in [MEC003]. The remote app 1850 is configured to communicate with the MEC host 1802 (e.g., with the MEC apps 1826) via the MEC orchestrator 1810 and the MEC platform manager 1806.

The MEC host 1802 is an entity that contains an MEC platform 1832 and VI 1822 which provides compute, storage, and network resources for the purpose of running MEC Apps 1826. The VI 1822 includes a data plane (DP) 1824 that executes traffic rules 1840 received by the MEC platform 1832, and routes the traffic among MEC Apps 1826, MEC services 1836, DNS server/proxy (see e.g., via DNS handling entity 1842), 3GPP network, local networks, and external networks. The MEC DP 1824 may be connected with the (R)AN nodes and the 3GPP core network, and/or may be connected with an access point via a wider network, such as the internet, an enterprise network, or the like.

The MEC platform 1832 is a collection of essential functionality required to run MEC Apps 1826 on a particular VI 1822 and enable them to provide and consume MEC services 1836, and that can provide itself a number of MEC services 937a. The MEC platform 1832 can also provide various services and/or functions, such as offering an environment where the MEC Apps 1826 can discover, advertise, consume and offer MEC services 1836 (discussed infra), including MEC services 1836 available via other platforms when supported. The MEC platform 1832 may be able to allow authorized MEC Apps 1826 to communicate with third party servers located in external networks. The MEC platform 1832 may receive traffic rules from the MEC platform manager 1806, applications, or services, and instruct the data plane accordingly (see e.g., Traffic Rules Control 1840). The MEC platform 1832 may send instructions to the DP 1824 within the VI 1822 via the Mp2 reference point. The Mp2 reference point between the MEC platform 1832 and the DP 1824 of the VI 1822 may be used to instruct the DP 1834 on how to route traffic among applications, networks, services, etc. The MEC platform 1832 may translate tokens representing UEs 1820, UE apps, individual sessions, and/or individual flows within a session in the traffic rules into specific network addresses (e.g., IP addresses or the like). The MEC platform 1832 also receives DNS records from the MEC platform manager 1806 and configures a DNS proxy/server accordingly. The MEC platform 1832 hosts MEC services 1836 including the multi-access Edge services discussed infra, and provide access to persistent storage and time of day information. Furthermore, the MEC platform 1832 may communicate with other MEC platforms 1832 of other MEC servers 1802 via the Mp3 reference point. Upon receipt of update, activation or deactivation of traffic rules from the MEC platform manager 1806, apps, or services, the MEC platform 1832 instructs the data plane 1824 accordingly. The MEC platform 1832 also receives DNS records from the MEC platform manager 1806 and uses them to configure a DNS proxy/server 1842. The traffic rules control 1840 allows the MEC platform 1832 to perform traffic routing including traffic rules update, activation, and deactivation. Additionally or alternatively, the traffic rules control 1840 allows the MEC platform 1832 to perform traffic steering, for example, by directing data packets over one or more access network connections in a multi-access environment comprising multiple access networks, each of which may have multiple access network connections and/or may implement different access technologies.

The VI 1822 represents the totality of all hardware and software components which build up the environment in which MEC Apps 1826 and/or MEC platform 1832 are deployed, managed and executed. The VI 1822 may span across several locations, and the network providing connectivity between these locations is regarded to be part of the VI 1822. The physical hardware resources of the VI 1822 includes computing, storage and network resources that provide processing, storage and connectivity to MEC Apps 1826 and/or MEC platform 1832 through a virtualization layer (e.g., a hypervisor, VM monitor (VMM), or the like). The virtualization layer may abstract and/or logically partition the physical hardware resources of the MEC server 1802 as a hardware abstraction layer. The virtualization layer may also enable the software that implements the MEC Apps 1826 and/or MEC platform 1832 to use the underlying VI 1822, and may provide virtualized resources to the MEC Apps 1826 and/or MEC platform 1832, so that the MEC Apps 1826 and/or MEC platform 1832 can be executed.

The MEC Apps 1826 are applications that can be instantiated on a MEC host/server 1802 within the MEC system 1800 and can potentially provide or consume MEC services 1836. The term "MEC service" refers to a service provided via a MEC platform 1832 either by the MEC platform 1832 itself or by a MEC App 1826. MEC Apps 1826 may run as VM on top of the VI 1822 provided by the MEC server 1802, and can interact with the MEC platform 1832 to consume and provide the MEC services 1836. The Mp1 reference point between the MEC platform 1832 and the MEC Apps 1826 is used for consuming and providing service specific functionality. Mp1 provides service registration 1838, service discovery, and communication support for various services, such as the MEC services 1836 provided by MEC host 1802. Mp1 may also provide application availability, session state relocation support procedures, traffic rules and DNS rules activation, access to persistent storage and time of day information, and/or the like. Additionally or alternatively, the MEC Apps 1826 may communicate with the MEC platform 1832 using the MEC APIs discussed in ETSI GS MEC 011 V2.1.1 (2019 November).

The MEC Apps 1826 are instantiated on the VI 1822 of the MEC server 1802 based on configuration or requests validated by the MEC management (e.g., MEC platform manager 1806). The MEC Apps 1826 can also interact with the MEC platform 1832 to perform certain support procedures related to the lifecycle of the MEC Apps 1826, such as indicating availability, preparing relocation of user state, etc. The MEC Apps 1826 may have a certain number of rules and requirements associated to them, such as required resources, maximum latency, required or useful services, etc. These requirements may be validated by the MEC management, and can be assigned to default values if missing. MEC services 1836 are services provided and/or consumed either by the MEC platform 1832 and/or MEC Apps 1826. The service consumers (e.g., MEC Apps 1826 and/or MEC platform 1832) may communicate with particular MEC services 1836 over individual APIs (including MEC V2X API and the other MEC APIs discussed herein). When provided by an application, a MEC service 1836 can be registered in a list of services in the service registries 1838 to the MEC platform 1832 over the Mp1 reference point. Additionally, a MEC App 1826 can subscribe to one or more services 1830/1836 for which it is authorized over the Mp1 reference point.

Examples of MEC services 1836 include V2X information services (VIS), RNIS (see e.g., [MEC012], Location Services [MEC013], UE identity services [MEC014], Traffic Management Services (TMS) and BWMS [MEC015], WLAN Access Information (WAI) services [MEC028], Fixed Access Information (FAI) services [MEC029], and/or other MEC services. The RNIS, when available, provides authorized MEC Apps 1826 with radio network related information, and expose appropriate up-to-date radio network information to the MEC Apps 1826. The RNI may include, inter alia, radio network conditions, measurement and statistics information related to the UP, information related to UEs 1820 served by the radio node(s) associated with the MEC host 1802 (e.g., UE context and radio access bearers), changes on information related to UEs 1820 served by the radio node(s) associated with the MEC host XE136, and/or the like. The RNI may be provided at the relevant granularity (e.g., per UE 1820, per cell, per period of time).

The service consumers (e.g., MEC Apps 1826, MEC platform 1832, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 1832 (not shown). A MEC App 1826 may query information on a message broker via a transport information query procedure, wherein the transport information may be pre-provisioned to the MEC App 1826 via a suitable configuration mechanism. The various messages communicated via the RNI API may be in XML, JSON, Protobuf, or some other suitable format.

The VIS provides supports various V2X applications including the journey-aware QoS predictions among many others. The RNI may be used by MEC Apps 1826 and MEC platform 1832 to optimize the existing services and to provide new types of services that are based on up to date information on radio conditions. As an example, a MEC App 1826 may use RNI to optimize current services such as video throughput guidance. In throughput guidance, a radio analytics MEC App 1826 may use MEC services to provide a backend video server with a near real-time indication on the throughput estimated to be available at the radio DL interface in a next time instant. The throughput guidance radio analytics application computes throughput guidance based on the required radio network information it obtains from a multi-access Edge service running on the MEC server 1802. RNI may be also used by the MEC platform 1832 to optimize the mobility procedures required to support service continuity, such as when a certain MEC App 1826 requests a single piece of information using a simple request-response model (e.g., using RESTful mechanisms) while other MEC Apps 1826 subscribe to multiple different notifications regarding information changes (e.g., using a pub/sub mechanism and/or message broker mechanisms).

The LS, when available, may provide authorized MEC Apps 1826 with location-related information, and expose such information to the MEC Apps 1826. With location related information, the MEC platform 1832 or one or more MEC Apps 1826 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 1820 currently served by the radio node(s) associated with the MEC server 1802, information about the location of all UEs 1820 currently served by the radio node(s) associated with the MEC server XE136, information about the location of a certain category of UEs 1820 currently served by the radio node(s) associated with the MEC server XE136, a list of UEs 1820 in a particular location, information about the location of all radio nodes currently associated with the MEC host 1802, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 1802, or a subset thereof, according to a desired deployment. In this regard, the OMA Zonal Presence API provides means for MEC Apps 1826 to retrieve information about a zone, the access points associated to the zones and the users that are connected to the access points. In addition, the OMA Zonal Presence API, allows authorized application to subscribe to a notification mechanism, reporting about user activities within a zone. A MEC server 1802 may access location information or zonal presence information of individual UEs 1820 using the OMA Zonal Presence API to identify the relative location or positions of the UEs 1820.

The TMS allows Edge applications to get informed of various traffic management capabilities and multi-access network connection information, and allows Edge applications to provide requirements, e.g. delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 1826, and specify static/dynamic up/down bandwidth resources, including bandwidth size and bandwidth priority. MEC Apps 1826 may use the BWMS to update/receive bandwidth information to/from the MEC platform 1832. Different MEC Apps 1826 running in parallel on the same MEC server 1802 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism. The BWM service is for allocating/adjusting BW resources for MEC apps, and allows MEC apps to provide their BW requirements.

Different MEC applications (apps) running in parallel on the same MEC host may require specific static/dynamic up/down bandwidth (BW) resources, including BW size and BW priority. In some cases different sessions running in parallel on the same app may each have specific BW requirements. In addition, sessions driven by Apps running from closer to end users (e.g., shorter RTT) may receive unfair advantage over session driven by apps running from distant locations (e.g., outside the RAN). To resolve potential resource conflicts between such competing applications, BWM and/or Multi-access Traffic Steering (MTS) services may be used.

The MTS services may be provided as part of the BWMS or separately from the BWMS. The MTS service is for seamlessly steering/splitting/duplicating app data traffic across multiple access network connections. The MTS service allows apps/MEC apps to get informed of various MTS capabilities and MX network connection info. The MTS also allows MEC apps to provide requirements (e.g., delay, throughput, loss, etc.) for influencing traffic management operations. The specific session or app/MEC app may be identified using a set of filters and/or identifiers (IDs) within the resource request.

The purpose of the UE Identity feature is to allow UE specific traffic rules in the MEC system 1800. When the MEC system 1800 supports the UE Identity feature, the MEC platform 1832 provides the functionality (e.g., UE Identity API) for a MEC App 1826 to register a tag representing a UE 1820 or a list of tags representing respective UEs 1820. Each tag is mapped into a specific UE 1820 in the MNO's system, and the MEC platform 1832 is provided with the mapping information. The UE Identity tag registration triggers the MEC platform 1832 to activate the corresponding traffic rule(s) 1840 linked to the tag. The MEC platform 1832 also provides the functionality (e.g., UE Identity API) for a MEC App 1826 to invoke a de-registration procedure to disable or otherwise stop using the traffic rule for that user.

The WAIS is a service that provides WLAN access related information to service consumers within the MEC System 1800. The WAIS is available for authorized MEC Apps 1826 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 1800. The FAIS is available for the authorized MEC Apps 1826 and is discovered over the Mp1 reference point. The FAI may be used by MEC Apps 1826 and the MEC platform 1832 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 1826 and the MEC platform 1832 may consume the FAIS; and both the MEC platform 1832 and the MEC Apps 1826 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 1806 and the VI manager (VIM) 1808, and handles the management of MEC-specific functionality of a particular MEC server 1802 and the applications running on it. In some implementations, some or all of the multi-access Edge management components may be implemented by one or more servers located in one or more data centers, and may use virtualization infrastructure that is connected with NFV infrastructure used to virtualize NFs, or using the same hardware as the NFV infrastructure.

The MEC platform manager 1806 is responsible for managing the life cycle of applications including informing the MEC orchestrator (MEC-0) 1810 of relevant application related events. The MEC platform manager 1806 may also provide MEC Platform Element management functions 1844 to the MEC platform 1832, manage MEC App rules and requirements 1846 including service authorizations, traffic rules, DNS configuration and resolving conflicts, and manage MEC App lifecycles mgmt 1848. The MEC platform manager 1806 may also receive virtualized resources, fault reports, and performance measurements from the VIM 1808 for further processing. The Mm5 reference point between the MEC platform manager 1806 and the MEC platform 1832 is used to perform platform configuration, configuration of the MEC Platform element mgmt 1844, MEC App rules and reqts 1846, MEC App lifecycles mgmt 1848, and management of application relocation.

The VIM 1808 may be an entity that allocates, manages and releases virtualized (compute, storage and networking) resources of the VI 1822, and prepares the VI 1822 to run a software image. To do so, the VIM 1808 may communicate with the VI 1822 over the Mm7 reference point between the VIM 1808 and the VI 1822. Preparing the VI 1822 may include configuring the VI 1822, and receiving/storing the software image. When supported, the VIM 1808 may provide rapid provisioning of applications, such as described in "Openstack++ for Cloudlet Deployments", available at http://reports-archive.adm.cs.cmu.edu/anon/2015/CMU-CS-15-123.pdf. The VIM 1808 may also collect and report performance and fault information about the virtualized resources, and perform application relocation when supported. For application relocation from/to external cloud environments, the VIM 1808 may interact with an external cloud manager to perform the application relocation, for example using the mechanism described in "Adaptive VM Handoff Across Cloudlets", and/or possibly through a proxy. Furthermore, the VIM 1808 may communicate with the MEC platform manager 1806 via the Mm6 reference point, which may be used to manage virtualized resources, for example, to realize the application lifecycle management. Moreover, the VIM 1808 may communicate with the MEC-O 1810 via the Mm4 reference point, which may be used to manage virtualized resources of the MEC server 1802, and to manage application images. Managing the virtualized resources may include tracking available resource capacity, etc.

The MEC system level management includes the MEC-O 1810, which has an overview of the complete MEC system 1800. The MEC-O 1810 may maintain an overall view of the MEC system 1800 based on deployed MEC hosts 1802, available resources, available MEC services 1836, and topology. The Mm3 reference point between the MEC-O 1810 and the MEC platform manager 1806 may be used for the management of the application lifecycle, application rules and requirements and keeping track of available MEC services 1836. The MEC-O 1810 may communicate with the user application lifecycle management proxy (UALMP) 1814 via the Mm9 reference point in order to manage MEC Apps 1826 requested by UE app 1818.

The MEC-O 1810 may also be responsible for on-boarding of application packages, including checking the integrity and authenticity of the packages, validating application rules and requirements and if necessary adjusting them to comply with operator policies, keeping a record of on-boarded packages, and preparing the VIM(s) 1808 to handle the applications. The MEC-O 1810 may select appropriate MEC host(s) 901 for application instantiation based on constraints, such as latency, available resources, and available services. The MEC-O 1810 may also trigger application instantiation and termination, as well as trigger application relocation as needed and when supported.

The Operations Support System (OSS) 1812 is the OSS of an operator that receives requests via the Customer Facing Service (CFS) portal 1816 over the Mx1 reference point and from UE apps 1818 for instantiation or termination of MEC Apps 1826. The OSS 1812 decides on the granting of these requests. The CFS portal 1816 (and the Mx1 interface) may be used by third-parties to request the MEC system 1800 to run apps 1818 in the MEC system 1800. Granted requests may be forwarded to the MEC-O 1810 for further processing. When supported, the OSS 1812 also receives requests from UE apps 1818 for relocating applications between external clouds and the MEC system 1800. The Mm2 reference point between the OSS 1812 and the MEC platform manager 1806 is used for the MEC platform manager 1806 configuration, fault and performance management. The Mm1 reference point between the MEC-O 1810 and the OSS 1812 is used for triggering the instantiation and the termination of MEC Apps 1826 in the MEC system 1800.

The UE app(s) 1818 (also referred to as "device applications" or the like) is one or more apps running in a device 1820 that has the capability to interact with the MEC system 1800 via the user application lifecycle management proxy 1814. The UE app(s) 1818 may be, include, or interact with one or more client applications, which in the context of MEC, is application software running on the device 1818 that utilizes functionality provided by one or more specific MEC Apps 1826. The user app LCM proxy 1814 may authorize requests from UE apps 1818 in the UE 1820 and interacts with the OSS 1812 and the MEC-O 1810 for further processing of these requests. The term "lifecycle management," in the context of MEC, refers to a set of functions required to manage the instantiation, maintenance and termination of a MEC App 1826 instance. The user app LCM proxy 1814 may interact with the OSS 1812 via the Mm8 reference point, and is used to handle UE 1818 requests for running applications in the MEC system 1800. A user app may be an MEC App 1826 that is instantiated in the MEC system 1800 in response to a request of a user via an application running in the UE 1820 (e.g., UE App 1818). The user app LCM proxy 1814 allows UE apps 1818 to request on-boarding, instantiation, termination of user applications and when supported, relocation of user applications in and out of the MEC system 1800. It also allows informing the user apps about the state of the user apps. The user app LCM proxy 1814 is only accessible from within the mobile network, and may only be available when supported by the MEC system 1800. A UE app 1818 may use the Mx2 reference point between the user app LCM proxy 1814 and the UE app 1818 to request the MEC system 1800 to run an application in the MEC system 1800, or to move an application in or out of the MEC system 1800. The Mx2 reference point may only be accessible within the mobile network and may only be available when supported by the MEC system 1800.

In order to run an MEC App 1826 in the MEC system 1800, the MEC-O 1810 receives requests triggered by the OSS 1812, a third-party, or a UE app 1818. In response to receipt of such requests, the MEC-O 1810 selects a MEC server/host 1802 to host the MEC App 1826 for computational offloading, etc. These requests may include information about the application to be run, and possibly other information, such as the location where the application needs to be active, other application rules and requirements, as well as the location of the application image if it is not yet on-boarded in the MEC system 1800.

The MEC-O 1810 may select one or more MEC servers 1802 for computational intensive tasks. The selected one or more MEC servers XE136 may offload computational tasks of a UE app 1818 based on various operational parameters, such as network capabilities and conditions, computational capabilities and conditions, application requirements, and/or other like operational parameters. The application requirements may be rules and requirements associated to/with one or more MEC Apps 1826, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access Edge services that are required and/or useful for the MEC Apps 1826 to be able to run; multi-access Edge services that the MEC Apps 1826 can take advantage of, if available; connectivity or mobility support/requirements (e.g., application state relocation, application instance relocation); required multi-access Edge features, such as VM relocation support or UE identity; required network connectivity (e.g., connectivity to applications within the MEC system 1800, connectivity to local networks, or to the Internet); information on the operator's MEC system 1800 deployment or mobile network deployment (e.g., topology, cost); requirements on access to user traffic; requirements on persistent storage; traffic rules 1840; DNS rules 1842; etc.

The MEC-O 1810 considers the requirements and information listed above and information on the resources currently available in the MEC system 1800 to select one or several MEC servers 1802 to host MEC Apps 1826 and/or for computational offloading. After one or more MEC servers XE136 are selected, the MEC-O 1810 requests the selected MEC host(s) 1802 to instantiate the application(s) or application tasks. The actual algorithm used to select the MEC servers 1802 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 1810 may decide to select one or more new MEC hosts 1802 to act as a primary/source node, and initiates the transfer of an application instance or application-related state information from the one or more source MEC hosts 1802 to the one or more target MEC hosts 1802.

In a first implementation, a UPF of the 5GS is mapped into the MEC architecture 1800 as the MEC data plane 1824. In this implementation, the UPF handles the UP path of PDU sessions. Additionally, the UPF provides the interface to a data network and supports the functionality of a PDU session anchor.

In a second implementation, an application function (AF) of the 5GS is mapped into the MEC architecture 1800 as the MEC platform 1832. In these implementations, the AF is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN, MEC apps 1826, 1827, and/or 1828 can be mapped in or to the DN of the 5GS.

In a third implementation, the RAN of 5GS can be a virtual RAN based on a VNF, and the UPF is configurable or operable to function as the MEC data plane 1824 within an NF virtualization infrastructure (NFVI) (e.g., VI 1822). In these implementations, the AF can be configured as MEC platform VNF with MEC APIs, MEC app enablement functionality (see e.g., [MEC009]), and API principles functionality (see e.g., [MEC009]). Additionally, the local DN an include MEC apps 1826, 1827, and/or 1828 instantiated as VNFs. This implementation can be configured to provide functionalities in accordance with [MEC003] and/or ETSI GR MEC 017 V1.1.1 (2018 February) ("[MEC017]"). The third implementation may be combined with the first implementation and/or the second implementation, or may be a standalone implementation.

Additionally or alternatively, the access level Edge (e.g., the various NANs and/or (R)ANs discussed herein) can use one or more APIs to communicate with local/regional level Edge networks. The local/regional level Edge networks can include network nodes using corresponding applications to communicate with a national level Edge network. The national level Edge can include various NANs that use applications for accessing one or more remote clouds within the global level Edge. The NANs are also configurable or operable for vertical segment management and SLA compliance. Additionally or alternatively, MEC deployment can be based on the definition of "Edge" to provide degrees of freedom to MNOs, especially when deploying MEC in an NFV environment (e.g., MEC entities can be instantiated as Virtualized NFs (VNFs), thus with high flexibility in terms of deployment for the operator).

Additionally or alternatively, MEC system 1800 can be flexibly deployed depending on the use case/vertical segment/information to be processed. Some components of the MEC system 1800 can be co-located with other elements of the system. As an example, in certain use cases (e.g., enterprise), a MEC app 1826 may need to consume a MEC service locally, and it may be efficient to deploy a MEC host locally equipped with the needed set of APIs. In another example, deploying a MEC server 1802 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. Additionally or alternatively, a bandwidth management API may be present both at the access level Edge and also in more remote Edge locations, in order to set up transport networks (e.g., for CDN-based services).

FIG. 19 illustrates an example MEC service architecture 1900. MEC service architecture 1900 includes the MEC service 1905, ME platform 1910 (corresponding to MEC platform 1832), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 1910) and consumers (e.g., UEs 101, user apps instantiated by individual UEs 101, other servers/services, network functions, application functions, etc.). Each session represents an interactive information exchange between two or more elements, such as a client-side app and its corresponding server-side app, a user app instantiated by a UE 101 and a MEC app instantiated by the ME platform 1910, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 1111, 1121 and a DN that provides a PDU connectivity service, which is a service that provides for the exchange of PDUs between a UE 1111, 1121 and a Data Network. An MA PDU session is a PDU Session that provides a PDU connectivity service, which can use one access network at a time, or simultaneously a 3GPP access network 110A and a non-3GPP access network 110B. Furthermore, each session may be associated with a session identifier (ID) which is data the uniquely identifies a session, and each App (or App instance) may be associated with an App ID (or App instance ID) which is data the uniquely identifies an App (or App instance).

The MEC service 1905 provides one or more MEC services 1836 to MEC service consumers (e.g., Apps 1 to N). The MEC service 1905 may optionally run as part of the platform (e.g., ME platform 1910) or as an application (e.g., ME app). Different Apps 1 to N, whether managing a single instance or several sessions (e.g., CDN), may request specific service info per their requirements for the whole application instance or different requirements per session. The MEC service 1905 may aggregate all the requests and act in a manner that will help optimize the BW usage and improve Quality of Experience (QoE) for applications.

The MEC service 1905 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V2.1.1 (2019 January) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure: {apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 1838 in FIG. 18). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

4.2. Open RAN (O-RAN) Aspects

FIG. 20 illustrates an example Open RAN (O-RAN) system architecture 2000 according to various embodiments. The O-RAN architecture 2000 includes four O-RAN defined interfaces—namely, the A1 interface, the O1 interface, the O2 interface, and the Open Fronthaul Management (M)-plane interface—which connect the Service Management and Orchestration framework (SMO) 2002 to O-RAN network functions (NFs) 2004 and the O-Cloud 2006.

The O1 interface is an interface between orchestration & management entities (Orchestration/NMS) and O-RAN managed elements, for operation and management, by which FCAPS management, Software management, File management and other similar functions shall be achieved (see e.g., O-RAN Alliance Working Group (WG) 1, "O-RAN Architecture Description" v04.00 (March 2021) ("[O-RAN.WG1.O-RAN-Architecture-Description-v04.00]"), O-RAN Alliance WG6, "Cloud Architecture and Deployment Scenarios for O-RAN Virtualized RAN" v02.01 (July 2020) ("[O-RAN.WG6.CAD-v02.01]"). The O2 interface is an interface between the Service Management and Orchestration Framework and the O-Cloud (see e.g., [O-RAN.WG1.O-RAN-Architecture-Description-v04.00], [O-RAN.WG6.CAD-v02.01]). The A1 interface is an interface between the O-RAN Non-Real Time (RT) RAN Intelligent Controller (RIC) 2012 and the Near-RT RIC 2014 to enable policy-driven guidance of Near-RT RIC applications/functions, and support AI/ML workflow The SMO 2002 (see e.g., O-RAN Alliance WG1, "O-RAN Operations and Maintenance Interface Specification" v04.00 (November 2020) ("[O-RAN.WG1.O1-Interface.0-v04.00]")) also connects with an external system 2010, which provides enrichment data to the SMO 2002. FIG. 20 also illustrates that the A1 interface terminates at an O-RAN Non-Real Time (RT) RAN Intelligent Controller (RIC) 2012 in or at the SMO 2002 and at the O-RAN Near-RT RIC 2014 in or at the O-RAN NFs 2004. The O-RAN NFs 2004 can be VNFs such as VMs or containers, sitting above the O-Cloud 2006 and/or Physical Network Functions (PNFs) utilizing customized hardware. All O-RAN NFs 2004 are expected to support the O1 interface when interfacing the SMO 2002. The O-RAN NFs 2004 connect to the NG-Core 2008 via the NG interface (which is a 3GPP defined interface). The Open Fronthaul M-plane interface between the SMO 2002 and the O-RAN Radio Unit (O-RU) 2016 supports the O-RU 2016 management in the O-RAN hybrid model as specified in O-RAN Alliance WG4, O-RAN Fronthaul Management Plane Specification, version 2.0 (July 2019) ("[ORAN-WG4.MP.0-v02.00.00]"). The Open Fronthaul M-plane interface is an optional interface to the SMO 2002 that is included for backward compatibility purposes as per [ORAN-WG4.MP.0-v02.00.00], and is intended for management of the O-RU 2016 in hybrid mode only. The management architecture of flat mode O-RAN Alliance WG1, "O-RAN Operations and Maintenance Architecture Specification" v04.00 (November 2020) ("[O-RAN.WG1.OAM-Architecture-v04.00]") and its relation to the O1 interface for the O-RU 2016 is for future study. The O-RU 2016 termination of the O1 interface towards the SMO 2002 as specified in [O-RAN.WG1.OAM-Architecture-v04.00].

Figure 21:
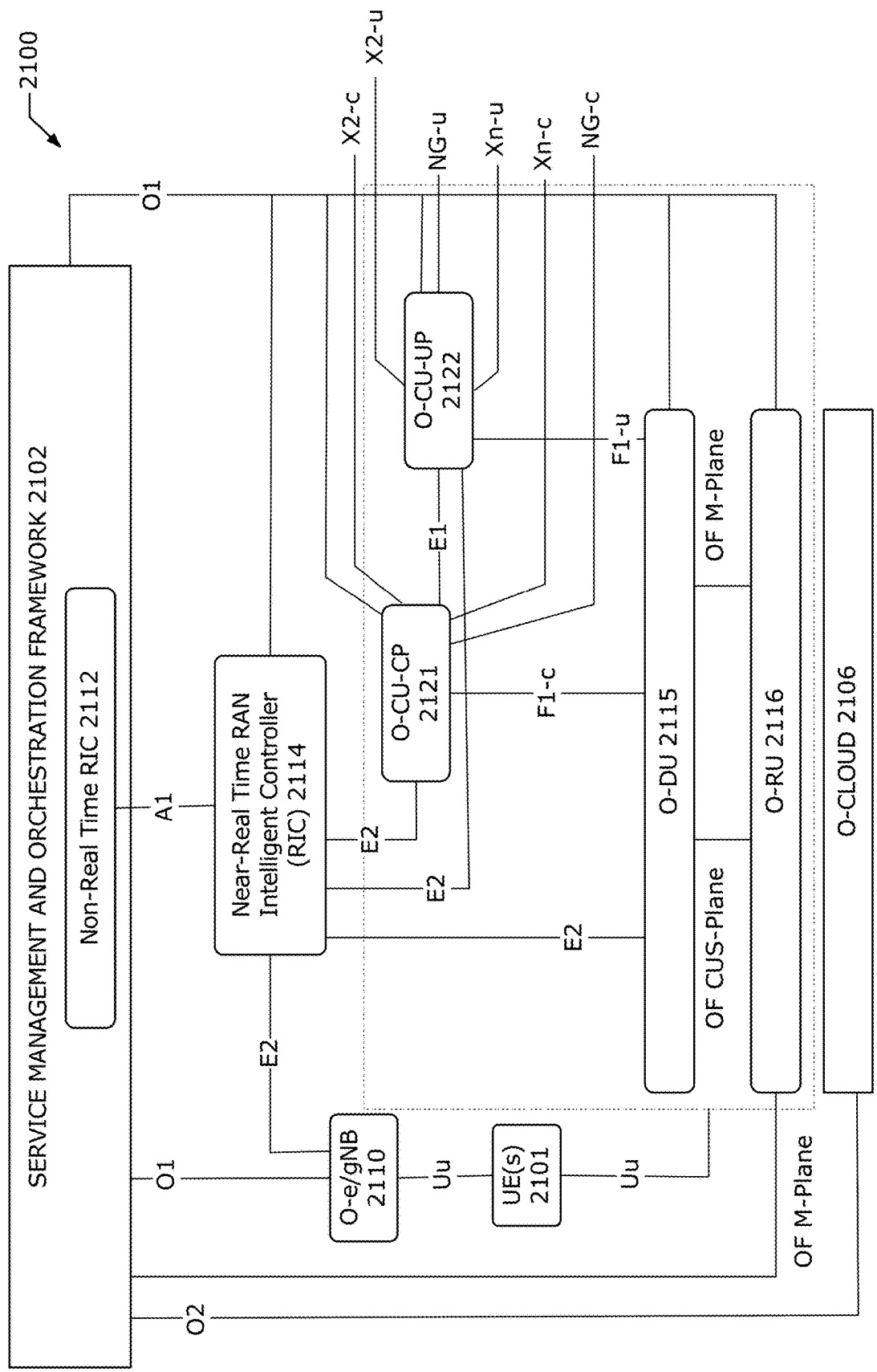
FIG. 21 depicts a logical architecture of the O-RAN system architecture of FIG. 20.

FIG. 21 illustrates a logical architecture 2100 of the O-RAN system architecture 2000 of FIG. 20. In FIG. 21, the SMO 2102 corresponds to the SMO 2002, O-Cloud 2106 corresponds to the O-Cloud 2006, the non-RT RIC 2112 corresponds to the non-RT RIC 2012, the near-RT RIC 2114 corresponds to the near-RT RIC 2014, and the O-RU 2116 corresponds to the O-RU 2016 of FIG. 21, respectively. The O-RAN logical architecture 2100 includes a radio portion and a management portion.

The management portion/side of the architectures 2100 includes the SMO 2102 containing the non-RT RIC 2112, and may include the O-Cloud 2106. The O-Cloud 2106 is a cloud computing platform including a collection of physical infrastructure nodes to host the relevant O-RAN functions (e.g., the near-RT RIC 2114, O-CU-CP 2121, O-CU-UP 2122, and the O-DU 2115), supporting software components (e.g., OSs, VMMs, container runtime engines, ML engines, etc.), and appropriate management and orchestration functions.

The radio portion/side of the logical architecture 2100 includes the near-RT RIC 2114, the O-RAN Distributed Unit (O-DU) 2115, the O-RU 2116, the O-RAN Central Unit—Control Plane (O-CU-CP) 2121, and the O-RAN Central Unit—User Plane (O-CU-UP) 2122 functions. The radio portion/side of the logical architecture 2100 may also include the O-e/gNB 2110.

The O-DU 2115 is a logical node hosting RLC, MAC, and higher PHY layer entities/elements (High-PHY layers) based on a lower layer functional split. The O-RU 2116 is a logical node hosting lower PHY layer entities/elements (Low-PHY layer) (e.g., FFT/iFFT, PRACH extraction, etc.) and RF processing elements based on a lower layer functional split. Virtualization of O-RU 2116 is FFS. The O-CU-CP 2121 is a logical node hosting the RRC and the control plane (CP) part of the PDCP protocol. The O-CU-UP 2122 is a logical node hosting the user plane part of the PDCP protocol and the SDAP protocol.

An E2 interface terminates at a plurality of E2 nodes. The E2 interface connects the near-RT RIC 2114 and one or more O-CU-CP 2121, one or more O-CU-UP 2122, one or more O-DU 2115, and one or more O-e/gNB 2110. The E2 nodes are logical nodes/entities that terminate the E2 interface. For NR/5G access, the E2 nodes include the O-CU-CP 2121, O-CU-UP 2122, O-DU 2115, or any combination of elements as defined in -RAN Alliance WG3, "O-RAN Near-Real-time RAN Intelligent Controller Architecture & E2 General Aspects and Principles" v01.01 (July 2020) ("[O-RAN.WG3.E2GAP-v01.01]"). For E-UTRA access the E2 nodes include the O-e/gNB 2110. As shown in FIG. 21, the E2 interface also connects the O-e/gNB 2110 to the Near-RT RIC 2114. The protocols over E2 interface are based exclusively on Control Plane (CP) protocols. The E2 functions are grouped into the following categories: (a) near-RT RIC 2114 services (REPORT, INSERT, CONTROL and POLICY, as described in [O-RAN.WG3.E2GAP-v01.01]); and (b) near-RT RIC 2114 support functions, which include E2 Interface Management (E2 Setup, E2 Reset, Reporting of General Error Situations, etc.) and Near-RT RIC Service Update (e.g., capability exchange related to the list of E2 Node functions exposed over E2). A RIC Service is a Service provided on an E2 Node to provide access to messages and measurements and/or enable control of the E2 Node from the Near-RT RIC.

FIG. 21 shows the Uu interface between a UE 2101 and O-e/gNB 2110 as well as between the UE 2101 and O-RAN components. The Uu interface is a 3GPP defined interface (see e.g., sections 5.2 and 5.3 of 3GPP TS 38.401 v16.3.0 (2020 Oct. 2) ("[TS38401]")), which includes a complete protocol stack from L1 to L3 and terminates in the NG-RAN or E-UTRAN. The O-e/gNB 2110 is an LTE eNB (see e.g., 3GPP TS 36.401 v16.0.0 (2020 Jul. 16)), a 5G gNB or ng-eNB 3GPP TS 38.300 v16.3.0 (2020 Oct. 2) ("[TS38300]") that supports the E2 interface.

The O-e/gNB 2110 may be the same or similar as NANs 1131-1133, and UE 2101 may be the same or similar as any of UEs 1121, 1111 discussed with respect to FIG. 11, and/or the like. There may be multiple UEs 2101 and/or multiple O-e/gNB 2110, each of which may be connected to one another the via respective Uu interfaces. Although not shown in FIG. 21, the O-e/gNB 2110 supports O-DU 2115 and O-RU 2116 functions with an Open Fronthaul interface between them.

The Open Fronthaul (OF) interface(s) is/are between O-DU 2115 and O-RU 2116 functions (see e.g., [ORAN-WG4.MP.0-v02.00.00], O-RAN Alliance WG4, "O-RAN Fronthaul Control, User and Synchronization Plane Specification 6.0" v06.00 (March 2021) ("[O-RAN-WG4.CUS.0-v06.00]")). The OF interface(s) includes the Control User Synchronization (CUS) Plane and Management (M) Plane. FIGS. 20 and 21 also show that the O-RU 2116 terminates the OF M-Plane interface towards the O-DU 2115 and optionally towards the SMO 2102 as specified in [ORAN-WG4.MP.0-v02.00.00]. The O-RU 2116 terminates the OF CUS-Plane interface towards the O-DU 2115 and the SMO 2102.

The F1-c interface connects the O-CU-CP 2121 with the O-DU 2115. As defined by 3GPP, the F1-c interface is between the gNB-CU-CP and gNB-DU nodes [TS38401], 3GPP TS 38.470 v16.3.0 (2020 Oct. 2) ("[TS38470]"). However, for purposes of O-RAN, the F1-c interface is adopted between the O-CU-CP 2121 with the O-DU 2115 functions while reusing the principles and protocol stack defined by 3GPP and the definition of interoperability profile specifications.

The F1-u interface connects the O-CU-UP 2122 with the O-DU 2115. As defined by 3GPP, the F1-u interface is between the gNB-CU-UP and gNB-DU nodes [TS38401], [TS38470]. However, for purposes of O-RAN, the F1-u interface is adopted between the O-CU-UP 2122 with the O-DU 2115 functions while reusing the principles and protocol stack defined by 3GPP and the definition of interoperability profile specifications.

The NG-c interface is defined by 3GPP as an interface between the gNB-CU-CP and the AMF in the 5GC [TS38300]. The NG-c is also referred as the N2 interface (see [TS38300]). The NG-u interface is defined by 3GPP, as an interface between the gNB-CU-UP and the UPF in the 5GC (see e.g., [TS38300]). The NG-u interface is referred as the N3 interface (see e.g., [TS38300]). In O-RAN, NG-c and NG-u protocol stacks defined by 3GPP are reused and may be adapted for O-RAN purposes.

The X2-c interface is defined in 3GPP for transmitting control plane information between eNBs or between eNB and en-gNB in EN-DC. The X2-u interface is defined in 3GPP for transmitting user plane information between eNBs or between eNB and en-gNB in EN-DC (see e.g., 3GPP TS 36.420 v16.0.0 (2020 Jul. 17), [TS38300]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., [TS38300], 3GPP TS 38.420 v16.0.0 (2020 Jul. 16)). In O-RAN, Xn-c and Xn-u protocol stacks defined by 3GPP are reused and may be adapted for O-RAN purposes The E1 interface is defined by 3GPP as being an interface between the gNB-CU-CP (e.g., gNB-CU-CP 3728) and gNB-CU-UP (see e.g., [TS38401], 3GPP TS 38.460 v16.1.0 (2020 Jul. 17)). In O-RAN, E1 protocol stacks defined by 3GPP are reused and adapted as being an interface between the O-CU-CP 2121 and the O-CU-UP 2122 functions.

The O-RAN Non-Real Time (RT) RAN Intelligent Controller (RIC) 2112 is a logical function within the SMO 2002, 2102 that enables non-real-time control and optimization of RAN elements and resources; AI/machine learning (ML) workflow(s) including model training, inferences, and updates; and policy-based guidance of applications/features in the Near-RT RIC 2114.

The O-RAN near-RT RIC 2114 is a logical function that enables near-real-time control and optimization of RAN elements and resources via fine-grained data collection and actions over the E2 interface. The near-RT RIC 2114 may include one or more AI/ML workflows including model training, inferences, and updates.

The non-RT RIC 2112 can be an ML training host to host the training of one or more ML models. ML training can be performed offline using data collected from the RIC, O-DU 2115 and O-RU 2116. For supervised learning, non-RT RIC 2112 is part of the SMO 2102, and the ML training host and/or ML model host/actor can be part of the non-RT RIC 2112 and/or the near-RT RIC 2114. For unsupervised learning, the ML training host and ML model host/actor can be part of the non-RT RIC 2112 and/or the near-RT RIC 2114. For reinforcement learning, the ML training host and ML model host/actor may be co-located as part of the non-RT RIC 2112 and/or the near-RT RIC 2114. In some implementations, the non-RT RIC 2112 may request or trigger ML model training in the training hosts regardless of where the model is deployed and executed. ML models may be trained and not currently deployed.

In some implementations, the non-RT RIC 2112 provides a query-able catalog for an ML designer/developer to publish/install trained ML models (e.g., executable software components). In these implementations, the non-RT RIC 2112 may provide discovery mechanism if a particular ML model can be executed in a target ML inference host (MF), and what number and type of ML models can be executed in the MF. For example, there may be three types of ML catalogs made discoverable by the non-RT RIC 2112: a design-time catalog (e.g., residing outside the non-RT RIC 2112 and hosted by some other ML platform(s)), a training/deployment-time catalog (e.g., residing inside the non-RT RIC 2112), and a run-time catalog (e.g., residing inside the non-RT RIC 2112). The non-RT RIC 2112 supports necessary capabilities for ML model inference in support of ML assisted solutions running in the non-RT RIC 2112 or some other ML inference host. These capabilities enable executable software to be installed such as VMs, containers, etc. The non-RT RIC 2112 may also include and/or operate one or more ML engines, which are packaged software executable libraries that provide methods, routines, data types, etc., used to run ML models. The non-RT RIC 2112 may also implement policies to switch and activate ML model instances under different operating conditions.

The non-RT RIC 2112 is be able to access feedback data (e.g., FM and PM statistics) over the O1 interface on ML model performance and perform necessary evaluations. If the ML model fails during runtime, an alarm can be generated as feedback to the non-RT RIC 2112. How well the ML model is performing in terms of prediction accuracy or other operating statistics it produces can also be sent to the non-RT RIC 2112 over O1. The non-RT RIC 2112 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 2114 and/or in the non-RT RIC 2112, which continuously monitors resource utilization. If resources are low or fall below a certain threshold, the runtime environment in the near-RT RIC 2114 and/or the non-RT RIC 2112 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 2112 (within or outside the SMO 2102) and the near-RT RIC 2114. The A1 interface supports three types of services as defined in -RAN Alliance WG2, "O-RAN A1 interface: General Aspects and Principles 2.02" v02.02 (March 2021) ("[O-RAN.WG2.A1GAP-v02.02]"), including a Policy Management Service, an Enrichment Information Service, and ML Model Management Service. A1 policies have the following characteristics compared to persistent configuration (see e.g., [O-RAN.WG2.A1GAP-v02.02]): A1 policies are not critical to traffic; A1 policies have temporary validity; A1 policies may handle individual UE or dynamically defined groups of UEs; A1 policies act within and take precedence over the configuration; and A1 policies are non-persistent, e.g., do not survive a restart of the near-RT RIC. O-RAN is currently developing a framework for adding 3rd party xApps to a Base Station product, which is assembled from components from different suppliers.

Figure 22:
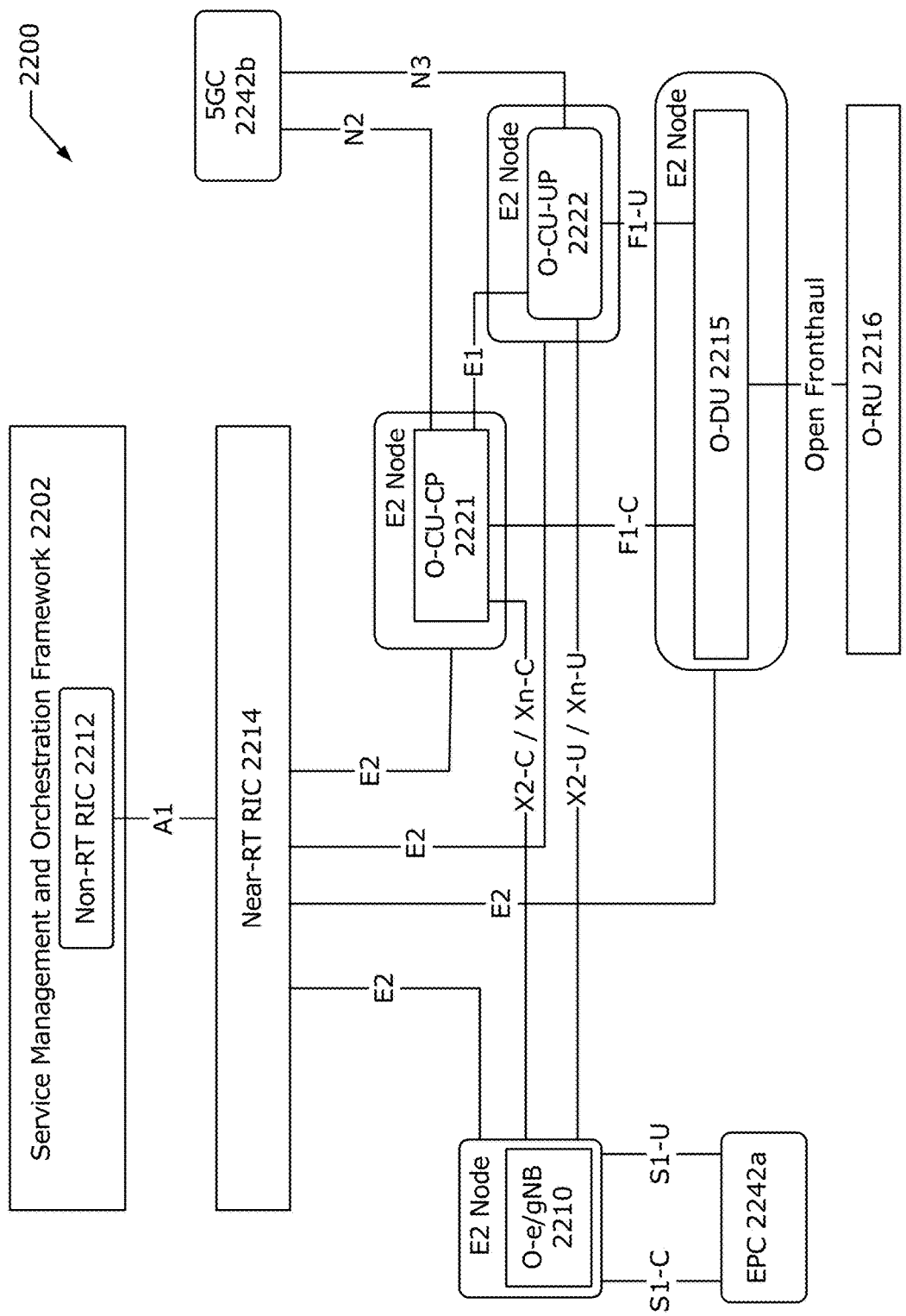
FIG. 22 illustrates an O-RAN Architecture including Near-RT RIC interfaces.

FIG. 22 illustrates an example O-RAN Architecture 2200 including Near-RT RIC interfaces. The Near-RT RIC 2214 is connected to the Non-RT RIC 2212 through the A1 interface (see e.g., [O-RAN.WG2.A1GAP-v02.02]). The Near-RT RIC 2214 is a logical network node placed between the E2 Nodes and the Service Management & Orchestration layer (SMO) 2202, which hosts the Non-RT RIC 2212. The Near-RT RIC 2214 may be the same or similar as the Near-RT RIC 2014 and Near-RT RIC 2114 of FIGS. 20 and 21, and the Non-RT RIC 2212 may be the same or similar as the Non-RT RIC 2012 and/or the Non-RT RIC 2112 of FIGS. 20 and 21. The SMO 2202 may be the same or similar to the SMO 2002 and/or the SMO 2102 of FIGS. 20 and 21. A Near-RT RIC 2214 is connected to only one Non-RT RIC 2212.

As mentioned previously, E2 is a logical interface connecting the Near-RT RIC 2214 with an E2 Node. The Near-RT RIC 2214 is connected to the O-CU-CP 2221, the Near-RT RIC 2214 is connected to the O-CU-UP 2222, the Near-RT RIC 2214 is connected to the O-DU 2215, and the Near-RT RIC 2214 is connected to the O-e/gNB 2210. The O-DU 2215 is connected to the O-RU 2216. The O-CU-CP 2221, the O-CU-UP 2222, the O-DU 2215, and the O-e/gNB 2210 may be the same or similar to the O-CU-CP 2121, the O-DU 2115, and the O-e/gNB 2110 of FIG. 21. The O-RU 2216 may be the same or similar to the O-RU 2016 and/or the O-RU 2116 of FIGS. 20 and 21.

An E2 Node is connected to only one Near-RT RIC 2214. A Near-RT RIC 2214 can be connected to multiple E2 Nodes (e.g., multiple O-CU-CPs 2221, O-CU-UPs 2222, O-DUs 2215, and O-e/gNBs 2210). F1 (e.g., F1 control plane (F1-C) and F1 user plane (F1-U)) and E1 are logical 3GPP interfaces, whose protocols, termination points and cardinalities are specified in [TS38401]. In addition, the Near-RT RIC 2214 and other RAN nodes have O1 interfaces as defined in [O-RAN.WG1.OAM-Architecture-v04.00], and [O-RAN.WG1.O-RAN-Architecture-Description-v04.00]. Additionally, the O-CU-CP 2221 is connected to the 5G Core Network (5GC) 2242b via an N2 interface, the O-CU-UP 2222 is connected to the 5GC 2242b via an N3 interface, and the O-gNBs 2210 is connected to the O-CU-CP 2221 via an Xn control plane interface (Xn-C), and is connected to the O-CU-UP 2222 via an Xn user plane interface (Xn-U); these interfaces are defined in 3GPP TS 23.501 v17.1.1 (2021 Jun. 24) ("[TS23501]"), 3GPP TS 38.300 v16.6.0 (2021 Jul. 6) ("[TS38300]"), and other 3GPP standards. Furthermore, the O-eNBs 2210 are connected to an Evolved Packet Core (EPC) 2242a via Si control place (S1-C) and Si user plane (S1-U) interfaces, and the O-eNBs 2210 is connected to the O-CU-CP 2221 via an X2 control plane interface (X2-C) and/or an Xn control plane interface (Xn-C), and is connected to the O-CU-UP 2222 via an X2 user plane interface (X2-U) and/or an Xn user plane interface (Xn-U); these interfaces are discussed in 3GPP TS 36.300 v16.6.0 (2021 Jul. 6) ("[TS36300]") and/or other other 3GPP standards.

The Near-RT RIC 2214 hosts one or more xApps that use the E2 interface to collect near real-time information (e.g., UE basis, Cell basis) and provide value added services. The Near-RT RIC 2214 may receive declarative Policies and obtain Data Enrichment information over the A1 interface (see e.g., [O-RAN.WG2.A1GAP-v02.02]).

The protocols over E2 interface are based on control plane protocols and are defined in O-RAN Alliance WG1, "Near-Real-time RAN Intelligent Controller, E2 Application Protocol (E2AP)" v01.01 (July 2020) ("[O-RAN.WG3.E2AP-v01.01"). On E2 or Near-RT RIC 2214 failure, the E2 Node will be able to provide services but there may be an outage for certain value-added services that may only be provided using the Near-RT RIC 2214.

The Near-RT RIC 2214 provides a database function that stores the configurations relating to E2 nodes, Cells, Bearers, Flows, UEs and the mappings between them. The Near-RT RIC 2214 provides ML tools that support data pipelining. The Near-RT RIC 2214 provides a messaging infrastructure. The Near-RT RIC 2214 provides logging, tracing and metrics collection from Near-RT RIC 2214 framework and xApps to SMO. The Near-RT RIC 2214 provides security functions. The Near-RT RIC 2214 supports conflict resolution to resolve the potential conflicts or overlaps which may be caused by the requests from xApps.

The Near-RT RIC 2214 also provides an open API enabling the hosting of 3rd party xApps and xApps from the Near-RT RIC 2214 platform vendor. Near-RT RIC 2214 also provides an open API decoupled from specific implementation solutions, including a Shared Data Layer (SDL) that works as an overlay for underlying databases and enables simplified data access.

An xApp is an application designed to run on the Near-RT RIC 2214. Such an application is likely to include or provide one or more microservices and at the point of on-boarding will identify which data it consumes and which data it provides. An xApp is independent of the Near-RT RIC 2214 and may be provided by any third party. The E2 enables a direct association between the xApp and the RAN functionality. A RAN Function is a specific Function in an E2 Node; examples include X2AP, F1AP, E1AP, S1AP, NGAP interfaces and RAN internal functions handling UEs, Cells, etc.

The architecture of an xApp comprises the code implementing the xApp's logic and the RIC libraries that allow the xApp to: send and receive messages; read from, write to, and get notifications from the SDL layer; and write log messages. Additional libraries will be available in future versions including libraries for setting and resetting alarms and sending statistics. Furthermore, xApps can use access libraries to access specific name-spaces in the SDL layer. For example, the R-NIB that provides information about which E2 nodes (e.g., CU/DU) the RIC is connected to and which SMs are supported by each E2 node, can be read by using the R-NIB access library.

The O-RAN standard interfaces (e.g., O1, A1, and E2) are exposed to the xApps as follows: xApp will receive its configuration via K8s ConfigMap—the configuration can be updated while the xApp is running and the xApp can be notified of this modification by using inotify( ); xApp can send statistics (PM) either by (a) sending it directly to VES collector in VES format, (b) by exposing statistics via a REST interface for Prometheus to collect; xApp will receive A1 policy guidance via an RMR message of a specific kind (policy instance creation and deletion operations); and xApp can subscribe to E2 events by constructing the E2 subscription ASN.1 payload and sending it as a message (RMR), xApp will receive E2 messages (e.g., E2 INDICATION) as RMR messages with the ASN.1 payload. Similarly xApp can issue E2 control messages.

In addition to A1 and E2 related messages, xApps can send messages that are processes by other xApps and can receive messages produced by other xApps. Communication inside the RIC is policy driven, that is, an xApp cannot specify the target of a message. It simply sends a message of a specific type and the routing policies specified for the RIC instance will determine to which destinations this message will be delivered (logical pub/sub).

Logically, an xApp is an entity that implements a well-defined function. Mechanically, an xApp is a K8s pod that includes one or multiple containers. In order for an xApp to be deployable, it needs to have an xApp descriptor (e.g., JSON) that describes the xApp's configuration parameters and information the RIC platform needs to configure the RIC platform for the xApp. The xApp developer will also need to provide a JSON schema for the descriptor.

In addition to these basic requirements, an xApp may do any of the following: read initial configuration parameters (passed in the xApp descriptor); receive updated configuration parameters; send and receive messages; read and write into a persistent shared data storage (key-value store); receive A1-P policy guidance messages—specifically operations to create or delete a policy instance (JSON payload on an RMR message) related to a given policy type; define a new A1 policy type; make subscriptions via E2 interface to the RAN, receive E2 INDICATION messages from the RAN, and issue E2 POLICY and CONTROL messages to the RAN; and report metrics related to its own execution or observed RAN events.

The lifecycle of xApp development and deployment consists of the following states: Development (design, implementation, local testing); Released (the xApp code and xApp descriptor are committed to LF Gerrit repo and included in an O-RAN release. The xApp is packaged as Docker container and its image released to LF Release registry); On-boarded/Distributed (the xApp descriptor (and potentially helm chart) is customized for a given RIC environment and the resulting customized helm chart is stored in a local helm chart repo used by the RIC environment's xApp Manager); Run-time Parameters Configuration (before the xApp can be deployed, run-time helm chart parameters will be provided by the operator to customized the xApp Kubernetes deployment instance. This procedure is mainly used to configure run-time unique helm chart parameters such as instance UUID, liveness check, east-bound and north-bound service endpoints (e.g., DBAAS entry, VES collector endpoint) and so on); and deployed (the xApp has been deployed via the xApp Manager and the xApp pod is running on a RIC instance. For xApps where it makes sense, the deployed status may be further divided into additional states controlled via xApp configuration updates. For example, Running, Stopped).

The general principles guiding the definition of Near-RT RIC architecture as well as the interfaces between Near-RT RIC 2214, E2 Nodes and Service Management & Orchestration are the following: Near-RT RIC 2214 and E2 Node functions are fully separated from transport functions. Addressing scheme used in Near-RT RIC 2214 and the E2 Nodes shall not be tied to the addressing schemes of transport functions; the E2 Nodes support all protocol layers and interfaces defined within 3GPP radio access networks that include eNB for E-UTRAN and gNB/ng-eNB for NG-RAN; Near-RT RIC 2214 and hosted "xApp" applications shall use a set of services exposed by an E2 Node that is described by a series of RAN function and Radio Access Technology (RAT) dependent E2 Service Models; and the Near-RT RIC 2214 interfaces are defined along the following principles: the functional division across the interfaces have as few options as possible; interfaces are based on a logical model of the entity controlled through this interface; and one physical network element can implement multiple logical nodes.

xApps may enhance the RRM capabilities of the Near-RT RIC 2214. xApps provide logging, tracing and metrics collection to the Near-RT RIC 2214. xApps include an xApp descriptor and xApp image. The xApp image is the software package. The xApp image contains all the files needed to deploy an xApp. An xApp can have multiple versions of xApp image, which are tagged by the xApp image version number.

The xApp descriptor describes the packaging format of xApp image. The xApp descriptor also provides the necessary data to enable their management and orchestration. The xApp descriptor provides xApp management services with necessary information for the LCM of xApps, such as deployment, deletion, upgrade etc. The xApp descriptor also provides extra parameters related to the health management of the xApps, such as auto scaling when the load of xApp is too heavy and auto healing when xApp becomes unhealthy. The xApp descriptor provides FCAPS and control parameters to xApps when xApp is launched.

The definition of xApp descriptor includes: xApp basic information, FCAPS management specifications, and control specifications. The basic information of xApp, including name, version, provider, URL of xApp image, virtual resource requirements (e.g., CPU), etc. The basic information of xApp is used to support LCM of xApps. Additionally or alternatively, the basic information of xApp includes or indicates configuration, metrics, and control data about an xApp. The FCAPS management specifications that specify the options of configuration, performance metrics collection, etc. for the xApp. The control specifications that specify the data types consumed and provided by the xApp for control capabilities (e.g., Performance Management (PM) data that the xApp subscribes, the message type of control messages).

Additionally or alternatively, the xApp descriptor components include xApp configuration, xApp controls specification, and xApp metrics. The xApp configuration specification includes a data dictionary for the configuration data (e.g., metadata such as a yang definition or a list of configuration parameters and their semantics). Additionally, the xApp configuration may include an initial configuration of xApps. The xApp controls specification includes the types of data it consumes and provides that enable control capabilities (e.g., xApp URL, parameters, input/output type). The xApp metrics specification shall include a list of metrics (e.g., metric name, type, unit and semantics) provided by the xApp.

Figure 23:
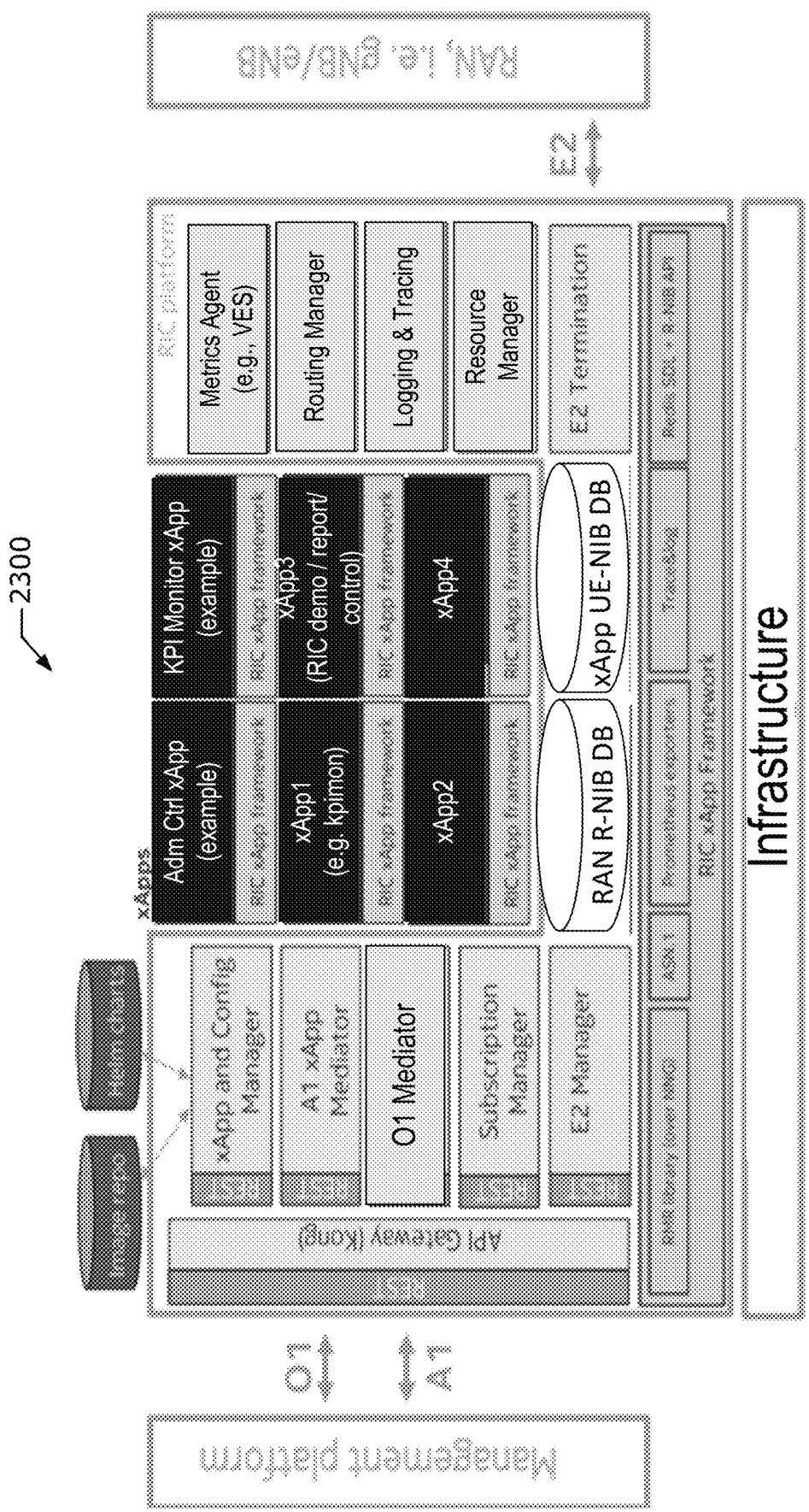
FIG. 23 depicts an O-RAN architectures/frameworks for adding 3rd party xApps.
Figure 24:
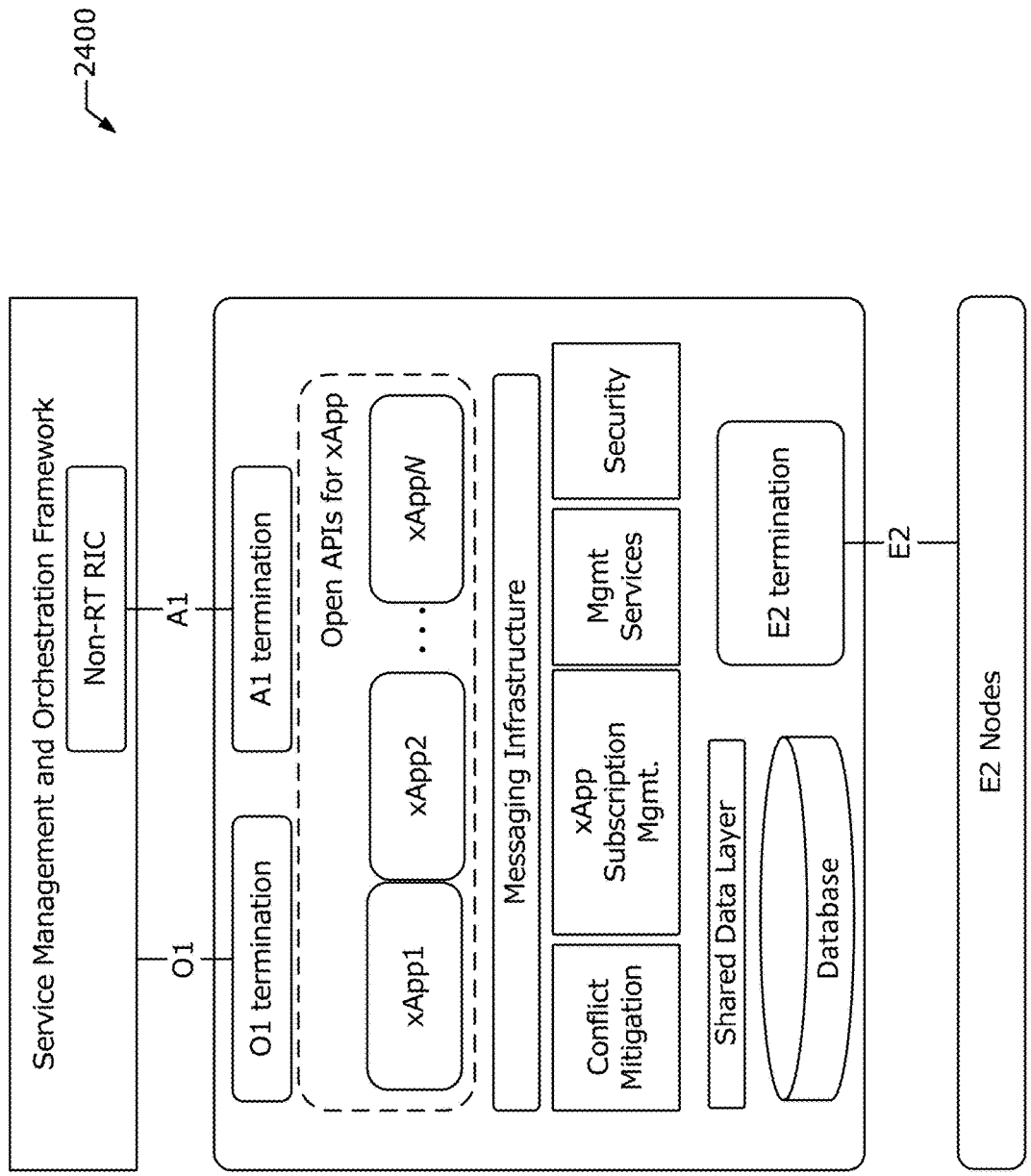
FIG. 24 depicts a Near-RT RIC Internal Architecture.

FIG. 23 depicts an O-RAN architecture/framework 2300 for adding 3rd party xApps, and FIG. 24 depicts a Near-RT RIC Internal Architecture 2400. In these examples, the Near-RT RIC hosts the following functions: Database functionality, which allows reading and writing of RAN/UE information; xApp subscription management, which merges subscriptions from different xApps and provides unified data distribution to xApps; Conflict mitigation, which resolves potentially overlapping or conflicting requests from multiple xApps; Messaging infrastructure, which enables message interaction amongst Near-RT RIC internal functions; Security, which provides the security scheme for the xApps; and Management services including: fault management, configuration management, and performance management as a service producer to SMO; life-cycle management of xApps; and logging, tracing and metrics collection, which capture, monitor and collect the status of Near-RT RIC internals and can be transferred to external system for further evaluation; and Interface Termination including: E2 termination, which terminates the E2 interface from an E2 Node; A1 termination, which terminates the A1 interface from the non-RT RIC; and O1 termination, which terminates the O1 interface from SMO; and Functions hosted by xApps, which allow services to be executed at the Near-RT RIC and the outcomes sent to the E2 Nodes via E2 interface.

xApps may provide UE related information to be stored in the UE-NIB (UE-Network Information Base) database. UE-NIB maintains a list of UEs and associated data. The UE-NIB maintains tracking and correlation of the UE identities associated with the connected E2 nodes.

xApps may provide radio access network related information to be stored in the R-NIB (Radio-Network Information Base) database. The R-NIB stores the configurations and near real-time information relating to connected E2 Nodes and the mappings between them.

xApp subscription management manages subscriptions from the xApps to the E2 Nodes. xApp subscription management enforces authorization of policies controlling xApp access to messages. xApp subscription management enables merging of identical subscriptions from different xApps into a single subscription to the E2 Node.

Referring to FIGS. 20-24, the O-RAN system/architecture/framework may provide one or more E2 service models (E2SMs) (see e.g., O-RAN Near-Real-time RAN Intelligent Controller E2 Service Model 1.0 (February 2020) ("[ORAN-WG3.E2SM-v01.00.00]")). An E2SM is a description of the services exposed by a specific RAN function within an E2 Node over the E2 interface towards the Near-RT RIC 2014. A given RAN Function offers a set of services to be exposed over the E2 (REPORT, INSERT, CONTROL and/or POLICY) using E2AP (see e.g., [O-RAN.WG3.E2AP-v01.0]) defined procedures. Each of the E2AP Procedures listed in Table 1 contain specific E2 Node RAN Function dependent Information Elements (IEs).

TABLE 1

Relationship between E2SM services and E2AP IEs

| RAN Function specific E2SM Information Elements | E2AP Information Element reference | Related E2AP Procedures |
| --- | --- | --- |
| RIC Event Trigger Definition IE | [O-RAN.WG3.E2AP-v01.01, section 9.2.9 | RIC SUBSCRIPTION |
| RIC Action Definition IE | [O-RAN.WG3.E2AP-v01.01, section 9.2.12 | RIC SUBSCRIPTION |
| RIC Indication Header IE | [O-RAN.WG3.E2AP-v01.01, section 9.2.17 | RIC INDICATION |
| RIC Indication Message IE | [O-RAN.WG3.E2AP-v01.01, section 9.2.16 | RIC INDICATION |

TABLE 1-continued

Relationship between E2SM services and E2AP IEs

| RAN Function specific E2SM Information Elements | E2AP Information Element reference | Related E2AP Procedures |
|---|---|---|
| RIC Call Process ID IE | [O-RAN.WG3.E2AP-v01.01, section 9.2.18 | RIC INDICATION RIC CONTROL |
| RIC Control Header IE | [O-RAN.WG3.E2AP-v01.01, section 9.2.20 | RIC CONTROL |
| RIC Control Message IE | [O-RAN.WG3.E2AP-v01.01, section 9.2.19 | RIC CONTROL |
| RAN Function Definition IE | [O-RAN.WG3.E2AP-v01.01, section 9.2.23 | E2 SETUP RIC SERVICE UPDATE |

All of these RAN Function specific IEs are defined in [O-RAN.WG3.E2AP-v01.01 as "OCTET STRING". The E2SMs include style types and format types. In this context, a "style type" is an identifier used to nominate a specific approach or Style used to exposing a given RIC Service (REPORT, INSERT, CONTROL and POLICY). The same E2SM may support more than one Style for each RIC Service. A "format type" is an identifier used to nominate a specific formatting approach used to encode one of the E2AP IEs defined in this E2SM. The same E2SM may support more than one encoding Formats for each E2AP IE and each E2AP IE message encoding Format may be used by one or more RIC Service Styles. Example E2SMs include E2SM Key Performance Measurement (E2SM-KPM) and E2SM RAN Control (E2SM-RC).

4.2.1. E2SM for Key Performance Measurements (E2SM-KPM)

E2SM-KPM is for the RAN function handling reporting of the cell-level performance measurements for 5G networks defined in 3GPP TS 28.552 v17.3.1 (2021 Jun. 24) ("[TS28552]") and for EPC networks defined in 3GPP TS 32.425 v17.1.0 (2021 Jun. 24) ("[TS32425]"), which are hereby incorporated by reference in their entireties, and their possible adaptation of UE-level or QoS flow-level measurements. The RAN function Key Performance Measurement (KPM) is used to provide RIC Service exposure of the performance measurement logical function of the E2 Nodes. Based on the O-RAN deployment architecture, available measurements could be different. FIG. 22 shows a deployment architecture for E2SM-KPM, wherein the E2 nodes are connected to the EPC 2242a and the 5GC 2242b as discussed previously. For each logical function the E2 Node uses the RAN Function Definition IE to declare the list of available measurements and a set of supported RIC Services (REPORT). The contents of these fields for the specific RAN Function KPM Monitor are discussed infra.

The E2SM-KPM supports O-CU-CP, O-CU-UP, and O-DU as part of NG-RAN connected to 5GC or as part of E-UTRAN connected to EPC. The E2 Node hosts the RAN Function "KPM Monitor" which performs the following functionalities: exposure of available measurements from O-DU, O-CU-CP, and/or O-CU-UP via the RAN Function Definition IE; and periodic reporting of measurements subscribed from Near-RT RIC.

The E2SM-KPM also exposes a set of services including report services. A KPM Report is the performance measurements for 4G LTE and 5G NR Network Functions. The "KPM Monitor" RAN Function provides the following REPORT services: E2 Node Measurement; E2 Node Measurement for a single UE; and condition-based, UE-level E2 Node Measurement. These services may be initiated according to: periodical event.

RAN Function description: The [O-RAN.WG3.E2AP-v01.01 procedures, E2 SETUP and RIC SERVICE UPDATE, are used to transport the RAN Function Definition IE. In this E2SM-KPM, the RAN Function Definition IE shall provide the following information: RAN Function name along with associated information on E2SM definition; event trigger styles list along with the corresponding encoding type for each associated E2AP IE; and RIC REPORT Service styles list along with the corresponding encoding type for each associated E2AP IE.

RAN Function Name: RAN Function Short Name "ORAN-E2SM-KPM". RAN Function Description "KPM Monitor." RAN Function Instance, required when and if an E2 Node exposes more than one instance of a RAN Function based on this E2SM.

Supported RIC Event Trigger Styles include Event Trigger style 1, which is a periodic report. The RIC Event Trigger Definition IE is based on reporting period. The Event Trigger style 1 is to set the KPM report period and uses the RIC Event Trigger Definition IE Format 1 (see Table 2).

TABLE 2

E2SM-KPM Event Trigger Definition Format 1

| IE/Group Name | Presence | Range | IE type and reference | Semantics description |
|---|---|---|---|---|
| Reporting Period | M | | INTEGER (1..4294967295) | The reporting period is expressed in unit of 1 millisecond. |

Supported RIC REPORT Service Styles include: RIC Style Type 1: E2 Node Measurement (Used to carry measurement report from a target E2 Node); RIC Style Type 2: E2 Node Measurement for a single UE (Used to carry measurement report for a single UE of interest from a target E2 Node); and RIC Style Type 2: Condition-based, UE-level E2 Node Measurement (Used to carry UE-level measurement report for a group of UEs matching subscribed conditions from a target E2 Node).

The RIC REPORT Service Style Type 1 provides the performance measurement information collection from an E2 Node. The RIC REPORT Service Style Type 1 subscribes to the measurements defined in [TS28552] and [TS32425], and uses the RIC Action Definition IE Format 1 (see Table 3a and Table 3b).

TABLE 3

E2SM-KPM Action Definition Format 1

| IE/Group Name | Presence | Range | IE type and reference | Semantics description |
|---|---|---|---|---|
| Measurement Information List | | 1.. <maxnoofMeasurementInfo> | | |
| >CHOICE Measurement Type | | | | |
| >>Measurement Name | M | | 8.3.9 Measurement Type Name | |
| >>Measurement ID | M | | 8.3.10 Measurement Type ID | |
| >List of Labels | | 1.. <maxnoofLabelInfo> | | |
| >>Label Information | M | | 8.3.11 Measurement Label | |
| Granularity Period | M | | 8.3.8 Granularity Period | Collection interval of measurements |
| Cell Global ID | O | | 8.3.20 Cell Global ID | Points to a specific cell for generating measurements subscribed by the Measurements Information List IE |

TABLE 3b

| Range bound | Explanation |
|---|---|
| maxnoofMeasurementInfo | Maximum no. of measurement types that can be reported by a single report. Value is <65535>. |
| maxnoofLabelInfo | Maximum no. of measurements values that can be reported for a single measurement type. Value is <2147483647>. |

The REPORT Service RIC Action Definition IE contains measurement types that Near-RT RIC is requesting to subscribe followed by a list of categories or subcounters to be measured for each measurement type, and a granularity period indicating collection interval of those measurements. The IE may also contain a cell identifier to point to a specific cell for collecting measurements within the E2 Node. A measurement ID can be used for subscription instead of a measurement type if an identifier of a certain measurement type was exposed by an E2 Node via the RAN Function Definition IE.

Additionally or alternatively, the RIC REPORT Service Style Type 1 uses the RIC Indication Header IE Format 1 (see Table 4), which contains a measurement collection start time as UTC format. The REPORT Service RIC Indication Header IE may carry file format version, sender name, sender type, and vendor name as printable strings.

TABLE 4

E2SM-KPM Indication Header Format 1

| IE/Group Name | Presence | Range | IE type and reference | Semantics description |
|---|---|---|---|---|
| Collection Start Time | M | | 8.3.12 Time Stamp | |
| File Format Version | O | | PrintableString (SIZE (0..15), ...) | |
| Sender Name | O | | PrintableString (SIZE (0..400), ...) | |
| Sender Type | O | | PrintableString (SIZE (0..8), ...) | |
| Vendor Name | O | | PrintableString (SIZE (0..32), ...) | |

Additionally or alternatively, the RIC REPORT Service Style Type 1 uses the RIC Indication Message IE Format 1 (8.2.1.4.1). The REPORT Service RIC Indication Message IE carries a set of measurement data reported from an E2 Node. The reported data contains a set of measurement records, each collected at every granularity period during the reporting period. In case the E2 Node is not able to provide reliable data for a granularity period during the reporting period, it may include the optional Incomplete Flag IE, which indicates that the corresponding measurements record in the reported data is not reliable. The REPORT Service RIC Indication Message IE optionally carry subscription information, e.g. Measurement Information List IE that indicates the order of measured values for each measurement record in the reported data, or their granularity period. If not present, the original subscription information shall apply.

The RIC REPORT Service Style Type 2 provides the performance measurement information collection for a single UE of interest from an E2 Node. The RIC REPORT Service Style Type 2 uses the RIC Action Definition IE Format 2 (see Table 5), where the included UE ID indicates a specific UE of interest for measurement collection.

TABLE 5

E2SM-KPM Action Definition Format 2

| IE/Group Name | Presence | Range | IE type and reference | Semantics description |
| --- | --- | --- | --- | --- |
| UE ID | M | | 8.3.24 | Points to a specific UE of interest |
| Subscription Information | M | | 8.2.1.2.1 E2SM-KPM Action Definition Format 1 | |

The rest of the subscription information follows the same as described for the REPORT Service RIC Action Definition IE. Additionally or alternatively, the RIC REPORT Service Style Type 2 uses the RIC Indication Header IE Format 1 (see Table 4) as described for the REPORT Service RIC Indication Header IE. Additionally or alternatively, the RIC REPORT Service Style Type 2 uses the RIC Indication Message IE Format 1 (see Table 6a and Table 6b) as described for the REPORT Service RIC Indication Message IE, where the measurement data reported is associated only to a specific UE that was subscribed.

TABLE 6a

E2SM-KPM Indication Message Format 1

| IE/Group Name | Presence | Range | IE type and reference | Semantics description |
| --- | --- | --- | --- | --- |
| Measurements Data | | 1..<maxnoofMeasurementRecord> | | |
| >Measurements Record | | 1..<maxnoofMeasurementValue> | | Contains measured values in same order as in the Measurements Information List IE if present, otherwise in the order defined in the subscription identified by the Subscription ID. |
| >>CHOICE Measured Value | | | | |
| >>>Integer Value | M | | INTEGER (0..4294967295) | |
| >>>Real Value | M | | REAL | |
| >>>No Value | M | | NULL | |
| >Incomplete Flag | O | | ENUMERATED (true, ...) | Indicates that the measurements record is not reliable. |
| Measurement Information List | | 0..<maxnoofMeasurementInfo> | | |
| >CHOICE | | | | |

TABLE 6a-continued

E2SM-KPM Indication Message Format 1

| IE/Group Name | Presence | Range | IE type and reference | Semantics description |
|---|---|---|---|---|
| Measurements Type | | | | |
| >>Measurement Name | M | | 8.3.9 Measurement Type Name | |
| >>Measurement ID | M | | 8.3.10 Measurement Type ID | |
| >List of Labels | | 1..<maxnoof LabelInfo> | | |
| >>Label Information | M | | 8.3.11 Measurement Label | |
| Granularity Period | O | | 8.3.8 Granularity Period | Collection interval of measurements |

TABLE 6b

| Range bound | Explanation |
|---|---|
| maxnoofMeasurementInfo | Maximum no. of measurement types that can be reported by a single report. Value is <65535>. |
| maxnoofLabelInfo | Maximum no. of measurements values that can be reported for a single measurement type. Value is <2147483647>. |
| maxnoofMeasurementRecord | Maximum no. of measurement records that can be reported by a single report. Value is <65535>. |
| maxnoofMeasurementValue | Maximum no. of measurement values that can be carried by a single measurement record. Value is <2147483647>. |

The RIC REPORT Service Style Type 3 provides the UE-level performance measurement information collection for a group of UEs matching subscribed conditions from an E2 Node. The RIC REPORT Service Style Type 3 uses the RIC Action Definition IE Format 3 (see Table 7a and Table 7b), where, for each requested measurement within the Measurement Information Condition List IE, the Matching Condition IE serves as a condition to include the matched UEs' measurement values into the reporting.

TABLE 7a

E2SM-KPM Action Definition Format 3

| IE/Group Name | Presence | Range | IE type and reference | Semantics description |
|---|---|---|---|---|
| Measurement Information List | | 1..<maxnoofMeas urementInfo> | | |
| >CHOICE Measurements Type | | | | |
| >>Measurement Name | M | | 8.3.9 Measurement Type Name | |
| >>Measurement ID | M | | 8.3.10 Measurement Type ID | |
| >Matching Condition | | 1..<maxnoof ConditionInfo> | | The Matching Condition represents the Boolean expression, the components of which are |

TABLE 7a-continued

E2SM-KPM Action Definition Format 3

| IE/Group Name | Presence | Range | IE type and reference | Semantics description |
|---|---|---|---|---|
| | | | | connected with logical AND |
| >>CHOICE Condition Type | M | | | |
| >>>Label Information | | | 8.3.11 Measurement Label | |
| >>>Test Information | | | 8.3.22 Test Condition Information | |
| Granularity Period | M | | 8.3.8 Granularity Period | Collection interval of measurements |
| Cell Global ID | O | | 8.3.20 Cell Global ID | Points to a specific cell for generating measurements subscribed by the Measurements Information List IE |

TABLE 7b

| Range bound | Explanation |
|---|---|
| maxnoofMeasurementInfo | Maximum no. of measurement types that can be reported by a single report. Value is <65535>. |
| maxnoolConditionInfo | Maximum no. of conditions that can be subscribed for a single measurement type. Value is <32768>. |

The Matching Condition IE can be expressed by a list of subcounters to be measured (e.g. as a list of labels), or by a list of test conditions that need to be passed, or by a combination of both. The rest of the subscription information follows the same as described for the REPORT Service RIC Action Definition IE.

The RIC REPORT Service Style Type 3 uses the RIC Indication Header IE Format 1 (8.2.1.3.1) as described for the REPORT Service RIC Indication Header IE. Additionally or alternatively, the RIC REPORT Service Style Type 3 uses the RIC Indication Message IE Format 2 (see Table 8a and Table 8b).

TABLE 8a

E2SM-KPM Indication Message Format 2

| IE/Group Name | Presence | Range | IE type and reference | Semantics description |
|---|---|---|---|---|
| Measurements Data | | 1..<maxnoofMeasurementRecord> | | |
| >Measurements Record | | 1..<maxnoofMeasurementValue> | | Contains measured values in same order as in the Measurements Information Condition UE List IE. |
| >>CHOICE Measured Value | | | | |
| >>>Integer Value | M | | INTEGER (0..4294967295) | |
| >>>Real Value | M | | REAL | |
| >>>No Value | M | | NULL | |
| >Incomplete Flag | O | | ENUMERATED (true, ...) | Indicates that the measurements record is not reliable. |
| Measurement Information Condition UE List | | 1..<maxnoofMeasurementInfo> | | |
| >CHOICE | | | | |

TABLE 8a-continued

E2SM-KPM Indication Message Format 2

| IE/Group Name | Presence | Range | IE type and reference | Semantics description |
|---|---|---|---|---|
| Measurements Type | | | | |
| >>Measurements Name | M | | 8.3.9 Measurements Type Name | |
| >>Measurements ID | M | | 8.3.10 Measurements Type ID | |
| >Matching Condition | | 1..<maxnoof ConditionInfo> | | |
| >>CHOICE Condition Type | M | | | |
| >>>Label Information | | | 8.3.11 Measurements Label | |
| >>>Test Information | | | 8.3.22 Test Condition Information | |
| >List of matched UE IDs | | 0..<maxnoofUEID> | | |
| >>UE ID | M | | 8.3.24 | |
| Granularity Period | O | | 8.3.8 Granularity Period | Collection interval of measurements |

TABLE 8b

| Range bound | Explanation |
|---|---|
| maxnoofMeasurementInfo | Maximum no. of measurement types that can be reported by a single report. Value is <65535>. |
| maxnoofConditionInfo | Maximum no. of conditions that can be subscribed for a single measurement type. Value is <32768>. |
| maxnoofUEID | Maximum no. of UE IDs that can be reported for a single condition. Value is <65535>. |
| maxnoofMeasurementRecord | Maximum no. of measurement records that can be reported by a single report. Value is <65535>. |
| maxnoofMeasurementValue | Maximum no. of measurement values that can be carried by a single measurement record. Value is <2147483647>. |

The REPORT Service RIC Indication Message IE carries a set of UE-level measurement data matching subscribed conditions. The included Measurement Information Condition UE List IE indicates the order of measured values for each measurement record in the reported data—a list of UE IDs satisfying the subscribed Matching Condition IE for each requested measurement.

In every granularity period during which a UE matching a subscribed condition stays in the E2 Node and maintains the RRC CONNECTED or RRC INACTIVE state, the E2 Node collects the related data and reports it at the end of the reporting period. In the granularity periods where the UE does not appear in the RRC CONNECTED or RRC INACTIVE state (e.g. transitioned to RRC IDLE or UE identity track is lost), the E2 Node does not collect the related data and NULL is reported for those granularity periods until the end of the Reporting Period. In this case, the E2 Node stops reporting measurements related to this UE in the subsequent reporting periods. The list of matched UE IDs can be omitted for a certain subscribed condition if none of the UEs were matched during the reporting period. The rest of the information follows the same as described for the REPORT Service RIC Indication Message IE.

The conversion of the measurements' definitions provided in [TS28552] and [TS532425] is performed according to the rules in Table 9.

TABLE 9

Conversion for UE-level and QoS flow-level measurements

| The type of the original measurements | The corresponding per-UE and per-UE-per-slice measurements | The corresponding per-QoS flow and per-slice-per-QoS flow measurements | Notes |
|---|---|---|---|
| Throughput Delay Data volume In-session activity time | Measured per UE | Measured per QoS flow | For the Throughput and Data volume measurements, the formulas specified in 3GPP are used with restriction to the individual |

TABLE 9-continued

Conversion for UE-level and QoS flow-level measurements

| The type of the original measurements | The corresponding per-UE and per-UE-per-slice measurements | The corresponding per-QoS flow and per-slice-per-QoS flow measurements | Notes |
|---|---|---|---|
| PDCP drop rate IP latency | Measured per UE | Measured per QoS flow | UE or individual QoS flow, and also based on Section 7.9.1. For the Throughput and Data volume measurements, the formulas specified in 3GPP are used with restriction to the individual UE or individual QoS flow. |
| Radio resource utilization | Measured per UE | N/A | The formulas specified in 3GPP are use with restriction to the individual UE. |
| RRC connections related PDU sessions related DRBs related QoS flows related | Measured per UE | N/A | |
| Mobility management | Measured per UE | N/A | |
| CQI related MCS related | Measured per UE | N/A | |
| PEE related | N/A | N/A | |
| Distribution of Normally/Abnormally Released Calls | Measured per UE | N/A | |

The units of the following measurements in [TS28552] and [TS32425] are replaced with newer units, as shown by Table 10.

TABLE 10

Changes in the units of measurements while adopting for E2SM-KPM

| Measurement Type | Measurement Name | Data Type | Unit used in 3GPP | Unit used in E2SM-KPM |
|---|---|---|---|---|
| DL Cell PDCP SDU Data Volume, defined in [TS28552] clause 5.1.2.1.2.1. | DRB.PdcpSduVolumeDL_Filter | INTEGER | Mbit | Kbit |
| UL Cell PDCP SDU Data Volume, defined in [TS28552] clause 5.1.2.1.2.2. | DRB.PdcpSduVolumeUL_Filter | INTEGER | Mbit | Kbit |
| DL PDCP PDU Data Volume, defined in [TS28552] clause 5.1.3.6.1.1. | QosFlow.PdcpPduVolumeDL_Filter | INTEGER | Mbit | Kbit |
| UL PDCP PDU Data Volume, defined in [TS28552] clause 5.1.3.6.1.2. | QosFlow.PdcpPduVolumeUL_Filter | INTEGER | Mbit | Kbit |
| DL PDCP SDU Data Volume, defined in [TS28552] clause 5.1.3.6.2.1. | QosFlow.PdcpSduVolumeDl_Filter | INTEGER | Mbit | Kbit |
| UL PDCP SDU Data Volume, defined in [TS28552] clause 5.1.3.6.2.2. | QosFlow.PdcpSduVolumeUl_Filter | INTEGER | Mbit | Kbit |
| DL Cell PDCP SDU Data Volume on X2 interface, defined in [TS28552] clause 5.1.2.1.1.2. | DRB.PdcpSduVolumeX2DL_Filter | INTEGER | Mbit | Kbit |
| UL Cell PDCP SDU Data Volume on X2 interface, defined in [TS28552] clause 5.1.2.1.2.2. | DRB.PdcpSduVolumeX2UL_Filter | INTEGER | Mbit | Kbit |
| DL Cell PDCP SDU Data Volume on Xn interface, defined in [TS28552] clause 5.1.2.1.1.3. | DRB.PdcpSduVolumeXnDL_Filter | INTEGER | Mbit | Kbit |
| UL Cell PDCP PDU Data Volume on Xn interface, defined in [TS28552] clause 5.1.2.1.2.3. | DRB.PdcpSduVolumeXnUL_Filter | INTEGER | Mbit | Kbit |
| DL PDCP SDU Data Volume per interface, defined in [TS28552] clause 5.1.3.6.2.3. | DRB.F1uPdcpSduVolumeDl.QoS, DRB.X2uPdcpSduVolumeDl.QoS, DRB.XnuPdcpSduVolumeDl.QoS | INTEGER | Mbit | Kbit |

TABLE 10-continued

Changes in the units of measurements while adopting for E2SM-KPM

| Measurement Type | Measurement Name | Data Type | Unit used in 3GPP | Unit used in E2SM-KPM |
|---|---|---|---|---|
| UL PDCP SDU Data Volume per interface, defined in [TS28552] clause 5.1.3.6.2.4. | DRB.F1uPdcpSduVolumeUL.QoS, DRB.X2uPdcpSduVolumeUL.QoS, DRB.XnuPdcpSduVolumeUL.QoS | INTEGER | Mbit | Kbit |
| DL cell PDCP SDU Data Volume, defined in [TS32425] clause 4.4.7.1. | DRB.PdcpSduVolumeDl_Filter | INTEGER | Mbit | Kbit |
| UL cell PDCP SDU Data Volume, defined in [TS32425] clause 4.4.7.2. | DRB.PdcpSduVolumeUl_Filter | INTEGER | Mbit | Kbit |
| In-session activity time for UE, defined in [TS28552] clause 5.1.1.13.2.2. | QF.SessionTimeUE | INTEGER | s | ms |
| In-session activity time for DRB, defined in [TS28552] clause 5.1.1.10.4. | DRB.SessionTime.5QI, DRB.SessionTime.SNSSAI | INTEGER | s | ms |
| In-session activity time for QoS flow, defined in [TS28552] clause 5.1.1.13.2.1. | QF.SessionTimeQoS.QoS | INTEGER | s | ms |
| In-session activity time for UE, defined in [TS32425] clause 4.2.4.1. | ERAB.SessionTimeUE | INTEGER | s | ms |
| In-session activity time for E-RABs, defined in [TS32425] clause 4.2.4.2. | ERAB.SessionTimeQCI.QCI | INTEGER | s | ms |
| IF throughput in UL, defined in [TS32425] clause 4.4.6.2. | DRB.IPThpUl.QCI | REAL | Kbit | Kbit/s |

The changes in the units of the measurements shown in the above table are to prevent the reported values from being reported as 0 caused by rounding off the precision in the decimals to report them as INTEGER, except the last row of "IP throughput in UL", which is to fix the erroneous unit.

In some implementations, the E2SM KPM RIC style message(s) discussed previously can be used to provide observations to an agent (e.g., agent 140, edge intelligence element 446, real-time agent 501, agent 640, etc.). For example, a CU (e.g., O-CU-CP 2121 and/or O-CU-UP 2122) can use E2SM KPM RIC style message(s) to convey, to an RIC (e.g., Near-RT RIC 2114 and/or Non-RT RIC 2112), data volume (per QoS level) measurements (e.g., the PDCP PDU data volume measurements discussed previously; see e.g., [TS28552] § 5.1.3.6.1), CU-UP delay (e.g., average and/or distribution of packet delay on the CU-UP; see e.g., [TS28552] § 5.1.3.3), and/or F1-U delay (e.g., average and/or distribution of packet delay on the F1-U), and/or the like. In another example, a DU (e.g., O-DU 2115) can use E2SM KPM RIC style message(s) to convey, to an RIC (e.g., Near-RT RIC 2114 and/or Non-RT RIC 2112), per UE throughput (e.g., average and/or distribution of UE throughput in NAN (e.g., gNB); see e.g., [TS28552] § 5.1.1.3), per UE CQI/MCS related measurements (see e.g., [TS28552] § 5.1.1.11 and [TS28552] § 5.1.1.12), gNB-DU delay (see e.g., [TS28552] § 5.1.3.3.3). Additional aspects of the E2SM-KPM are discussed in O-RAN Working Group 3 Near-Real-time RAN Intelligent Controller E2 Service Model (E2SM) KPM v01.00 (February 2020) ("[ORAN-WG3.E2SM-KPM-v01.00]").

4.2.2. E2SM for the Near RT RIC RAN Control interaction (E2SM-RC)

For the purposes of the E2SM-RC, the E2 Node terminating the E2 Interface is assumed to host one or more instances of the RAN Function "RAN Control" which performs the following functionalities: E2 REPORT services used to expose RAN control and UE context related information; E2 INSERT services used to suspend RAN control related call processes; E2 CONTROL services used to resume or initiate RAN control related call processes, modify RAN configuration and/or E2 service-related UE context information; and E2 POLICY services used to modify the behaviour of RAN control related processes.

The E2SM-RC also includes a set of RAN Function exposure services described infra wherein the same E2SM may be used to describe either a single RAN Function in the E2 Node handling all RAN control related call processes or more than one RAN Function in the E2 Node with each instance handling a subset of the RAN control related call processes on the E2 Node. The E2SM-RC supports the event trigger definition IE styles summarized by Table 11.

TABLE 11

RIC Event trigger definition IE style list

| RIC Style Type | Style Name | Supported RIC Service Style | | | Style Description |
| | | Report | Insert | Policy | |
|---|---|---|---|---|---|
| 1 | Message Event | 1 | 8 | 1-7 | Triggering conditions are based on arrival or departure of network interface message or RRC message. |

TABLE 11-continued

RIC Event trigger definition IE style list

| RIC Style Type | Style Name | Supported RIC Service Style | | | Style Description |
|---|---|---|---|---|---|
| | | Report | Insert | Policy | |
| 2 | Call Process Breakpoint | 2 | 1-7 | 1-7 | Triggering conditions are based on call process breakpoint. |
| 3 | E2 Node Information Change | 3 | — | — | Triggering conditions are based on change of E2 Node or cell related configuration information. |
| 4 | UE Information Change | 4 | — | — | Triggering conditions are based on change of UE Information. |
| 5 | On Demand | 5 | — | — | Event is immediately triggered when RIC subscription with this event trigger is accepted. |

In some implementations, RIC Style Type 1 can be used for Radio Bearer control. The RIC Style Type 1 message can include a control action ID 5 to indicate that the message is for DRB termination control, and/or the RIC Style Type 1 message can include a control action ID 6 to indicate that the message is for DRB split ratio control.

The RAN Function exposure services for E2SM-RC include REPORT services, INSERT services, CONTROL services, and POLICY services.

4.2.2.1. REPORT Service

The E2SM-RC RAN Function provides selective support of the following REPORT services: copy of Complete message (from Network Interface or RRC), used for monitoring POLICY services, data gathering (to populate the Near-RT RIC UE-NIB and/or ML services data pipeline), etc.; call process outcome with associated information on UE context and/or RAN status information, used for monitoring [CONTROL and] POLICY services, data gathering (to populate the Near-RT RIC UE-NIB and/or ML services data pipeline), etc.; E2 Node Information and Cell related Information, used for monitoring of E2 Node and Cell configuration changes, triggering POLICY deletion, changing notifications (to reset Near-RT RIC optimization services), etc.; UE Information, used for monitoring of UE information changes, triggering E2 Control, location tracking, etc.; and On Demand Report, used for reporting Cell related, E2 Node related and UE related information to Near-RT RIC when requested by Near-RT RIC. In some implementations, only the UE with user consent can be configured to report location information.

The E2SM-RC REPORT service requirements are offered using a set of REPORT Styles. All REPORT styles are implemented using a set of IEs for Action Definition, RIC Indication Header and RIC Indication Message and have specific Event Trigger approach. For each Report style, a single RAN Parameter table is used to specify the required information to be reported.

The following REPORT styles are supported: message copy (this REPORT style is initiated by "Message Event" Event Trigger and is used to report complete NI or RRC message along with UE associated information when the event trigger conditions are satisfied); Call Process Outcome (this REPORT style is initiated by the corresponding "Call Process Breakpoint" Event Trigger and is used to report on the outcome of a call process providing information on current, and in certain cases previous, UE or E2 Node information depending upon the nature of the target call process); E2 Node Information (this REPORT style is initiated by "E2 Node Information Change" Event Trigger and is used to report cell related and E2 Node related information upon event trigger conditions are satisfied); UE information (this REPORT style is initiated by "UE Information Change" Event Trigger and is used to report UE related information and UE state variables upon the event trigger conditions are satisfied); and on demand report (this REPORT style is initiated by "On Demand" Event Trigger and is used to report cell-related and UE-related information on an adhoc basis upon request from Near-RT RIC).

4.2.2.2. INSERT Service

The E2SM-RC RAN Function provides selective support of the following INSERT services: Radio Bearer Control request, used for requesting the RIC to control DRB QoS modification, QoS flow to DRB (re)mapping, Logical channel (re)configuration, Radio bearer admission control, Split bearer and PDCP duplication control, etc.; Radio Resource Allocation Control request, used for requesting the RIC to control Discontinuous Reception (DRX), Scheduling request (SR), Semi-Persistent Scheduling (SPS), Configured Grant, Slice level PRB quota, Channel Quality Indicator (CQI) table, etc.; Connected Mode Mobility Control request, used for requesting the RIC to control operations of Handover (HO), Conditional handover (CHO), Dual Active Protocol Stack (DAPS) HO, etc.; Radio Access Control request, used for requesting the RIC to control parameters related to RACH back-off, RRC connection reject, RRC connection release, Access barring, UE admission, etc.; Dual Connectivity (DC) Control request, used for requesting the RIC to control operations of Dual Connectivity (DC) including Change of bearer termination point (MN or SN) and/or bearer types, etc.; Carrier Aggregation (CA) Control request, used for requesting the RIC to control operations of Carrier Aggregation (CA) involving secondary cell re-selection; and Idle Mode Mobility Control request, used for requesting the RIC to control intra-frequency, inter-frequency, inter-RAT cell reselection priority, idle timers, etc.

The E2SM-RC INSERT service requirements defined in Section 6.2.2 are offered using a set of INSERT Styles. Each style corresponds to a set of "INSERT Indications", where each "INSERT Indication" deals with a specific functionality and has a set of associated RAN parameters, provided in a mapping table. All INSERT Service styles are implemented using a set of IEs that constitute "Action Definition", "RIC Indication Header" and "RIC Indication Message" to deliver RAN Control-related INSERT services. Each INSERT service style is associated with a specific "Event Trigger" approach. An "INSERT Indication" is used to request the RIC to control a functionality associated with the respective INSERT service style, and to set or modify the values of one or more associated RAN parameters.

As an example, upon the arrival of an RRC Measurement Report in the E2 node due to the occurrence of an A3 event pertaining to a UE (which constitutes the event trigger), the E2 node can send a message to the RIC using the "Connected Mode Mobility" INSERT service style and the "Handover Control Request" INSERT Indication along with the "target cell ID" parameter. This RIC should then accept/deny the "Handover Control Request", and if it accepts, it should set the value of the "target cell ID" parameter and send a CONTROL action back to the RIC. Up until then, the E2 node suspends the ongoing call processing for the UE.

For the INSERT service, the RIC sends a "CONTROL action" that accepts/denies the incoming "INSERT Indication" requesting for "Handover Control", along with the value of the "Target Primary Cell". As another example, the RIC can also asynchronously send a "CONTROL action" asking the E2 node to configure the UE in Carrier Aggregation mode and setup one or more secondary cells to the UE, whose values are assigned by the RIC via the "CONTROL action".

4.2.2.3. CONTROL Service

The E2SM-RC RAN Function provides selective support of the following CONTROL services: Radio Bearer Control, used for DRB QoS modification, QoS flow to DRB (re) mapping, Logical channel (re)configuration, Radio bearer admission control, Split bearer and PDCP duplication control, etc.; Radio Resource Allocation Control, used to control Discontinuous Reception (DRX), Scheduling request (SR), Semi-Persistent Scheduling (SPS), Configured Grant, Slice level PRB quota, Channel Quality Indicator (CQI) table, etc.; Connected Mode Mobility Control, used to control operations of Handover (HO), Conditional handover (CHO), Dual Active Protocol Stack (DAPS) HO, etc.; Radio Access Control, used for modification of RACH back-off, RRC connection reject, RRC connection release, Access barring, UE admission, etc.; Dual Connectivity (DC) Control, used to control operations of Dual Connectivity (DC) including Change of bearer termination point (MN or SN) and/or bearer types, etc.; Carrier Aggregation (CA) Control, used to control operations of Carrier Aggregation (CA); Idle Mode Mobility Control, used for modification of intra-frequency, inter-frequency, inter-RAT cell reselection priority, idle timers, etc.; and UE to RAN UE group assignment, used to support POLICY services.

The E2SM-RC CONTROL service requirements are offered using a set of CONTROL Styles. Each style corresponds to a set of "CONTROL Action", where each "CONTROL Action" deals with a specific functionality and has a set of associated RAN parameters, provided in a mapping table. All CONTROL Service styles are implemented using a set of IEs constituting a "RIC Control Request Header" and a "RIC Control Request Message" to deliver RAN Control-related CONTROL services. A "CONTROL Action" containing one or more RAN parameters and their associated values can either be sent from the RIC, either asynchronously to the E2 node or as a response to a previous "INSERT Indication" from the E2 node. Table 12 shows the supported CONTROL Service Style Types.

TABLE 12

CONTROL Service Style Types

| RIC Style Type | Style Name | Style Description |
|---|---|---|
| 1 | Radio Bearer control | Used to modify the configuration the Radio Bearer Control (RBC) related parameters and/or behaviours at the E2 Node for a specific UE |
| 2 | Radio resource allocation control | Used to modify the configuration the Radio Resource Allocation control related parameters and/or behaviours at the E2 Node for a specific E2 Node, cell, slice, UE and/or QoS |
| 3 | Connected mode mobility control | Used to initiate a connected mode mobility procedure (Handover or Conditional Handover), optionally with Dual Active Protocol Stack (DAPS), for a specific UE towards either a target cell (for HO) or a list of candidate cells (for CHO) |
| 4 | Radio access control | Used to modify Radio access related functions used to control UE access to cells |
| 5 | Dual connectivity (DC) control | Used to initiate Dual connectivity (DC) mechanisms |
| 6 | Carrier Aggregation (CA) control | Used to initiate Carrier Aggregation (CA) mechanisms |
| 7 | Idle mode mobility control | Used to modify Idle mode mobility related functions used to control UE reselection of cells |
| 8 | UE information and assignment | Used for Explicit UE list assignment, UE information report generation and to complete UE identification. These services are used to support other RIC services. |

Each of the Control Service Styles 1-8 listed in Table 12 include the following common features: Control Action ID (the index ID for the individual control action under a given Control Service style), Control Action Name (indicates the functionality of the E2 node which is controlled by Near-RT RIC), Control Action Description (describes the control action and functionality of the receiving E2 Node), and associated RAN parameters (identifies the RAN parameters to be controlled by Near-RT RIC pertaining to the given control action).

The CONTROL Service style 1 (radio bearer control) provides a mechanism to initiate or resume a radio bearer control related process using the RIC Control Message IE and associated RIC Control Header IE and the optional RIC Call Process ID IE used when resuming a call process following a previous INSERT service. Applications of this service include: DRB QoS Modification to tune DRB level QoS related parameters to meet the QoS optimization targets; QoS Flow (re)mapping to adjust the mapping relationship between QoS flows and DRBs; logical channel (re) configuration; Radio Bearer Admission Control to configure DRB admission control such as reject or release may be applied; and split bearer and PDCP duplication control.

The CONTROL Service style 2 (Radio resource allocation control) provides a mechanism to initiate or resume a radio resource allocation control related process using the RIC Control Message IE and associated RIC Control Header IE and the optional RIC Call Process ID IE used when resuming a call process following a previous INSERT service. Applications of this service include: discontinuous Reception (DRX) control; scheduling request (SR) control; semi-Persistent Scheduling (SPS) control; Configured Grant control; slice level PRB quota; and Channel Quality Indicator (CQI) table.

The CONTROL Service style 3 (Connected mode mobility control) provides a mechanism to initiate or resume a connected mode mobility control related process using the RIC Control Message IE and associated RIC Control Header IE and the optional RIC Call Process ID IE used when resuming a call process following a previous INSERT service. Applications of this service include: handover (HO) initiation for a selected UE towards a target cell; conditional handover (CHO) initiation for a selected UE towards a list of candidate cell(s); and Handover (HO) initiation with Dual Active Protocol Stack (DAPS) for a selected UE towards a target cell.

The CONTROL Service style 4 (Radio access control) provides a mechanism to initiate or resume a radio access control related process using the RIC Control Message IE and associated RIC Control Header IE and the optional RIC Call Process ID IE used when resuming a call process following a previous INSERT service. Applications of this service include: RACH back-off; RRC connection reject; RRC connection release; access barring; and UE admission.

The CONTROL Service style 5 (DC control) provides a mechanism to initiate or resume a dual connectivity control related process using the RIC Control Message IE and associated RIC Control Header IE and the optional RIC Call Process ID IE used when resuming a call process following a previous INSERT service. Applications of this service include: dual connectivity (EN-DC, MR-DC or NR-NR DC) initiation for a selected UE towards a target secondary cell (PScell); secondary cell change for a selected UE towards a target secondary cell (PScell); dual connectivity (EN-DC, MR-DC or NR-NR DC) modification for a selected UE; dual connectivity (EN-DC, MR-DC or NR-NR DC) release initiation for a selected UE; and change of bearer termination point (MN or SN) and/or bearer types for a selected UE.

The CONTROL Service style 6 (CA control) provides a mechanism to initiate or resume a carrier aggregation control related process using the RIC Control Message IE and associated RIC Control Header IE and the optional RIC Call Process ID IE used when resuming a call process following a previous INSERT service. Applications of this service include: CA initiation for a selected UE towards a target secondary cell or cells; secondary cell change for a selected UE towards a target secondary cell or cells; CA modification for a selected UE; and CA release initiation for a selected UE.

The CONTROL Service style 7 (Idle mode mobility control) provides a mechanism to initiate or resume a idle mode mobility control related process using the RIC Control Message IE and associated RIC Control Header IE and the optional RIC Call Process ID IE used when resuming a call process following a previous INSERT service. Applications of this service include: intra-frequency, inter-frequency, inter-RAT cell reselection priority; and Idle timers.

The CONTROL Service style 8 (UE information and assignment) provides a mechanism to both directly and indirectly monitor and control UE information and to add or remove explicit UE assignments to Explicit UE lists. Applications of this service include: UE to Explicit UE list assignment command: Used to Add or Remove the nominated UE to the Explicit UE list name, also used to request list of supported Explicit UE list; UE information request: Used to obtain UE information including list of Explicit UE List assignments; and UE identification request: Used to complete UE identification.

4.2.2.4. POLICY Service

The E2SM-RC RAN Function provides selective support of the following POLICY services: Radio Bearer Policy, used to modify the behaviour of call processes related to DRB QoS control, QoS flow to DRB mapping, Logical channel configuration, Radio bearer admission control, Split bearer and PDCP duplication control, etc.; Radio Resource Allocation Policy, used to modify the behaviour of call processes related to DRX, SR, SPS, Configured Grant, Slice level PRB quota, CQI table, etc.; Connected Mode Mobility Policy, used to modify the behaviour of call processes related to HO, CHO, DAPS HO, etc. for both serving and target RAN nodes; Radio Access Policy, used to modify the behaviour of call processes related to RACH back-off, RRC connection reject, RRC connection release, Access barring, UE admission, etc.; Dual Connectivity (DC) Policy, used to modify the behaviour of call processes related to DC related operations for both master and secondary RAN nodes, Change of bearer termination point (MN or SN) and/or bearer types, etc.; Carrier Aggregation (CA) Policy, used to modify the behaviour of call processes related to CA related operations for both primary and secondary cells; and Idle Mode Mobility Policy, used to modify the behaviour of call processes related to intra-frequency, inter-frequency, inter-RAT cell reselection priority, inactivity timers, etc.

The E2SM-RC POLICY service requirements defined in Section 6.2.4 are offered using a set of POLICY Styles. Each style is implemented using multiple "Policy Approach" strategies, each with a specific methodology defined to use the E2AP IE "Action Definition" to deliver RAN Control related POLICY services.

The following Policy Approaches are defined: Control and Offset. A control policy for a given Style and Action ID is defined as a single case of a specific Policy condition with the corresponding Policy Action defined using the same data structure as CONTROL which would be used to replace default RAN behaviour. An offset POLICY for a given Style and Action ID is defined as a set of different cases applicable for a range of different Policy conditions with the corresponding Policy Action defined using the dedicated data structure defined for POLICY which would be used to modify default RAN behaviour.

The "control" Policy Approach is similar to the CONTROL service, with static conditions and actions in the RIC Subscription used to select an appropriate CONTROL Action. When a set of Policy conditions are satisfied, then E2 Node is instructed to execute a Policy Action with a set of supplementary or default set of RAN parameters.

A single Policy Action shall be a result of execution of multiple policy conditions. Each Policy Condition is defined using a combination of RAN Parameters and conditional tests associated with UE and Call process related information. Each Policy Action is defined with a single Policy Action ID (command) which instructs E2 Node to perform a certain action when the conditions are satisfied. The Policy Action ID shall be supplemented with a set of RAN Parameters which may be used to provide information on default values to E2 Node.

An example includes connected mode mobility policy, Handover Execution: Message Arrival breakpoint event trigger is defined to initiate the Policy service. On the arrival of A3 Measurement Report, the Policy service kicks in. Policy service installs a set of Policy Conditions like RSRP>'x' db+Target Node Load<'x' value+Number of successful HO to target Node>'x' value. When these Policy conditions are satisfied, then perform Policy Action—"Execute HO" defined in the CONTROL service in Section 6.5. The Policy Action may be provided as a standalone Policy Action ID "Execute HO" without any RAN parameters. As an alternative, Policy Action "Execute HO" may be supplemented with default RAN parameters like Handover only QCI 5 and 9 bearers.

Another example includes CA Policy, CA Release decision: A call process breakpoint event trigger is defined to initiate the POLICY service. The call process breakpoint shall define conditions for Buffer occupancy. A call process breakpoint event shall be triggered when the Buffer Occupancy (BO)<'x' KB. In this scenario, the event trigger satisfies the Policy condition. Hence there is no need to define a Policy condition in the Policy service, When the BO<'x' KB kicks in, then Policy Action shall instruct E2 Node to "Release Scell".

The "offset" Policy Approach is based on the design assumption that the Policy Action IE is used to carry one or more RAN Parameters that are used to modify default E2 Node behaviour via the addition of an "offset" to be applied to given target threshold or other parameter used in the target call process.

The applicable Policy Action is dependent upon a set of Policy Conditions and a given POLICY service may support one or more Policy conditions and so provide a targeted Policy Action for a range of different specific cases, each defined using a unique Policy condition where: each Policy Condition is defined using a combination of RAN Parameters and conditional tests associated with UE and Call process related information. The first positive match in a list of Policy conditions is used to select the corresponding Policy Action. Additionally or alternatively, each Policy Action is defined using a list of RAN Parameters of data type INTEGER or REAL which may to used directly for default values of type INTEGER or REAL (e.g., Default+Offset) and indirectly to for default values of type ENUMERATED (e.g. select value in list that is Offset before or after default value).

An example includes connected mode mobility policy, Handover decision: A call process breakpoint event trigger is defined to initiate the POLICY service from within the call process handling UE measurement reports related to handover decisions for a specific target Slice and primary cell currently subject to Traffic Steering guidance. The Policy conditions list of RAN Parameters supports the definition of different A3 measurement threshold criteria offset values to be applied to UEs with a specific combination of slice ID, active QoS bearers, velocity and throughput and subject to overall E2 Node load and cell level load balancing requirements. Handover is accepted if the reported A3 measurement is greater than the default A3 measurement threshold+offset.

Another example includes Carrier Aggregation Policy, CA release decision: A call process breakpoint event trigger is defined to initiate the POLICY service from within the call process related to Carrier Aggregation (CA) release decisions for a specific target Slice currently subject to QoE guidance. The Policy conditions list of RAN Parameters supports the definition of different CA release threshold criteria offset values to be applied to UEs with a specific combination of slice ID, active QoS bearers, velocity and throughput and subject to overall E2 Node load and cell level load balancing requirements. CA release is initiated if the UE throughput is less than the default UE throughput threshold+offset.

4.2.2.5. RAN Parameters for Control Actions

The RAN parameters associated with each control action being controlled by Near-RT RIC described in Section 7.6 are listed. Each RAN parameter belongs to one of the following value types:

ELEMENT: a singleton variable, which does not have any other associated RAN parameters.

STRUCTURE: a sequence of RAN parameters, each of which can be either an ELEMENT or a STRUCTURE or a LIST.

LIST: a list of STRUCTURES, where each STRUCTURE is as defined above. The sequence of RAN parameters is the same across all the STRUCTURES within the list.

The corresponding 3GPP standard definitions of these RAN parameters (if available) are referenced in the tables below under the "RAN Parameter Definition" column. These RAN parameters having 3GPP standard definitions are not freshly defined or redefined here.

Note that only those RAN parameters identified as ELEMENT are controlled by Near-RT RIC. Note that a RAN parameter may be associated with as a key where its corresponding Key Flag is set to "TRUE". These RAN parameters serve as a reference to other RAN parameters within a structure that may be a part of LIST to enable the E2 Node interpret the scope of RAN parameters that are controlled by Near-RT RIC.

4.2.2.5.1. Radio Bearer Control

DRB QoS Configuration: Upon receiving the RIC Control Request message, the E2 node invokes procedures related to DRB QoS Configuration, such as Bearer Context Management, UE Context Management, RRC Message Transfer, etc. and includes the IEs corresponding to one or more of parameters described below in the related interface messages. If the DRB ID is missing in the RIC Control Request message, the E2 node will send a RIC Control Failure. Upon receiving the RIC Control Request message, the E2 node invokes procedures related to QoS flow mapping Configuration, such as Bearer Context Management, UE Context Management, RRC Message Transfer, etc. and includes the IEs corresponding to one or more of parameters described below in the related interface messages. If the DRB ID is missing in the RIC Control Request message, the E2 node will send a RIC Control Failure.

Logical channel configuration: Upon receiving the RIC Control Request message, the E2 node invokes procedures related to Logical channel Configuration, such as RRC Message Transfer, etc. and includes the IEs corresponding to one or more of parameters described below in the related RRC messages. If the DRB ID is missing in the RIC Control Request message, the E2 node will send a RIC Control Failure.

Radio Bearer Admission Control: Upon receiving the RIC Control Request message, the E2 node invokes procedures related to Radio Bearer Admission Control, such as Bearer Context Management, UE Context Management, RRC Message Transfer, etc. and includes the IEs corresponding to one or more of parameters described below in the related interface messages. If the DRB ID is missing in the RIC Control Request message, the E2 node will send a RIC Control Failure.

DRB Termination Control: Upon receiving the RIC Control Request message, the E2 node invokes procedures related to DRB Termination change, such as Dual Connectivity Secondary Node Modification (MN/SN initiated), UE Context Management, RRC Message Transfer, etc. and include the IEs corresponding to one or more of parameters described below in the related interface messages. If the DRB ID is missing in the RIC Control Request message, the E2 node will send a RIC Control Failure. In some implementations, the RIC Control Request message related to DRB Termination change can be used for bearer anchor node selection. Table 13 shows RAN parameters for DRB Termination Control.

TABLE 13

| RAN Parameter ID | RAN Parameter | RAN Parameter Value Type | Key Param | RAN Parameter definition | Semantics Description |
|---|---|---|---|---|---|
| 1 | List of DRBs to be modified to SN-Termination | LIST | | | DRBs To Be Modified IE in 3GPP TS 38.423 v16.6.0 (2021 Jul. 1) ("[TS38423]"), section 9.2.1.11 |
| 2 | >DRB Item to be modified to SN-Termination | STRUCTURE | | | DRBs To Be Modified Item IE in [TS38423], section 9.2.1.11 |
| 3 | >>DRB ID | ELEMENT | TRUE | DRB ID IE in [TS38423], section 9.2.3.33 | |
| 4 | >>Logical Channel ID | ELEMENT | FALSE | LCID IE in TS [TS38423], section 9.2.3.70 | |
| 5 | >>RLC Status | ELEMENT | FALSE | RLC Status IE in [TS38423], section 9.2.3.80 | |
| 6 | >>List of QoS flows to be modified to SN-Termination | LIST | | | QoS Flows List IE in [TS38423], section 9.2.1.15 |
| 7 | >>>QoS flow item | STRUCTURE | | | QoS Flow Item IE in [TS38423], section 9.2.1.15 |
| 8 | >>>>QoS flow ID | ELEMENT | TRUE | QoS Flow Identifier IE in [TS38423], section 9.2.1.15 | |
| 9 | >>>>QoS Flow Mapping Indication | ELEMENT | FALSE | QoS Flow Mapping Indication IE in [TS38423], section 9.2.1.15 | |
| 10 | List of DRBs to be modified to MN-Termination | LIST | | | DRBs To Be Modified IE in [TS38423], section 9.2.1.9 |
| 11 | >DRB Item to be modified to MN-Termination | STRUCTURE | | | DRBs To Be Modified Item IE in [TS38423], section 9.2.1.9 |
| 12 | >>DRB ID | ELEMENT | TRUE | DRB ID IE in [TS38423], section 9.2.3.33 | |
| 13 | >>Logical Channel ID | ELEMENT | FALSE | LCID IE in [TS38423], section 9.2.3.70 | |
| 14 | >>RLC Status | ELEMENT | FALSE | RLC Status IE in [TS38423], section 9.2.3.80 | |
| 15 | >>List of QoS flows to be modified to SN-Termination | LIST | | | QoS Flows List IE in [TS38423], section 9.2.1.15 |
| 16 | >>>QoS flow item | STRUCTURE | | | QoS Flow Item IE in [TS38423], section 9.2.1.15 |
| 17 | >>>>QoS flow ID | ELEMENT | TRUE | QoS Flow Identifier IE in [TS38423], section 9.2.1.15 | |
| 18 | >>>>QoS Flow Mapping Indication | ELEMENT | FALSE | QoS Flow Mapping Indication IE in [TS38423], section 9.2.1.15 | |

DRB Split Ratio Control: Upon receiving the RIC Control Request message, in the presence of Downlink PDCP Data Split IE, the E2 node shall split the downlink PDCP traffic between the Master Node and Secondary Node over the X2/Xn interface based on the recommended ratio. In the presence of Uplink PDCP Data Split Threshold IE, the E2 node invokes procedures related to DRB Split Ratio Control, such as Bearer Context Management, UE Context Management, RRC Message Transfer, etc. and include the IEs corresponding to one or more of parameters described below in the related interface messages. If the DRB ID is missing in the RIC Control Request message, the E2 node will send a RIC Control Failure. In some implementations, the RIC Control Request message related to DRB Split Ratio Control can be used for split-ratio for split bearer. Table 14 shows RAN parameters for DRB Split Ratio Control.

TABLE 14

| RAN Parameter ID | RAN Parameter | RAN Parameter Value Type | Key Flag | RAN Parameter Definition | Semantics Description |
|---|---|---|---|---|---|
| 1 | DRB ID | ELEMENT | TRUE | DRB ID IE in 3GPP TS 38.463 v16.6.0 (2021 Jul. 1) ("[TS38463]") Section 9.3.1.16 | |
| 2 | Uplink PDCP Data Split Threshold | ELEMENT | FALSE | UL Data Split Threshold IE in [TS38463], section 9.3.1.43 | |
| 3 | Downlink PDCP Data Split | ELEMENT | FALSE | INTEGER (0..100) Defined in [TS38463], section 9.4.2 | Indicates the percentage of PDCP traffic that the MN has to split with the SN |

PDCP Duplication Control: Upon receiving the RIC Control Request message, the E2 node invokes procedures related to PDCP Duplication Control, such as Bearer Context Management, UE Context Management, RRC Message Transfer, etc. and include the IEs corresponding to one or more of parameters described below in the related interface messages. If the DRB ID is missing in the RIC Control Request message, the E2 node will send a RIC Control Failure.

5. Hardware Components, Configurations, and Arrangements

Figure 25:
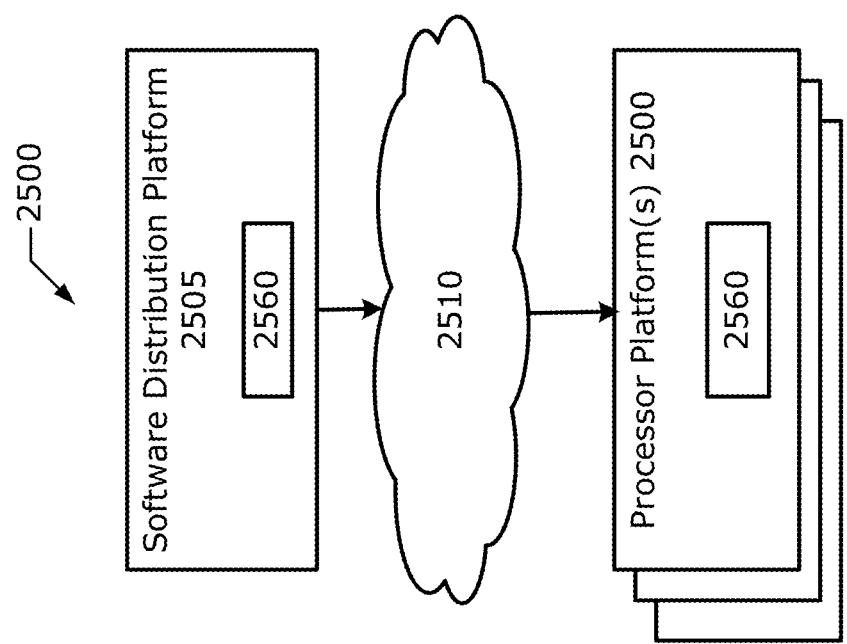
FIG. 25 illustrates an example software distribution platform.
Figure 27:
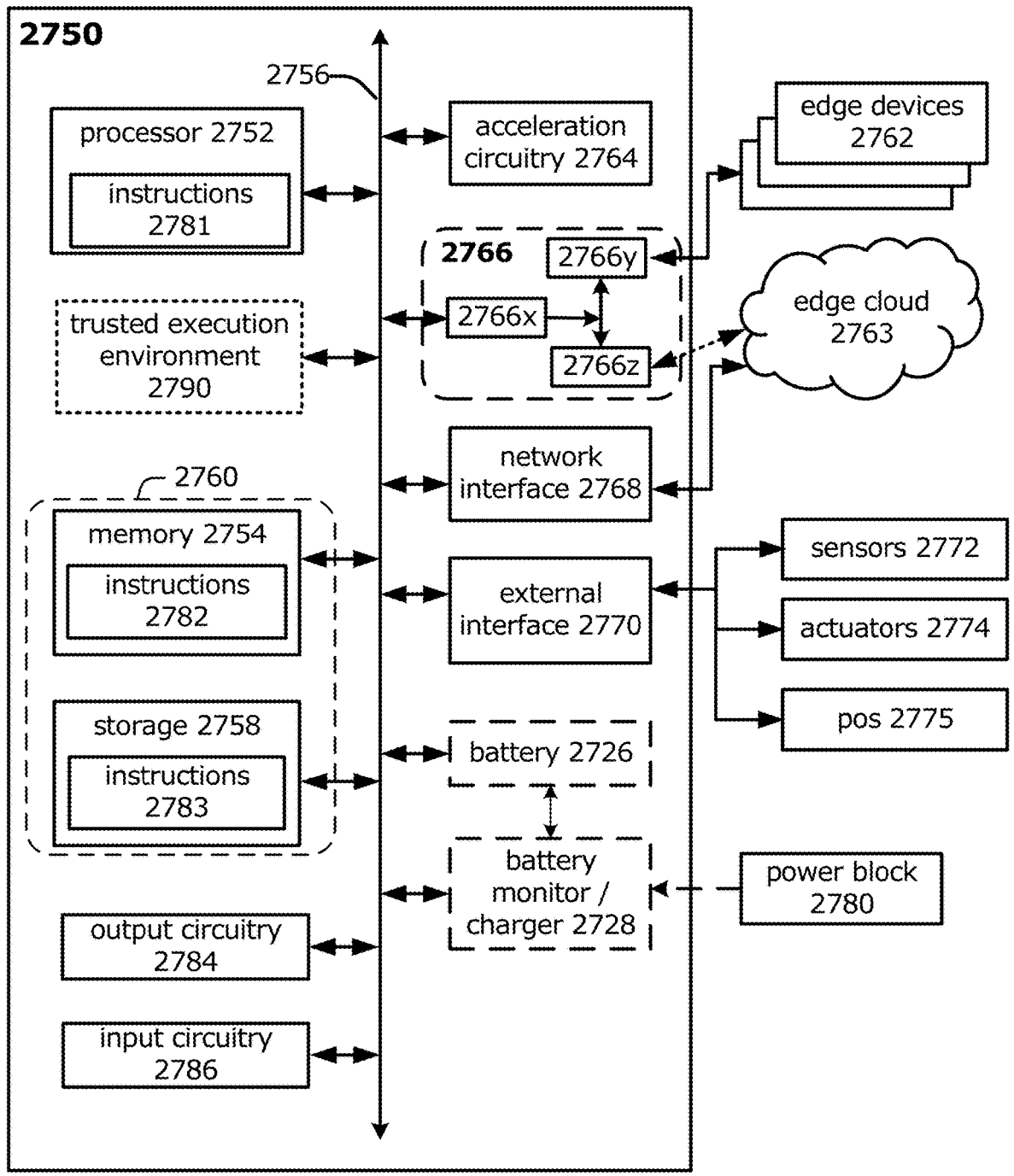

FIG. 25 illustrates a software distribution platform 2505 to distribute software 2560, such as the example computer readable instructions 2760 of FIG. 27, to one or more devices, such as example processor platform(s) 2500 and/or example connected edge devices 2762 (see e.g., FIG. 27) and/or any of the other computing systems/devices discussed herein. The example software distribution platform 2505 may be implemented by any computer server, data facility, cloud service, etc., capable of storing and transmitting software to other computing devices (e.g., third parties, the example connected edge devices 2762 of FIG. 27). Example connected edge devices may be customers, clients, managing devices (e.g., servers), third parties (e.g., customers of an entity owning and/or operating the software distribution platform 2505). Example connected edge devices may operate in commercial and/or home automation environments. In some examples, a third party is a developer, a seller, and/or a licensor of software such as the example computer readable instructions 2760 of FIG. 27. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In FIG. 25, the software distribution platform 2505 includes one or more servers and one or more storage devices. The storage devices store the computer readable instructions 2560, which may correspond to the example computer readable instructions 2760 of FIG. 27, as described above. The one or more servers of the example software distribution platform 2505 are in communication with a network 2510, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 2560 from the software distribution platform 2505. For example, the software 2560, which may correspond to the example computer readable instructions 2760 of FIG. 27, may be downloaded to the example processor platform(s) 2500, which is/are to execute the computer readable instructions 2560 to implement Radio apps.

In some examples, one or more servers of the software distribution platform 2505 are communicatively connected to one or more security domains and/or security devices through which requests and transmissions of the example computer readable instructions 2560 must pass. In some examples, one or more servers of the software distribution platform 2505 periodically offer, transmit, and/or force updates to the software (e.g., the example computer readable instructions 2760 of FIG. 27) to ensure improvements, patches, updates, etc. are distributed and applied to the software at the end user devices.

In FIG. 25, the computer readable instructions 2560 are stored on storage devices of the software distribution platform 2505 in a particular format. A format of computer readable instructions includes, but is not limited to a particular code language (e.g., Java, JavaScript, Python, C, C #, SQL, HTML, etc.), and/or a particular code state (e.g., uncompiled code (e.g., ASCII), interpreted code, linked code, executable code (e.g., a binary), etc.). In some examples, the computer readable instructions D182 stored in the software distribution platform 2505 are in a first format when transmitted to the example processor platform(s) 2500. In some examples, the first format is an executable binary in which particular types of the processor platform(s) 2500 can execute. However, in some examples, the first format is uncompiled code that requires one or more preparation tasks to transform the first format to a second format to enable execution on the example processor platform(s) 2500. For instance, the receiving processor platform(s) 2500 may need to compile the computer readable instructions 2560 in the first format to generate executable code in a second format that is capable of being executed on the processor platform(s) 2500. In still other examples, the first format is interpreted code that, upon reaching the processor platform(s) 2500, is interpreted by an interpreter to facilitate execution of instructions.

Figure 26:
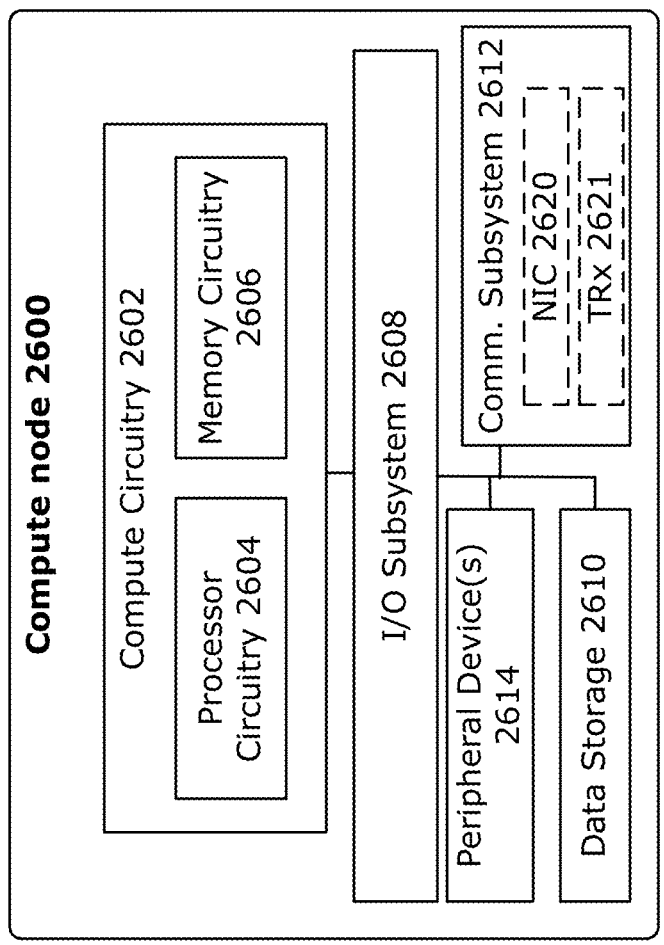
FIGS. 26 and 27 depict example components of various compute nodes in edge computing system(s).

FIGS. 26 and 27 depict further examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 26, an edge compute node 2600 includes a compute engine (also referred to herein as "compute circuitry") 2602, an input/output (I/O) subsystem 2608, data storage 2610, a communication circuitry subsystem 2612, and, optionally, one or more peripheral devices 2614. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. Additionally or alternatively, the edge compute node 2600 (or portions thereof) may be contained in a housing, a chassis, a case, or a shell such as those discussed previously with respect to the appliance computing device of the edge cloud 1210 of FIG. 12.

The compute node 2600 may be embodied as any type of engine, device, or collection of devices capable of performing various compute functions. The compute node 2600 may correspond to the UEs 101, RAN nodes 130, edge compute node 140 of FIG. 1; coordinator 210 of FIG. 2; UEs 401, NANs 433, edge compute node 436, real-time agent 501 of FIG. 5; UEs 601, DUs 630, RUs 633, and/or edge compute node 436 and/or agent 640 of FIG. 6; UEs 1111, 1121a, NANs 1131-1133, edge compute node(s) 1136, CN 1142 (or compute node(s) therein), and/or cloud 1144 (or compute node(s) therein) of FIG. 11; edge cloud 1210 (or systems/devices therein), central office 1220 (or systems/devices therein), NAN 1240, processing hub 1250, and/or end point devices 1260 of FIG. 12; use case devices 1305, network equipment (nodes) 1315, equipment 1325 of FIG. 13; client endpoints 1410, on-premise network system 1432, access point 1434, aggregation points 1442, 1444, edge aggregation nodes 1440, and/or data center 1460 (or systems/devices therein) of FIG. 14; devices 1510, edge nodes 1522, 1524 and/or cloud/data center 1540 of FIG. 15; container managers 1611, 1621, container orchestrator 1631, and/or compute nodes 1615, 1623 of FIG. 16; client compute nodes 1710, edge gateway devices 1720, edge resource nodes 1740, NAN 1742, core data center 1750 (or systems/devices therein) of FIG. 17; UE 1820, MEC host 1802 (or systems/devices therein), OSS 1812 (or systems/devices therein) of FIG. 18; ME platform 1910 of FIG. 19; SMO 2002, O-RAN NFs 2004, O-Cloud 2006, NG-Core 2008, external system 2010, Non-RT RIC 2012, Near-RT RIC 2014, O-RU 2016 of FIG. 20; UE 2101, SMO 2102, O-cloud 2106, O-e/gNB 2110, Non-RT RIC 2112, Near-RT RIC 2114, O-DU 2115, O-RU 2116, O-CU-CP 2121, O-CU-UP 2122 and/or FIG. 21; E2 nodes of FIG. 22; software distribution platform 2505 and/or processor platform(s) 2500 of FIG. 25; and/or any other component, device, and/or system discussed herein.

In some examples, the compute node 2600 may be embodied as a single device such as an integrated circuit, an embedded system, an FPGA, a System-on-Chip (SoC), or other integrated system or device. The compute node 2600 includes or is embodied as a processor 2604 and a memory 2606. The processor 2604 may be embodied as any type of processor capable of performing the functions described herein (e.g., executing an application). For example, the processor 2604 may be embodied as a multi-core processor(s), a microcontroller, or other processor or processing/controlling circuit.

In some examples, the processor 2604 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 2604 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 2604 may work in coordination with each other to execute many types of operations and instructions within and on behalf of the compute node 2600.

The memory 2606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 2606 may be integrated into the processor 2604. The main memory 2606 may store various software and data used during operation such as one or more applications, data operated on by the application(s), libraries, and drivers.

The compute circuitry 2602 is communicatively coupled to other components of the compute node 2600 via the I/O subsystem 2608, which may be embodied as circuitry and/or components to facilitate input/output operations with the compute circuitry 2602 (e.g., with the processor 2604 and/or the main memory 2606) and other components of the compute circuitry 2602. For example, the I/O subsystem 2608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 2608 may form a portion of an SoC and be incorporated, along with one or more of the processor 2604, the main memory 2606, and other components of the compute circuitry 2602, into the compute circuitry 2602.

The one or more illustrative data storage devices/disks 2610 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 2610 may include a system partition that stores data and firmware code for the data storage device/disk 2610. Individual data storage devices/disks 2610 may also include one or more operating system partitions that store data files and executables for operating systems depending on, for example, the type of compute node 2600.

The communication circuitry 2612 may be embodied as any communication circuit, device, or collection thereof, capable of enabling communications over a network between the compute circuitry 2602 and another compute device (e.g., an edge gateway node or the like). The communication circuitry 2612 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The communication circuitry 2612 includes a network interface controller (NIC) 2620, which may also be referred to as a host fabric interface (HFI). The NIC 2620 may be embodied as one or more add-in-boards, daughter cards, network interface cards, controller chips, chipsets, or other devices that may be used by the compute node 2600 to connect with another compute device. In some examples, the NIC 2620 may be embodied as part of a system-on-a-chip (SoC) that includes one or more processors, or included on a multichip package that also contains one or more processors. In some examples, the NIC 2620 may include a local processor (not shown) and/or a local memory (not shown) that are both local to the NIC 2620. In such examples, the local processor of the NIC 2620 may be capable of performing one or more of the functions of the compute circuitry 2602 described herein. Additionally, or alternatively, in such examples, the local memory of the NIC 2620 may be integrated into one or more components of the client compute node at the board level, socket level, chip level, and/or other levels. Additionally or alternatively, the communication circuitry 2612 may include one or more transceivers (TRx) 2621, each of which include various hardware devices/components such as baseband processor(s), switches, filters, amplifiers, antenna elements, and the like to facilitate communications over an air interface.

Additionally, in some examples, a respective compute node 2600 may include one or more peripheral devices 2614. Such peripheral devices 2614 may include any type of peripheral device found in a compute device or server such as audio input devices, a display, other input/output devices, interface devices, and/or other peripheral devices, depending on the particular type of the compute node 2600. In further examples, the compute node 2600 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 27 illustrates an example of components that may be present in an edge computing node 2750 for implementing the techniques (e.g., operations, processes, methods, and methodologies) described herein. The edge computing node 2750 may correspond to the UEs 101, RAN nodes 130, edge compute node 140 of FIG. 1; coordinator 210 of FIG. 2; UEs 401, NANs 433, edge compute node 436, real-time agent 501 of FIG. 5; UEs 601, DUs 630, RUs 633, and/or edge compute node 436 and/or agent 640 of FIG. 6; UEs 1111, 1121a, NANs 1131-1133, edge compute node(s) 1136, CN 1142 (or compute node(s) therein), and/or cloud 1144 (or compute node(s) therein) of FIG. 11; edge cloud 1210 (or systems/devices therein), central office 1220 (or systems/devices therein), NAN 1240, processing hub 1250, and/or end point devices 1260 of FIG. 12; use case devices 1305, network equipment (nodes) 1315, equipment 1325 of FIG. 13; client endpoints 1410, on-premise network system 1432, access point 1434, aggregation points 1442, 1444, edge aggregation nodes 1440, and/or data center 1460 (or systems/devices therein) of FIG. 14; devices 1510, edge nodes 1522, 1524 and/or cloud/data center 1540 of FIG. 15; container managers 1611, 1621, container orchestrator 1631, and/or compute nodes 1615, 1623 of FIG. 16; client compute nodes 1710, edge gateway devices 1720, edge resource nodes 1740, NAN 1742, core data center 1750 (or systems/devices therein) of FIG. 17; UE 1820, MEC host 1802 (or systems/devices therein), OSS 1812 (or systems/devices therein) of FIG. 18; ME platform 1910 of FIG. 19; SMO 2002, O-RAN NFs 2004, O-Cloud 2006, NG-Core 2008, external system 2010, Non-RT RIC 2012, Near-RT RIC 2014, O-RU 2016 of FIG. 20; UE 2101, SMO 2102, O-cloud 2106, O-e/gNB 2110, Non-RT RIC 2112, Near-RT RIC 2114, O-DU 2115, O-RU 2116, O-CU-CP 2121, O-CU-UP 2122 and/or FIG. 21; E2 nodes of FIG. 22; software distribution platform 2505 and/or processor platform(s) 2500 of FIG. 25; compute node 2600 of FIG. 26; and/or any other component, device, and/or system discussed herein.

The edge computing node 2750 provides a closer view of the respective components of node 2600 when implemented as or as part of a computing device (e.g., as a mobile device, a base station, server, gateway, appliance, edge compute node, etc.). The edge computing node 2750 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 2750, or as components otherwise incorporated within a chassis of a larger system.

The edge computing node 2750 includes processing circuitry in the form of one or more processors 2752. The processor circuitry 2752 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2752 may include one or more hardware accelerators (e.g., same or similar to acceleration circuitry 2764), which may be microprocessors, programmable processing devices (e.g., FPGA, ASIC, etc.), or the like. The one or more accelerators may include, for example, computer vision and/or deep learning accelerators. In some implementations, the processor circuitry 2752 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2752 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 2752 may be coupled with or may include memory/storage and may be configured to execute instructions stored in the memory/storage to enable various applications or operating systems to run on the platform 2750. The processors (or cores) 2752 is configured to operate application software to provide a specific service to a user of the platform 2750. Additionally or alternatively, the processor(s) 2752 may be a special-purpose processor(s)/controller(s) configured (or configurable) to operate according to the elements, features, and implementations discussed herein.

As examples, the processor(s) 2752 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2752 may be a part of a system on a chip (SoC), System-in-Package (SiP), a multi-chip package (MCP), and/or the like, in which the processor(s) 2752 and other components are formed into a single integrated circuit, or a single package, such as the Edison™ or Galileo™ SoC boards from Intel® Corporation. Other examples of the processor(s) 2752 are mentioned elsewhere in the present disclosure.

The processor(s) 2752 may communicate with system memory 2754 over an interconnect (IX) 2756. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2758 may also couple to the processor 2752 via the IX 2756. In an example, the storage 2758 may be implemented via a solid-state disk drive (SSDD) and/or high-speed electrically erasable memory (commonly referred to as "flash memory"). Other devices that may be used for the storage 2758 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2754 and/or storage circuitry 2758 may also incorporate three-dimensional (3D) cross-point (XPOINT) memories from Intel® and Micron®.

In low power implementations, the storage 2758 may be on-die memory or registers associated with the processor 2752. However, in some examples, the storage 2758 may be implemented using a micro hard disk drive (HDD). Further, any number of new technologies may be used for the storage 2758 in addition to, or instead of, the technologies described, such resistance change memories, phase change memories, holographic memories, or chemical memories, among others.

The components of edge computing device 2750 may communicate over an interconnect (IX) 2756. The IX 2756 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 2756 may be a proprietary bus, for example, used in a SoC based system.

The IX 2756 couples the processor 2752 to communication circuitry 2766 for communications with other devices, such as a remote server (not shown) and/or the connected edge devices 2762. The communication circuitry 2766 is a hardware element, or collection of hardware elements, used to communicate over one or more networks (e.g., cloud 2763) and/or with other devices (e.g., edge devices 2762). The collection of hardware elements include hardware devices such as baseband circuitry 276x, switches, filters, amplifiers, antenna elements, and the like to facilitate OTA communications).

The transceiver 2766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 2762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The communication circuitry 2766 (or multiple transceivers 2766) may communicate using multiple standards or radios for communications at a different range. For example, the communication circuitry 2766 may include short-range RAT circuitry 276y to communicate with relatively close devices (e.g., within about 10 meters) based on BLE, or another low power radio, to save power. More distant connected edge devices 2762 (e.g., within about 50 meters) may be reached over ZigBee® circuitry 276y and/or other intermediate power radios 276y. Both communications techniques may take place over a single radio 276y at different power levels or may take place over separate transceivers 276y, for example, a local transceiver 276y using BLE and a separate mesh transceiver 276y using ZigBee®.

A wireless network transceiver 276z may be included to communicate with devices or services in the edge cloud 2763 via local or wide area network protocols. The wireless network transceiver 276z may be an LPWA transceiver that follows the IEEE 802.15.4, or IEEE 802.15.4g standards, among others. The edge computing node 2750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 276z, as described herein. For example, the transceiver 276z may include a cellular transceiver that uses spread spectrum (SPA/SAS) communications for implementing high-speed communications. Further, any number of other protocols may be used, such as Wi-Fi® networks for medium speed communications and provision of network communications. The transceiver 276z may include radios that are compatible with any number of 3GPP specifications, such as LTE and 5G/NR communication systems, discussed in further detail at the end of the present disclosure.

A network interface controller (NIC) 2768 may be included to provide a wired communication to nodes of the edge cloud 2763 or to other devices, such as the connected edge devices 2762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 2768 may be included to enable connecting to a second network, for example, a first NIC 2768 providing communications to the cloud over Ethernet, and a second NIC 2768 providing communications to other devices over another type of network.

Given the variety of types of applicable communications from the device to another component or network, applicable communications circuitry used by the device may include or be embodied by any one or more of components 2764, 2766, 2768, or 2770. Accordingly, in various examples, applicable means for communicating (e.g., receiving, transmitting, etc.) may be embodied by such communications circuitry.

The edge computing node 2750 may include or be coupled to acceleration circuitry 2764, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2764 may comprise logic blocks or logic fabric and other interconnected resources that may be programmed (configured) to perform various functions, such as the procedures, methods, functions, etc. discussed herein. In such implementations, the acceleration circuitry 2764 may also include memory cells (e.g., EPROM, EEPROM, flash memory, static memory (e.g., SRAM, anti-fuses, etc.) used to store logic blocks, logic fabric, data, etc. in LUTs and the like.

The IX 2756 also couples the processor 2752 to a sensor hub or external interface 2770 that is used to connect additional devices or subsystems. The additional/external devices may include sensors 2772, actuators 2774, and positioning circuitry 2775.

The sensor circuitry 2772 includes devices, modules, or subsystems whose purpose is to detect events or changes in its environment and send the information (sensor data) about the detected events to some other a device, module, subsystem, etc. Examples of such sensors 2772 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 2774, allow platform 2750 to change its state, position, and/or orientation, or move or control a mechanism or system. The actuators 2774 comprise electrical and/or mechanical devices for moving or controlling a mechanism or system, and converts energy (e.g., electric current or moving air and/or liquid) into some kind of motion. The actuators 2774 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2774 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 2750 may be configured to operate one or more actuators 2774 based on one or more captured events and/or instructions or control signals received from a service provider and/or various client systems The positioning circuitry 2775 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 2775 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 2775 may include a Micro-Technology for Positioning, Navigation, and Timing (Micro-PNT) IC that uses a master timing clock to perform position tracking/estimation without GNSS assistance. The positioning circuitry 2775 may also be part of, or interact with, the communication circuitry 2766 to communicate with the nodes and components of the positioning network. The positioning circuitry 2775 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2775 is, or includes an INS, which is a system or device that uses sensor circuitry 2772 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 2750 without the need for external references.

In some optional examples, various input/output (I/O) devices may be present within or connected to, the edge computing node 2750, which are referred to as input circuitry 2786 and output circuitry 2784 in FIG. 27. The input circuitry 2786 and output circuitry 2784 include one or more user interfaces designed to enable user interaction with the platform 2750 and/or peripheral component interfaces designed to enable peripheral component interaction with the platform 2750. Input circuitry 2786 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2784 may be included to show information or otherwise convey information, such as sensor readings, actuator position(s), or other like information. Data and/or graphics may be displayed on one or more user interface components of the output circuitry 2784. Output circuitry 2784 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 2750. The output circuitry 2784 may also include speakers or other audio emitting devices, printer(s), and/or the like. Additionally or alternatively, the sensor circuitry 2772 may be used as the input circuitry 2784 (e.g., an image capture device, motion capture device, or the like) and one or more actuators 2774 may be used as the output device circuitry 2784 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2776 may power the edge computing node 2750, although, in examples in which the edge computing node 2750 is mounted in a fixed location, it may have a power supply coupled to an electrical grid, or the battery may be used as a backup or for temporary capabilities. The battery 2776 may be a lithium ion battery, or a metal-air battery (e.g., a zinc-air battery, an aluminum-air battery, a lithium-air battery, etc.), one or more capacitors, and the like.

A battery monitor/charger 2778 may be included in the edge computing node 2750 to track the state of charge (SoCh) of the battery 2776, if included. The battery monitor/charger 2778 may be used to monitor other parameters of the battery 2776 to provide failure predictions, such as the state of health (SoH) and the state of function (SoF) of the battery 2776. The battery monitor/charger 2778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2778 may communicate the information on the battery 2776 to the processor 2752 over the IX 2756. The battery monitor/charger 2778 may also include an analog-to-digital (ADC) converter that enables the processor 2752 to directly monitor the voltage of the battery 2776 or the current flow from the battery 2776. The battery parameters may be used to determine actions that the edge computing node 2750 may perform, such as transmission frequency, mesh network operation, sensing frequency, and the like. In some implementations, the battery 2776 and/or battery monitor/charger 2778 can be divided into different power domains depending on use case/implementation, where different batteries 2776 are used for different power domains and each power domain may power different components/devices of the edge computing node 2750.

A power block 2780, or other power supply coupled to a grid, may be coupled with the battery monitor/charger 2778 to charge the battery 2776. In some examples, the power block 2780 may be replaced with a wireless power receiver to obtain the power wirelessly, for example, through a loop antenna in the edge computing node 2750. A wireless battery charging circuit, such as an LTC4020 chip from Linear Technologies of Milpitas, California, among others, may be included in the battery monitor/charger 2778. The specific charging circuits may be selected based on the size of the battery 2776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2758 may include instructions 2782 in the form of software, firmware, or hardware commands to implement the techniques described herein. Although such instructions 2782 are shown as code blocks included in the memory 2754 and the storage 2758, it may be understood that any of the code blocks may be replaced with hardwired circuits, for example, built into an application specific integrated circuit (ASIC).

In an example, the instructions 2782 provided via the memory 2754, the storage 2758, or the processor 2752 may be embodied as a non-transitory, machine-readable medium 2760 including code to direct the processor 2752 to perform electronic operations in the edge computing node 2750. The processor 2752 may access the non-transitory, machine-readable medium 2760 over the IX 2756. For instance, the non-transitory, machine-readable medium 2760 may be embodied by devices described for the storage 2758 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 2760 may include instructions to direct the processor 2752 to perform a specific sequence or flow of actions, for example, as described with respect to the flowchart(s) and block diagram(s) of operations and functionality depicted above. the terms "machine-readable medium" and "computer-readable medium" are interchangeable. the term "non-transitory computer-readable medium" is expressly defined to include any type of computer readable storage device and/or storage disk and to exclude propagating signals and to exclude transmission media.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 26 and 27 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 26 and 27 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 26 and 27 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

6. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method for providing Reinforcement Learning based traffic management strategies, the method comprising: collecting observation data from one or more data sources within an environment; determining a state of the environment based on the collected observation data; and operating a Reinforcement Learning Model (RLM) for determination of one or more actions based on the determined state, wherein the determined one or more actions include respective traffic management strategies for corresponding multi-access UEs, and the one or more actions to cause the corresponding multi-access UEs to perform one or more operations according to the respective traffic management strategies.

Example A02 includes the method of example A01 and/or some other example(s) herein, wherein each of the respective traffic management strategies includes one or more of a traffic steering strategy and a traffic splitting strategy.

Example A03 includes the method of example A01 or A02 and/or some other example(s) herein, wherein the one or more UEs are configured agents interacting with the environment to collect observation data, and operating the RLM for determination of the one or more actions comprises: obtaining action data with the observation data, the action data including one or more other actions taken by the corresponding multi-access UEs; training the RLM based on the observation data and the action data; and deploying the RLM to the corresponding multi-access UEs, wherein the deployed RLM is for derivation of the actions by the corresponding multi-access UEs.

Example A04 includes the method of example A03 and/or some other example(s) herein, wherein the corresponding multi-access UEs use the deployed RLM to independently predict the respective traffic management strategies according to their individually collected observations from interacting with the environment.

Example A05 includes the method of examples A03-A04 and/or some other example(s) herein, further comprising: calculating a reward value based on the collected observation data; updating the RLM based on the calculated reward value; and distributing the updated RLM to the corresponding multi-access UEs.

Example A06 includes the method of example A05 and/or some other example(s) herein, wherein distributing the updated RLM further comprises: distributing the updated RLM to the corresponding multi-access UEs when the updated RLM passes a verification process.

Example A07 includes the method of example A01 or A02 and/or some other example(s) herein, wherein operating the RLM for determination of the one or more actions comprises: operating a representation network to generate, based on the collected observation data, a representation of the environment; operating a critic network to determine feedback for the one or more actions; and operating an actor network to determine the one or more actions based on the generated representation and the feedback from the critic network.

Example A08 includes the method of example A07 and/or some other example(s) herein, wherein the feedback is a state-value of the one or more actions from a state-value function, a quality value (Q value) of the one or more actions from a Q value function.

Example A09 includes the method of example A07 or A08 and/or some other example(s) herein, wherein the feedback comprises a probability distribution over the one or more actions with an expected return from the determined state.

Example A10 includes the method of examples A01-A09 and/or some other example(s) herein, wherein the representation network comprises a recurrent neural network (RNN), and operating the representation network comprises: operating the RNN to learn the representation for the corresponding multi-access UEs based on inputs having variable sizes.

Example A11 includes the method of any one of examples A07-A10 and/or some other example(s) herein, wherein the critic network comprises an RNN configured to learn a measurement sequence correlation for determination of the feedback.

Example A12 includes the method of any one of examples A07-A11 and/or some other example(s) herein, wherein the actor network comprises an RNN configured to learn a measurement sequence correlation for determination of the one or more actions.

Example A13 includes the method of any one of examples A10-A12 and/or some other example(s) herein, wherein the RNN is a Long Short-Term Memory (LSTM) network.

Example A14 includes the method of example A01 and/or some other example(s) herein, further comprising: communicating the one or more actions to the corresponding multi-access UEs.

Example A15 includes the method of examples A01-A14 and/or some other example(s) herein, further comprising: triggering the one or more data sources within the environment to provide the observation data when a trigger condition is met.

Example A16 includes the method of example A15 and/or some other example(s) herein, wherein the trigger condition includes one or more of expiration of a timer or a measurement value meeting a threshold.

Example A17 includes the method of example A15 or A16 and/or some other example(s) herein, wherein the one or more data sources include one or more of one or more multi-access UEs and one or more network access nodes (NANs).

Example A18 includes the method of examples A01-A17 and/or some other example(s) herein, further comprising: operating the RLM to learn the respective traffic management strategies without relying on any optimization models or predefined policies.

Example A19 includes the method of examples A05-A18 and/or some other example(s) herein, further comprising: calculating the reward value using a reward function based on the collected observation data.

Example A20 includes the method of example A19 and/or some other example(s) herein, wherein the reward function is a utility function of a network quality of service (QoS) target.

Example A21 includes the method of example A20 and/or some other example(s) herein, wherein inputs to the utility function include one or more QoS parameters, wherein the one or more QoS parameters include one or more of packet delay, packet loss rate, packet drop rate, physical (PHY) rate; goodput; UE throughput, cell throughput, jitter, alpha fairness, channel quality indicator (CQI) related measurements, Modulation Coding Scheme (MCS) related measurements, physical resource block (PRB) utilization, radio utilization level per NAN, and data volume.

Example B01 includes the method of examples A01-A21 and/or some other example(s) herein, wherein the RLM is an RL Agent, and the RL Agent comprises one or more performance assurance mechanisms.

Example B02 includes the method of example B01 and/or some other example(s) herein, wherein the one or more performance assurance mechanisms include a guided exploration mechanism, an enforce safety action space (ESAS) mechanism, an early warning mechanism, and an opportunistic exploration control (OEC) mechanism.

Example B03 includes the method of example B02 and/or some other example(s) herein, wherein the guided exploration mechanism includes one or more rule-based algorithms, one or more model-based heuristic algorithms, or one or more pre-trained machine learning algorithms.

Example B04 includes the method of examples B02-B03 and/or some other example(s) herein, wherein the ESAS mechanism comprises an acceptable range of actions or a set of constraints described by one or more linear or non-linear functions of the one or more actions.

Example B05 includes the method of examples B02-B04 and/or some other example(s) herein, further comprising: operating the early warning mechanism to trigger implementation of a back-up model when one or more performance metrics meet or exceed a corresponding threshold.

B06 includes the method of example B05 and/or some other example(s) herein, wherein the one or more performance metrics include an average value of one way delay for one or more data flows, an average value of end-to-end (e2e) delay for one or more data flows, a delay variation trend, buffer accumulation; a channel quality indicator (CQI) variation trend, and modulation, and a coding scheme (MCS) distribution trend.

Example B06 includes the method of examples B01-B05 and/or some other example(s) herein, further comprising: operating the OEC mechanism to identify one or more high risk actions of the one or more actions, and apply the one or more high risk actions to test flows or flows with less stringent QoS targets than other flows.

Example C01 includes the method of examples A07-A21 and/or some other example(s) herein, wherein the RLM is a contextual bandit machine learning model.

Example C02 includes the method of example C01 and/or some other example(s) herein, further comprising: randomly initializing the critic network, the actor network, and the representation network with parameters $\theta^Q$, $\theta^\mu$ and $\theta^E$, respectively; initializing a replay buffer; and initializing a random process for action exploration.

Example C03 includes the method of example C02 and/or some other example(s) herein, further comprising: operating the representation network to obtain a representation of the observation data for a target UE to whom an action recommendation is to be provided, the target UE being among the corresponding multi-access UEs.

Example C04 includes the method of example C03 and/or some other example(s) herein, further comprising: operating the agent network to select an action according to a current policy and exploration noise, and deploy the selected action to the target UE; collecting a reward based on performance of the selected action; and storing the action, the state and the collected reward in the replay buffer.

Example C05 includes the method of example C04 and/or some other example(s) herein, wherein selecting the action comprises: randomly sampling an action space for the action using a probability; or using an existing heuristic algorithm to select the action.

Example C06 includes the method of example C05 and/or some other example(s) herein, further comprising: randomly sampling a minibatch from the replay buffer; determining a target for a temporal difference error computation from the collected reward; and training the critic network to minimize a loss function.

Example C07 includes the method of example C06 and/or some other example(s) herein, further comprising: training the actor network using a policy gradient to maximize a reward function.

Example C08 includes the method of example C07 and/or some other example(s) herein, wherein the policy gradient is produced by the critic network.

Example C09 includes the method of example C07 or C08 and/or some other example(s) herein, further comprising: training the representation network using the policy gradient.

Example D01 includes the method of examples A01-009 and/or some other example(s) herein, wherein the observation data includes one or more of packet delay, packet loss rate, packet drop rate, PHY rate; goodput; UE throughput, cell throughput, jitter, alpha fairness, CQI related measurements, MCS related measurements, PRB utilization, radio utilization level per NAN, and data volume.

Example D02 includes the method of examples A01-D01 and/or some other example(s) herein, wherein the method is performed by a Multi-Access Edge Computing (MEC) server/host or an Open RAN Alliance (O-RAN) Radio Access Network (RAN) intelligent controller (RIC).

Example Z01 includes one or more computer readable media comprising instructions, wherein execution of the instructions by processor circuitry is to cause the processor circuitry to perform the method of any one of examples A01-D02 and/or any other aspect discussed herein.

Example Z02 includes a computer program comprising the instructions of example Z01.

Example Z03 includes an Application Programming Interface defining functions, methods, variables, data structures, and/or protocols for the computer program of example Z02.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z11 includes the data unit of example Z10, the data unit is a datagram, network packet, data frame, data segment, a Protocol Data Unit (PDU), a Service Data Unit (SDU), a message, or a database object.

Example Z12 includes a signal encoded with the data unit of example Z10 or Z11.

Example Z13 includes an electromagnetic signal carrying the instructions of example Z01.

Example Z14 includes an apparatus comprising means for performing the method of any one of examples A01-D02.

7. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof. The term "device" at least in some embodiments refers to a physical entity embedded inside, or attached to, another physical entity in its vicinity, with capabilities to convey digital information from or to that physical entity. The term "entity" at least in some embodiments refers to a distinct component of an architecture or device, or information transferred as a payload. The term "controller" at least in some embodiments refers to an element or entity that has the capability to affect a physical entity, such as by changing its state or causing the physical entity to move.

The term "Edge computing" encompasses many implementations of distributed computing that move processing activities and resources (e.g., compute, storage, acceleration resources) towards the "Edge" of the network, in an effort to reduce latency and increase throughput for endpoint users (client devices, user equipment, etc.). Such Edge computing implementations typically involve the offering of such activities and resources in cloud-like services, functions, applications, and subsystems, from one or multiple locations accessible via wireless networks. Thus, the references to an "Edge" of a network, cluster, domain, system or computing arrangement used herein are groups or groupings of functional distributed compute elements and, therefore, generally unrelated to "Edges" (links or connections) as used in graph theory. Specific arrangements of Edge computing applications and services accessible via mobile wireless networks (e.g., cellular and WiFi data networks) may be referred to as "mobile Edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

The term "compute node" or "compute device" at least in some embodiments refers to an identifiable entity implementing an aspect of Edge computing operations, whether part of a larger system, distributed collection of systems, or a standalone apparatus. In some examples, a compute node may be referred to as a "Edge node", "Edge device", "Edge system", whether in operation as a client, server, or intermediate entity. Specific implementations of a compute node may be incorporated into a server, base station, gateway, road side unit, on premise unit, UE or end consuming device, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" at least in some embodiments refers to a logical entity that is a singly addressable instance of a medium access control (MAC) and physical layer (PHY) interface to the wireless medium (WM). The term "wireless medium" or "WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an Si interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and Edge data center (e.g., smallest).

The term "access Edge layer" indicates the sub-layer of infrastructure Edge closest to the end user or device. For example, such layer may be fulfilled by an Edge data center deployed at a cellular network site. The access Edge layer functions as the front line of the infrastructure Edge and may connect to an aggregation Edge layer higher in the hierarchy.

The term "aggregation Edge layer" indicates the layer of infrastructure Edge one hop away from the access Edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network. The "RAT type" identifies the transmission technology used in an access network, for example, new radio (NR), narrowband IoT (NB-IOT), Untrusted Non-3GPP, Trusted Non-3GPP, Trusted IEEE 802.11, Non-3GPP access, Wireline, Wireline-Cable, Wireline Broadband Forum (wireline-BBF), etc.

The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.1lay, etc.), V2X communication including C-V2X, WAVE, 802.11bd, Dedicated Short Range Communications (DSRC), Intelligent-Transport-Systems (ITS) including the European ITS-G5, ITS-G5B, ITS-G5C, etc. Ultra High Frequency (UHF) communication, Very High Frequency (VHF) communication. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "Quality of Service" or "QoS' at least in some embodiments refers to a description or measurement of the overall performance of a service (e.g., telephony and/or cellular service, network service, wireless communication/ connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The terms "beamforming" and "beam steering" at least in some embodiments refer to a spatial filtering mechanism used at a transmitter (Tx) to improve the received signal power, signal-to-noise ratio (SNR), or some other signalling metric at an intended receiver (Rx). The term "beamformer" at least in some embodiments refers to a STA that transmits a physical layer PDU (PPDU) using a beamforming steering matrix. The term "beamforming steering matrix" at least in some embodiments refers to a matrix determined using knowledge of the channel between a Tx and an intended Rx that maps from space-time streams to transmit antennas with the goal of improving the signal power, SNR, and/or some other signalling metric at the intended Rx.

The term "basic service set" or "BSS" at least in some embodiments refers to a set of STAs that have successfully synchronized using the JOIN service primitives and one STA that has used the START primitive. Alternatively, a set of STAs that have used the START primitive specifying matching mesh profiles where the match of the mesh profiles has been verified via the scanning procedure. Membership in a BSS does not imply that wireless communication with all other members of the BSS is possible.

The term "coordination function" at least in some embodiments refers to a logical function that determines when a STA is permitted to transmit PDUs via a WM. The term "distributed coordination function" or "DCF" at least in some embodiments refers to a class of coordination function(s) where the same coordination function logic is active in every STA in a basic service set (BSS) whenever the network is in operation. The term "distribution service" at least in some embodiments refers to a service that, by using association information, delivers medium access control (MAC) service tuples within a distribution system (DS). The term "distribution system" or DS" at least in some embodiments refers to a system used to interconnect a set of basic service sets (BSSs) and integrated local area networks (LANs) to create an extended service set (ESS).

The term "clear channel assessment (CCA) function" at least in some embodiments refers to a logical function in the physical layer (PHY) that determines the current state of use of a WM.

The terms "instantiate," "instantiation," and the like at least in some embodiments refers to the creation of an instance. An "instance" also at least in some embodiments refers to a concrete occurrence of an object, which may occur, for example, during execution of program code. The term "information element" at least in some embodiments refers to a structural element containing one or more fields. The term "field" at least in some embodiments refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" at least in some embodiments refers to a data type that contains one single data. The term "data frame" or "DF" at least in some embodiments refers to a data type that contains more than one data element in a predefined order.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit" or the like.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "quality" at least in some embodiments refers to a property, character, attribute, or feature of something as being affirmative or negative, and/or a degree of excellence of something. Additionally or alternatively, the term "quality" at least in some embodiments, in the context of data processing systems, refers to a state of qualitative and/or quantitative aspects of data, processes, and/or some other aspects of data processing systems.

The term "application" may refer to a computer program designed to carry out a specific task other than one relating to the operation of the computer itself. Additionally or alternatively, term "application" may refer to a complete and deployable package, environment to achieve a certain function in an operational environment. The term "AI/ML application" or the like may be an application that contains some AI/ML models and application-level descriptions.

The term "machine learning" or "ML at least in some embodiments refers to the use of computer systems to optimize a performance criterion using example (training) data and/or past experience. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. ML techniques generally fall into the following main types of learning problem categories: supervised learning, unsupervised learning, and reinforcement learning.

The term "supervised learning at least in some embodiments refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "classification" in the context of ML may refer to an ML technique for determining the classes to which various data points belong. Here, the term "class" or "classes" may refer to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The terms "regression algorithm" and/or "regression analysis" in the context of ML may refer to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The terms "instance-based learning" or "memory-based learning" in the context of ML may refer to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "feature" in the context of ML refers to an individual measureable property, quantifiable property, or characteristic of a phenomenon being observed. Features are usually represented using numbers/numerals (e.g., integers), strings, variables, ordinals, real-values, categories, and/or the like. A set of features may be referred to as a "feature vector." A "vector" may refer to a tuple of one or more values called scalars, and a "feature vector" may be a vector that includes a tuple of one or more features.

The term "unsupervised learning at least in some embodiments refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some embodiments refers to ML algorithms that develop ML models from incomplete training data, where a portion of the sample input does not include labels.

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, and deep RL. The term "multi-armed bandit problem", "K-armed bandit problem", "N-armed bandit problem", or "contextual bandit" at least in some embodiments refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some embodiments refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors. Additional aspects of RL and multi-armed bandit problems are discussed in Sutton et al., "Reinforcement Learning: An Introduction", $2^{nd}$ Ed., MIT press (2018).

The term "reward function", in the context of RL, at least in some embodiments refers to a function that outputs a reward value based on one or more reward variables; the reward value provides feedback for an RL policy so that an RL agent can learn a desirable behavior. The term "reward shaping", in the context of RL, at least in some embodiments refers to a adjusting or altering a reward function to output a positive reward for desirable behavior and a negative reward for undesirable behavior.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), etc.), deep stacking network (DSN).

The term "session" at least in some embodiments refers to a temporary and interactive information interchange between two or more communicating devices, two or more application instances, between a computer and user, or between any two or more entities or elements.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "PDU Connectivity Service" at least in some embodiments refers to a service that provides exchange of protocol data units (PDUs) between a UE and a DN. The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD_ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some embodiments refers to an identifier that can be mapped to a specific application or application instance; in the context of 3GPP 5G/NR systems, an "application identifier" may refer to an identifier that can be mapped to a specific application traffic detection rule. An "endpoint address" may refer to an address used to determine the host/authority part of a target URI, where the target URI is used to access an NF service (e.g., to invoke service operations) of an NF service producer or for notifications to an NF service consumer. The term "CAG-ID" at least in some embodiments refers to an identifier of a Closed Access Group (CAG), and the term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "port" as used herein (e.g., in the context of computer networks) at least in some embodiments refers to a communication endpoint, a virtual data connection between two or more entities, and/or a virtual point where network connections start and end; additionally or alternatively, a "port" is associated with a specific process or service.

The term "subnetwork" or "subnet" at least in some embodiments refers to a logical subdivision of a network, such as an IP network. The practice of dividing a network into two or more networks is called "subnetting." The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert. The term "integrity" at least in some embodiments refers to a mechanism that assures that data has not been altered in an unapproved way. Examples of cryptographic mechanisms that can be used for integrity protection include digital signatures, message authentication codes (MAC), and secure hashes.

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms may refer to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computations" at least in some embodiments refers to a model in which components located on networked computers communicate and coordinate their actions by passing messages interacting with each other in order to achieve a common goal.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. The term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted. The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some embodiments refers to an amount of time taken to process a packet in a network node. The term "transmission delay" at least in some embodiments refers to an amount of time needed (or necessary) to push a packet (or all bits of a packet) into a transmission medium. The term "propagation delay" at least in some embodiments refers to amount of time it takes a signal's header to travel from a sender to a receiver. The term "network delay" at least in some embodiments refers to the delay of an a data unit within a network (e.g., an IP packet within an IP network).

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "Packet Drop Rate" at least in some embodiments refers to a share of packets that were not sent to the target due to high traffic load or traffic management and should be seen as a part of the packet loss rate. The term "Packet Loss Rate" at least in some embodiments refers to a share of packets that could not be received by the target, including packets dropped, packets lost in transmission and packets received in wrong format. The term "latency" at least in some embodiments refers to the amount of time it takes to transfer a first/initial data unit in a data burst from one point to another.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wireless link between a transmitter and a receiver.

The term "throughput" or "network throughput" at least in some embodiments refers to a rate of production or the rate at which something is processed. Additionally or alternatively, the term "throughput" or "network throughput" at least in some embodiments refers to a rate of successful message (date) delivery over a communication channel. The term "goodput" at least in some embodiments refers to a number of useful information bits delivered by the network to a certain destination per unit of time.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus comprising:
   interface circuitry to collect observation data from a plurality of multi-access user equipment (UE) within an environment;
   a non-transitory machine-readable medium including machine-readable instructions; and
   at least one processor circuit to be programmed based on the machine-readable instructions to:
   determine a state of the environment based on the collected observation data;
   operate a Reinforcement Learning Model (RLM) to determine one or more actions based on the determined state, the one or more actions to cause one or more of the multi-access UEs to perform one or more operations according to one or more traffic management strategies;
   obtain action data associated with one or more other actions taken by one or more of the multi-access UEs;
   train the RLM based on the observation data and the action data; and
   deploy the RLM to the one or more of the multi-access UEs, the deployed RLM to identify one or more subsequent actions to be taken by at least one of the multi-access UEs.

2. The apparatus of claim 1, wherein the one or more traffic management strategies include one or more of a traffic steering strategy or a traffic splitting strategy.

3. The apparatus of claim 1, wherein the interface circuitry is to communicate the one or more actions to one or more of the multi-access UEs.

4. The apparatus of claim 1, wherein one or more of the multi-access UEs are to use the deployed RLM to independently predict one or more of the traffic management strategies according to their individually collected observations from interacting with the environment.

5. The apparatus of claim 4, wherein one or more of the at least one processor circuit is to:
   calculate a reward value based on the collected observation data;
   update the RLM based on the calculated reward value; and
   distribute the updated RLM to the one or more multi-access UEs when the updated RLM passes a verification process.

6. The apparatus of claim 1, wherein one or more of the at least one processor circuit is to:
   trigger collection of the observation data when a trigger condition is met, the trigger condition including one or more of expiration of a timer or a measurement value meeting a threshold.

7. The apparatus of claim 1, wherein the interface circuitry is to collect additional observation data from one or more network access nodes (NANs).

8. The apparatus of claim 1, wherein one or more of the at least one processor circuit is to:
   calculate, based on a reward function, a reward value based on the collected observation data.

9. The apparatus of claim 8, wherein the reward function is a utility function of a network quality of service (QOS) target.

10. The apparatus of claim 9, wherein inputs to the utility function include one or more QoS parameters, the one or more QOS parameters including one or more of packet delay, packet loss rate, packet drop rate, physical (PHY) rate, goodput, UE throughput, cell throughput, jitter, alpha fairness, channel quality indicator (CQI) related measurements, Modulation Coding Scheme (MCS) related measurements, physical resource block (PRB) utilization, radio utilization level per NAN, or data volume.

11. The apparatus of claim 1, wherein the observation data includes one or more of packet delay, packet loss rate, packet drop rate, PHY rate, goodput, UE throughput, cell throughput, jitter, alpha fairness, CQI related measurements, MCS related measurements, PRB utilization, radio utilization level per NAN, or data volume.

12. The apparatus of claim 1, wherein the apparatus corresponds to a Multi-Access Edge Computing (MEC) server/host or an Open RAN Alliance (O-RAN) Radio Access Network (RAN) intelligent controller (RIC).

13. One or more non-transitory computer readable media (NTCRM) comprising instructions to cause at least one processor circuit of a computing device to at least:
   operate a representation network of a Reinforcement Learning Model (RLM) to generate a representation of a multi-access communication environment based on observation data collected from the multi-access communication environment;
   operate an actor network of the RLM to determine one or more actions based on the generated representation and feedback from a critic network of the RLM, the one or more actions including one or more traffic management strategies for one or more of a plurality of multi-access user equipment (UE), and the one or more actions are to cause one or more of the multi-access UEs to perform one or more operations according to the one or more traffic management strategies;
   operate the critic network to determine the feedback for the one or more actions;
   communicate the one or more actions to one or more of the multi-access UEs;
   obtain action data associated with one or more other actions taken by one or more of the multi-access UEs;
   train the RLM based on the observation data and the action data; and
   deploy the RLM to one or more of the multi-access UEs, execution of the deployed RLM to derive subsequent actions by one or more of the multi-access UEs.

14. The one or more NTCRM of claim 13, wherein the feedback is (i) a state-value based on a state-value function or (ii) a quality value (Q value) based on a Q value function.

15. The one or more NTCRM of claim 13, wherein the feedback includes a probability distribution over the one or more actions.

16. The one or more NTCRM of claim 13, wherein the representation network includes a recurrent neural network (RNN) to learn the representation of the multi-access communication environment based on inputs having variable sizes.

17. The one or more NTCRM of claim 13, wherein the critic network includes an RNN that is to learn a measurement sequence correlation to determine the feedback.

18. The one or more NTCRM of claim 13, wherein the actor network includes an RNN that is to learn a measurement sequence correlation to determine the one or more actions.

19. The one or more NTCRM of claim 13, wherein the representation network, the actor network, and the critic network include respective Long Short-Term Memory (LSTM) networks.

20. The one or more NTCRM of claim 13, wherein the instructions are to cause one or more of the at least one processor circuit of the computing device to:

randomly initialize the critic network, the actor network, and the representation network with respective weight parameters;
initialize a replay buffer;
initialize a random process to perform action exploration; and
operate the representation network to obtain a representation of the observation data for a target UE to whom an action recommendation is to be provided, the target UE is among the multi-access UEs.

21. The one or more NTCRM of claim 20, wherein the instructions are to cause one or more of the at least one processor circuit of the computing device to:
operate the actor network to select an action according to a current policy and exploration noise, and deploy the selected action to the target UE;
collect a reward based on performance of the selected action; and
cause storage of the selected action, a state, and the collected reward in the replay buffer.

22. The one or more NTCRM of claim 21, wherein, to select the action, the instructions are to cause one or more of the at least one processor circuit of the computing device to:
randomly sample an action space for the action based on a probability; or
select the action based on a heuristic algorithm.

23. The one or more NTCRM of claim 21, wherein the instructions are to cause one or more of the at least one processor circuit of the computing device to:
sample a minibatch of experience data from the replay buffer;
determine a temporal difference (TD) target for a TD error computation based on the collected reward; and
train the critic network to minimize a loss function that includes the TD target.

24. The one or more NTCRM of claim 23, wherein the instructions are to cause one or more of the at least one processor circuit of the computing device to:
train the actor network based on a policy gradient to maximize a reward function, the policy gradient produced by the critic network.

25. An apparatus comprising:
interface circuitry to collect observation data from a multi-access communication environment;
a non-transitory machine-readable medium including machine-readable instructions; and
at least one processor circuit to be programmed based on the machine-readable instructions to:
determine a state of the multi-access communication environment based on the collected observation data; and
operate a Reinforcement Learning (RL) agent to determine one or more actions based on the determined state and an enforce safety action space (ESAS) procedure, the determined one or more actions including one or more traffic management strategies for one or more of a plurality of multi-access user equipment (UE), the one or more actions to cause one or more of the multi-access UEs to perform one or more operations according to the one or more traffic management strategies, and the ESAS procedure based on an acceptable range of actions or a set of constraints described by one or more linear or non-linear functions of the one or more actions.

26. The apparatus of claim 25, wherein one or more of the at least one processor circuit is to operate the RL agent to determine the one or more actions based on the determined state, the ESAS procedure and a guided exploration procedure, the guided exploration procedure including at least one of one or more rule-based algorithms, one or more model-based heuristic algorithms, or one or more pre-trained machine learning algorithms.

27. The apparatus of claim 25, wherein one or more of the at least one processor circuit is to operate the RL agent to determine the one or more actions based on the determined state, the ESAS procedure and an early warning procedure, the early warning procedure to:
trigger implementation of a back-up model when one or more performance metrics meet or exceed a corresponding threshold, the one or more performance metrics including one or more of an average value of one way delay for one or more data flows, an average value of end-to-end (e2e) delay for one or more data flows, a delay variation trend, buffer accumulation, a channel quality indicator (CQI) variation trend, or a modulation coding scheme (MCS) distribution trend.

28. The apparatus of claim 25, wherein one or more of the at least one processor circuit is to operate the RL agent to determine the one or more actions based on the determined state, the ESAS procedure and an opportunistic exploration control (OEC) procedure, the OEC procedure to:
identify one or more of the one or more actions as high risk actions; and
apply the one or more high risk actions to test flows or flows with less stringent QoS targets than other flows.

* * * * *